US012313200B2

(12) United States Patent
Whittemore

(10) Patent No.: US 12,313,200 B2
(45) Date of Patent: May 27, 2025

(54) RAIL END MOUNT AND METHODS OF USE

(71) Applicant: Zipwall, LLC., Arlington, MA (US)

(72) Inventor: Jeffrey P. Whittemore, Arlington, MA (US)

(73) Assignee: Zipwall, LLC, Arlington, MA (US)

(*) Notice: Subject to any disclaimer, the term of this patent is extended or adjusted under 35 U.S.C. 154(b) by 337 days.

(21) Appl. No.: 17/416,644

(22) PCT Filed: Jan. 13, 2020

(86) PCT No.: PCT/US2020/013282
§ 371 (c)(1),
(2) Date: Jun. 21, 2021

(87) PCT Pub. No.: WO2020/146862
PCT Pub. Date: Jul. 16, 2020

(65) Prior Publication Data
US 2022/0162866 A1     May 26, 2022

Related U.S. Application Data

(60) Provisional application No. 62/931,380, filed on Nov. 6, 2019, provisional application No. 62/893,465, filed (Continued)

(51) Int. Cl.
*F16M 5/00*     (2006.01)
*E04G 21/24*    (2006.01)
(Continued)

(52) U.S. Cl.
CPC .............. *F16L 5/00* (2013.01); *E04G 21/243* (2013.01); *E04G 21/30* (2013.01);
(Continued)

(58) Field of Classification Search
CPC ........ F16L 5/00; F16L 41/088; E04G 21/243; E04G 21/30; E04G 2021/248;
(Continued)

(56) References Cited

U.S. PATENT DOCUMENTS 642,236 A    1/1900  Larimer
670,585 A    3/1901  Fowler
(Continued)

FOREIGN PATENT DOCUMENTS

BE    1011260    6/1999
CA    3121808    6/2020
(Continued)

OTHER PUBLICATIONS

Extended European Search Report dated Aug. 22, 2022 issued in related European Application No. 20738465.2.
(Continued)

*Primary Examiner* — Muhammad Ijaz
(74) *Attorney, Agent, or Firm* — Onello & Mello, PC

(57) ABSTRACT

A mount comprises a base having opposed upper and lower surfaces and at least one channel on the upper surface of the base extending in a first horizontal direction. The at least one channel comprises a head-mounting feature constructed and arranged to removably retain a rail head in the first horizontal direction. At least one curtain attachment mechanism is constructed and arranged to secure a curtain, wherein the at least one curtain attachment mechanism extends in a direction that is transverse to the first horizontal direction. A socket positioned at the lower surface of the base is constructed and arranged to interface with a pole.

36 Claims, 64 Drawing Sheets

Related U.S. Application Data on Aug. 29, 2019, provisional application No. 62/791,233, filed on Jan. 11, 2019, provisional application No. 62/791,306, filed on Jan. 11, 2019.

(51) Int. Cl.
*E04G 21/30* (2006.01)
*F16L 5/00* (2006.01)
*F24F 13/02* (2006.01)
*F24F 13/06* (2006.01)

(52) U.S. Cl.
CPC ...... *F24F 13/0254* (2013.01); *F24F 13/0218* (2013.01); *F24F 13/06* (2013.01)

(58) Field of Classification Search
CPC ............... E04G 2025/006; E04G 25/04; F24F 13/0218; F24F 13/06; F24F 13/0209; E04B 2/822
USPC ...................................................... 248/200.1
See application file for complete search history.

(56) References Cited

U.S. PATENT DOCUMENTS

| | | |
|---|---|---|
| 827,000 A | 7/1906 | Dinsmore |
| 1,705,625 A | 3/1929 | Mitchell |
| 1,766,324 A | 6/1930 | Berner |
| 2,219,169 A | 10/1940 | Alter |
| 2,232,194 A | 2/1941 | Zogby |
| 2,474,158 A | 6/1949 | Neely |
| 2,487,585 A | 11/1949 | Pencek |
| 2,816,769 A | 12/1957 | Noble |
| 2,903,227 A | 9/1959 | de kalb Key |
| 2,942,829 A | 6/1960 | Stiffel |
| 2,974,805 A | 3/1961 | Brossean |
| 3,072,784 A | 1/1963 | Mann |
| 3,090,826 A | 5/1963 | Cochran |
| 3,118,363 A | 1/1964 | Burgess, Jr. |
| 3,247,558 A | 4/1966 | Kaufman |
| 3,322,381 A | 5/1967 | Bubb |
| 3,327,310 A | 6/1967 | Bethune et al. |
| 3,333,808 A | 8/1967 | Du Boff |
| 3,350,120 A | 10/1967 | Hinrichs |
| 3,431,585 A * | 3/1969 | Foltz .................. E05D 15/0652 248/323 |
| 3,433,510 A | 3/1969 | Hulterstrum |
| 3,506,135 A | 4/1970 | Klingaman |
| 3,529,860 A * | 9/1970 | Jelley ..................... F16B 21/09 160/402 |
| 3,592,434 A | 7/1971 | Murray |
| 3,604,397 A | 9/1971 | Salerno |
| 3,608,991 A | 9/1971 | Wade |
| 3,713,643 A | 1/1973 | Gerstenberger |
| 3,767,253 A | 10/1973 | Kluetsch |
| 3,792,510 A | 2/1974 | Evett |
| 3,822,850 A | 7/1974 | Elias |
| 3,858,988 A | 1/1975 | Cohen |
| 3,861,663 A | 1/1975 | Strickland |
| 3,863,554 A | 2/1975 | Boyd |
| 3,952,877 A | 4/1976 | Kindl |
| 3,956,784 A | 5/1976 | Vargas |
| 3,972,272 A | 8/1976 | Bagby |
| 3,994,463 A | 11/1976 | Baker |
| 4,077,083 A | 3/1978 | Siemund et al. |
| 4,078,756 A | 3/1978 | Cross |
| 4,087,006 A | 5/1978 | Schill |
| 4,111,217 A | 9/1978 | Victor |
| 4,127,911 A | 12/1978 | Cupp et al. |
| 4,139,101 A | 2/1979 | Towfigh |
| 4,277,863 A | 7/1981 | Faneuf |
| 4,334,461 A | 6/1982 | Ferguson et al. |
| 4,379,654 A | 4/1983 | Rovelli |
| 4,396,325 A | 8/1983 | Joice-Cavanagh |
| 4,488,651 A | 12/1984 | Bishop |
| 4,502,256 A | 3/1985 | Hahn |
| 4,536,924 A | 8/1985 | Willoughby |
| 4,576,354 A | 3/1986 | Blessing, Sr. |
| 4,586,844 A | 5/1986 | Hammonds et al. |
| 4,592,797 A | 6/1986 | Carlson |
| 4,645,473 A | 2/1987 | Mochizuki |
| 4,662,034 A | 5/1987 | Cunningham |
| 4,708,189 A * | 11/1987 | Ward .................... E04G 21/243 160/351 |
| 4,715,089 A | 12/1987 | Schema |
| 4,717,107 A | 1/1988 | Servadio |
| 4,770,086 A | 9/1988 | Gabster |
| 4,794,974 A | 1/1989 | Melino |
| 4,824,302 A | 4/1989 | Schultheis et al. |
| 4,852,844 A | 8/1989 | Villaveces |
| 4,874,028 A | 10/1989 | Lynch et al. |
| 4,885,876 A | 12/1989 | Henke |
| 4,907,835 A | 3/1990 | Salters |
| 4,912,814 A | 4/1990 | McKenzie |
| 4,926,522 A | 5/1990 | Wang |
| 4,928,916 A | 5/1990 | Molloy |
| 4,949,523 A | 8/1990 | Kassem |
| 4,969,241 A | 11/1990 | Griffin |
| 5,038,889 A | 8/1991 | Jankowski |
| 5,040,915 A | 8/1991 | Stuart et al. |
| 5,056,753 A | 10/1991 | Lunau et al. |
| 5,078,348 A | 1/1992 | Babitchenko |
| 5,116,012 A | 5/1992 | Offenhauer et al. |
| 5,129,774 A | 7/1992 | Balseiro et al. |
| 5,131,781 A | 7/1992 | Klein |
| 5,170,974 A | 12/1992 | Ruggiero |
| 5,240,058 A | 8/1993 | Ward |
| 5,287,614 A | 2/1994 | Ehrlich |
| 5,299,773 A | 4/1994 | Bertrand |
| 5,301,915 A | 4/1994 | Bahniuk et al. |
| 5,308,280 A | 5/1994 | Dotson |
| 5,331,706 A | 7/1994 | Graham |
| 5,345,989 A | 9/1994 | Brophy |
| 5,375,303 A | 12/1994 | Shenier |
| 5,379,491 A | 1/1995 | Solo |
| 5,384,938 A | 1/1995 | Frederick |
| 5,388,283 A | 2/1995 | Garnett |
| 5,400,959 A | 3/1995 | Cone |
| 5,404,602 A | 4/1995 | Kondo |
| 5,469,607 A | 11/1995 | Henningsson et al. |
| 5,497,537 A | 3/1996 | Robinson et al. |
| 5,524,693 A | 6/1996 | Hamilton |
| 5,529,326 A | 6/1996 | Hwang |
| 5,536,229 A | 7/1996 | Albergo |
| 5,542,209 A | 8/1996 | Sheu |
| 5,555,607 A | 9/1996 | Parveris |
| 5,558,501 A | 9/1996 | Wang et al. |
| 5,584,456 A | 12/1996 | Stephens |
| 5,640,826 A | 6/1997 | Hurilla, Jr. |
| 5,645,272 A | 7/1997 | Brennan, Sr. |
| 5,647,607 A | 7/1997 | Bolieau |
| 5,649,780 A | 7/1997 | Schall |
| 5,666,702 A | 9/1997 | Ming-Chieh |
| 5,673,741 A | 10/1997 | Cairns |
| 5,685,112 A | 11/1997 | Fara |
| 5,707,032 A | 1/1998 | Ehrlich |
| 5,715,620 A | 2/1998 | Walker |
| 5,722,691 A | 3/1998 | Patel |
| 5,803,653 A | 9/1998 | Zuffetti |
| 5,832,652 A | 11/1998 | Bartys |
| 5,884,424 A | 3/1999 | Smith |
| 5,897,085 A | 4/1999 | Cronin |
| 5,918,843 A | 7/1999 | Stammers |
| 5,924,469 A | 7/1999 | Whittemore |
| 5,937,488 A | 8/1999 | Geiger |
| 5,940,942 A | 8/1999 | Fong |
| 5,941,434 A | 8/1999 | Green |
| 5,941,586 A | 8/1999 | Fann |
| 5,944,464 A | 8/1999 | Cole, Jr. |
| 5,979,110 A | 11/1999 | Tai |
| 6,053,527 A | 4/2000 | Gans et al. |
| 6,067,691 A * | 5/2000 | Feltman ............... E04F 13/0733 24/336 |
| 6,079,173 A | 6/2000 | Waalkes et al. |

(56) References Cited

U.S. PATENT DOCUMENTS

| | | | |
|---|---|---|---|
| 6,082,945 A | 7/2000 | Jeffries et al. |
| 6,152,434 A | 11/2000 | Gluck |
| 6,164,605 A | 12/2000 | Drake et al. |
| 6,170,112 B1 | 1/2001 | Mayfield et al. |
| 6,209,615 B1 | 4/2001 | Whittemore |
| 6,237,182 B1 | 5/2001 | Cassar |
| 6,321,823 B1 | 11/2001 | Whittemore |
| 6,341,401 B1 | 1/2002 | Lin |
| 6,378,175 B1 | 4/2002 | Vanderpan |
| 6,467,741 B1 | 10/2002 | Shih |
| 6,474,609 B1 | 11/2002 | Pinard |
| 6,490,749 B1 | 12/2002 | Morad |
| 6,508,295 B2 | 1/2003 | Whittemore |
| 6,523,231 B1 | 2/2003 | Lassiter |
| 6,564,512 B1 | 5/2003 | Whittemore |
| 6,584,702 B2 | 7/2003 | Irey |
| 6,634,678 B2 | 10/2003 | Mariman |
| 6,662,488 B1 | 12/2003 | Heimbrock et al. |
| 6,729,358 B1 | 5/2004 | Moffatt |
| 6,908,250 B2 | 6/2005 | Moffatt |
| 6,942,004 B2 | 9/2005 | Whittemore |
| 6,953,076 B2 * | 10/2005 | Whittemore ............ E04G 21/24 248/200.1 |
| 7,073,758 B2 | 7/2006 | Whittemore et al. |
| 7,108,040 B2 | 9/2006 | Whittemore |
| 7,255,312 B2 | 8/2007 | Melic |
| 7,261,140 B2 | 8/2007 | Whittemore |
| 7,290,742 B2 | 11/2007 | Wang |
| 7,314,078 B2 | 1/2008 | Melino, Jr. et al. |
| 7,503,373 B2 | 3/2009 | Whittemore |
| 7,533,712 B2 * | 5/2009 | Whittemore .......... E04G 21/243 248/200.1 |
| 7,658,219 B2 | 2/2010 | Whittemore |
| 7,670,401 B2 | 3/2010 | Whittemore |
| 7,717,382 B2 | 5/2010 | Whittemore et al. |
| 7,743,512 B1 | 6/2010 | Whittemore |
| 7,905,938 B2 | 3/2011 | Whittemore |
| 8,066,051 B2 | 11/2011 | Whittemore |
| 8,069,546 B1 | 12/2011 | Whittemore |
| 8,074,700 B1 | 12/2011 | Melino et al. |
| 8,113,475 B2 | 2/2012 | Whittemore et al. |
| 8,137,426 B2 | 3/2012 | Whittemore |
| 8,349,047 B2 | 1/2013 | Whittemore |
| 8,366,155 B1 | 2/2013 | Nolasco |
| 8,371,360 B2 | 2/2013 | Whittemore |
| 8,591,619 B2 | 11/2013 | Whittemore |
| 8,627,873 B2 | 1/2014 | Whittemore |
| 8,641,006 B2 * | 2/2014 | Reichel ................. G01F 15/185 248/351 |
| 8,801,824 B2 | 8/2014 | Whittemore |
| 8,857,499 B2 | 10/2014 | Whittemore |
| 9,115,539 B2 | 8/2015 | Whittemore |
| 9,441,392 B2 | 9/2016 | Whittemore |
| 9,458,862 B2 | 10/2016 | Whittemore |
| D777,901 S | 1/2017 | Whittemore |
| 9,657,514 B1 | 5/2017 | Whittemore |
| 9,663,962 B1 * | 5/2017 | Whittemore ............ E04G 21/24 |
| 9,689,108 B2 | 6/2017 | Hamman, Jr. et al. |
| 9,784,287 B2 | 10/2017 | Whittemore |
| 10,081,955 B2 | 9/2018 | Whittemore |
| 10,174,514 B2 | 1/2019 | Whittemore |
| 10,428,539 B2 | 10/2019 | Whittemore |
| 10,538,930 B2 | 1/2020 | Whittemore |
| 10,597,882 B2 | 3/2020 | Whittemore |
| 10,689,865 B2 | 6/2020 | Whittemore |
| 10,781,597 B2 | 9/2020 | Whittemore |
| 10,961,730 B2 | 3/2021 | Whittemore |
| 10,968,649 B1 | 4/2021 | Whittemore |
| 11,230,091 B2 | 1/2022 | Whittemore |
| 11,441,323 B2 | 9/2022 | Whittemore |
| 2001/0000834 A1 | 5/2001 | Irey |
| 2001/0029640 A1 | 10/2001 | Cassar |
| 2002/0011316 A1 | 1/2002 | Whittemore |
| 2002/0135182 A1 | 9/2002 | Mariman |
| 2003/0028988 A1 | 2/2003 | Streutker et al. |
| 2003/0070773 A1 | 4/2003 | Whittemore |
| 2003/0154588 A1 | 8/2003 | Blacket et al. |
| 2004/0031892 A1 | 2/2004 | Whittemore et al. |
| 2004/0065799 A1 * | 4/2004 | Whittemore .......... E04G 21/243 248/200.1 |
| 2004/0194418 A1 | 10/2004 | Gouley |
| 2004/0200585 A1 | 10/2004 | Whittemore |
| 2005/0077015 A1 | 4/2005 | Melino, Jr. et al. |
| 2005/0205729 A1 | 9/2005 | Wang |
| 2005/0247414 A1 * | 11/2005 | Whittemore ............ A47H 13/00 160/351 |
| 2005/0284591 A1 | 12/2005 | Whittemore |
| 2006/0022186 A1 | 2/2006 | Melic |
| 2006/0117679 A1 | 6/2006 | Ferony |
| 2006/0168925 A1 | 8/2006 | Whittemore |
| 2006/0207198 A1 * | 9/2006 | Sondermann .......... E04F 19/062 52/220.1 |
| 2006/0272785 A1 | 12/2006 | Whittemore |
| 2007/0257170 A1 | 11/2007 | Whittemore et al. |
| 2008/0006374 A1 | 1/2008 | Whittemore |
| 2008/0185111 A1 | 8/2008 | Zagone |
| 2009/0071614 A1 | 3/2009 | Whittemore |
| 2009/0307990 A1 | 12/2009 | Muehleba |
| 2010/0108849 A1 | 5/2010 | Whittemore |
| 2010/0115898 A1 | 5/2010 | Whittemore |
| 2010/0237209 A1 | 9/2010 | Whittemore et al. |
| 2010/0301000 A1 | 12/2010 | Whittemore |
| 2011/0068025 A1 | 3/2011 | Whittemore |
| 2011/0126500 A1 | 6/2011 | Whittemore |
| 2011/0192522 A1 | 8/2011 | Whittemore |
| 2012/0049034 A1 | 3/2012 | Whittemore |
| 2012/0148399 A1 | 6/2012 | Whittemore |
| 2012/0234705 A1 | 9/2012 | Whittemore |
| 2013/0118137 A1 | 5/2013 | Whittemore |
| 2013/0134279 A1 | 5/2013 | Whittemore |
| 2014/0047805 A1 | 2/2014 | Whittemore |
| 2014/0049043 A1 | 2/2014 | Hamman, Jr. et al. |
| 2014/0263916 A1 * | 9/2014 | Behringer ............. E04G 21/243 248/357 |
| 2014/0341725 A1 | 11/2014 | Whittemore |
| 2015/0052843 A1 | 2/2015 | Whittemore |
| 2016/0025110 A1 | 1/2016 | Whittemore |
| 2016/0356040 A1 * | 12/2016 | Whittemore .......... E04G 21/245 |
| 2017/0009473 A1 | 1/2017 | Whittemore |
| 2017/0009474 A1 * | 1/2017 | Whittemore .......... E04G 21/243 |
| 2017/0020322 A1 * | 1/2017 | Whittemore ............ E04G 25/00 |
| 2018/0154293 A1 | 6/2018 | Whittemore |
| 2018/0291675 A1 | 10/2018 | Whittemore |
| 2019/0003193 A1 | 1/2019 | Whittemore |
| 2019/0186162 A1 | 6/2019 | Whittemore |
| 2020/0024858 A1 | 1/2020 | Whittemore |
| 2020/0080685 A1 | 3/2020 | Whittemore |
| 2020/0087935 A1 | 3/2020 | Whittemore |
| 2020/0109599 A1 | 4/2020 | Whittemore |
| 2021/0047850 A1 | 2/2021 | Whittemore |
| 2021/0404198 A1 | 12/2021 | Whittemore |
| 2022/0074523 A1 | 3/2022 | Whittemore |
| 2022/0081963 A1 | 3/2022 | Whittemore |
| 2022/0090398 A1 | 3/2022 | Whittemore |
| 2022/0162866 A1 | 5/2022 | Whittemore |
| 2023/0067682 A1 | 3/2023 | Whittemore |
| 2023/0358061 A1 | 11/2023 | Whittemore |

FOREIGN PATENT DOCUMENTS

| | | |
|---|---|---|
| DE | 3326244 | 2/1985 |
| DE | 3918516 | 12/1990 |
| DE | 4420849 | 12/1995 |
| DE | 29605222 | 6/1996 |
| DE | 19618138 | 3/1997 |
| EP | 0190913 | 8/1986 |
| EP | 0976351 | 2/2000 |
| FR | 2411282 | 7/1979 |
| GB | 1042086 | 9/1966 |
| GB | 2156894 | 10/1985 |
| GB | 2325397 | 11/1998 |
| JP | 2001503487 | 3/2001 |
| JP | 2003206640 | 7/2003 |

(56) References Cited

FOREIGN PATENT DOCUMENTS

| JP | 4295354 | 7/2009 |
|----|---------|--------|
| KR | 102105915 | 4/2020 |
| WO | 8603538 | 6/1986 |
| WO | 9109556 | 7/1991 |
| WO | 9427480 | 12/1994 |
| WO | 2004011163 | 2/2004 |
| WO | 2005110047 | 11/2005 |
| WO | 2017117042 | 7/2017 |

OTHER PUBLICATIONS

Extended European Search Report dated Oct. 20, 2022 issued in corresponding European Application No. 20739227.5.
"Curtain-Wall", Brochure by Curtain-Wall.com, Feb. 2000.
"KwikPole", Brochure by KwikPole, Inc. www.kwikpole.com/setup.html (Aug. 2003).
"Mr. Long Arm", Brochure by Mr. LongArm, Inc., 2004.
"QUICKPROP", Brochure by Protecta Screen LTD, Aug. 1996.
"Snapwall Temporary Wall Support", brochure by C&S Manufacturing Inc.
"Third Hand", Brochure by FastCap, LLP, 2003.0.
Mllx co., Ltd. "Magic Wall". http:/www1.mllx.co.jp/.
North American Marketing Representatives, Inc. "Power Pole". http:/www.waldmannbenches.com/power5205pole520content.htm (Nov. 2004).
International Search Report and Written Opinion dated Apr. 29, 2020 issued in corresponding International Application No. PCT/US2020/013282.
Canadian Office Action dated Dec. 15, 2023 issued in Canadian Application No. 3125232.
Canadian Office Action dated Dec. 19, 2023 issued in Canadian Application No. 3125230.
International Preliminary Report on Patentability dated Jan. 11, 2024 issued in International Application No. PCT/US2022/035702.
International Search Report and Written Opinion dated Dec. 14, 2022 issued in International Application No. PCT/US2022/035702.
International Search Report and Written Opinion dated May 26, 2020 issued in International Application No. PCT/US20/13415.
International Preliminary Report on Patentability dated Jun. 16, 2021 issued in International Application No. PCT/US2020/013282.
International Preliminary Report on Patentability dated Jun. 16, 2021 issued in International Application No. PCT/US2022/013415.
Canadian Office Action dated Nov. 19, 2024 issued in Canadian Application No. 3125230.
Canadian Office Action dated Dec. 13, 2024 issued in Canadian Application No. 3125232.
Partial European Search Report dated Mar. 25, 2025 issued in European Application No. 22834210.1.

\* cited by examiner

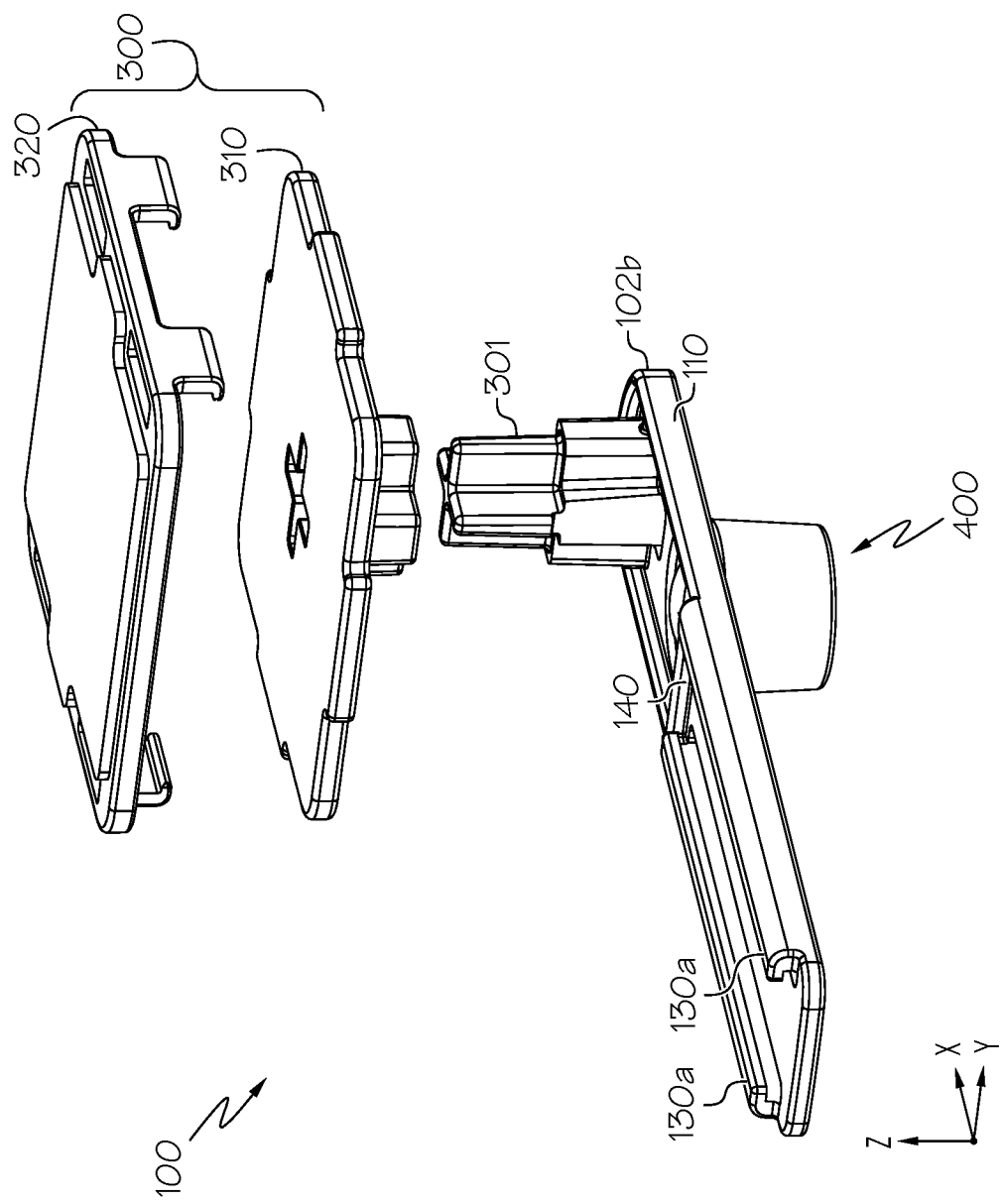

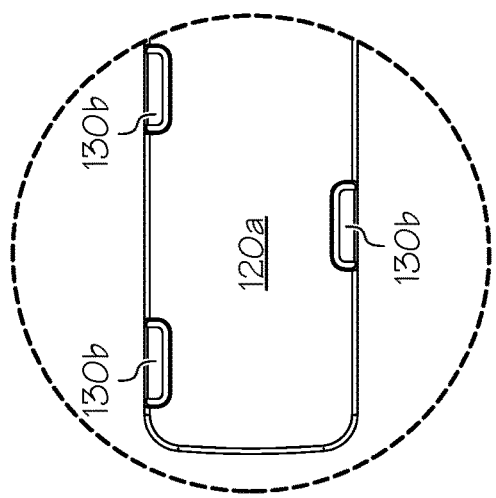
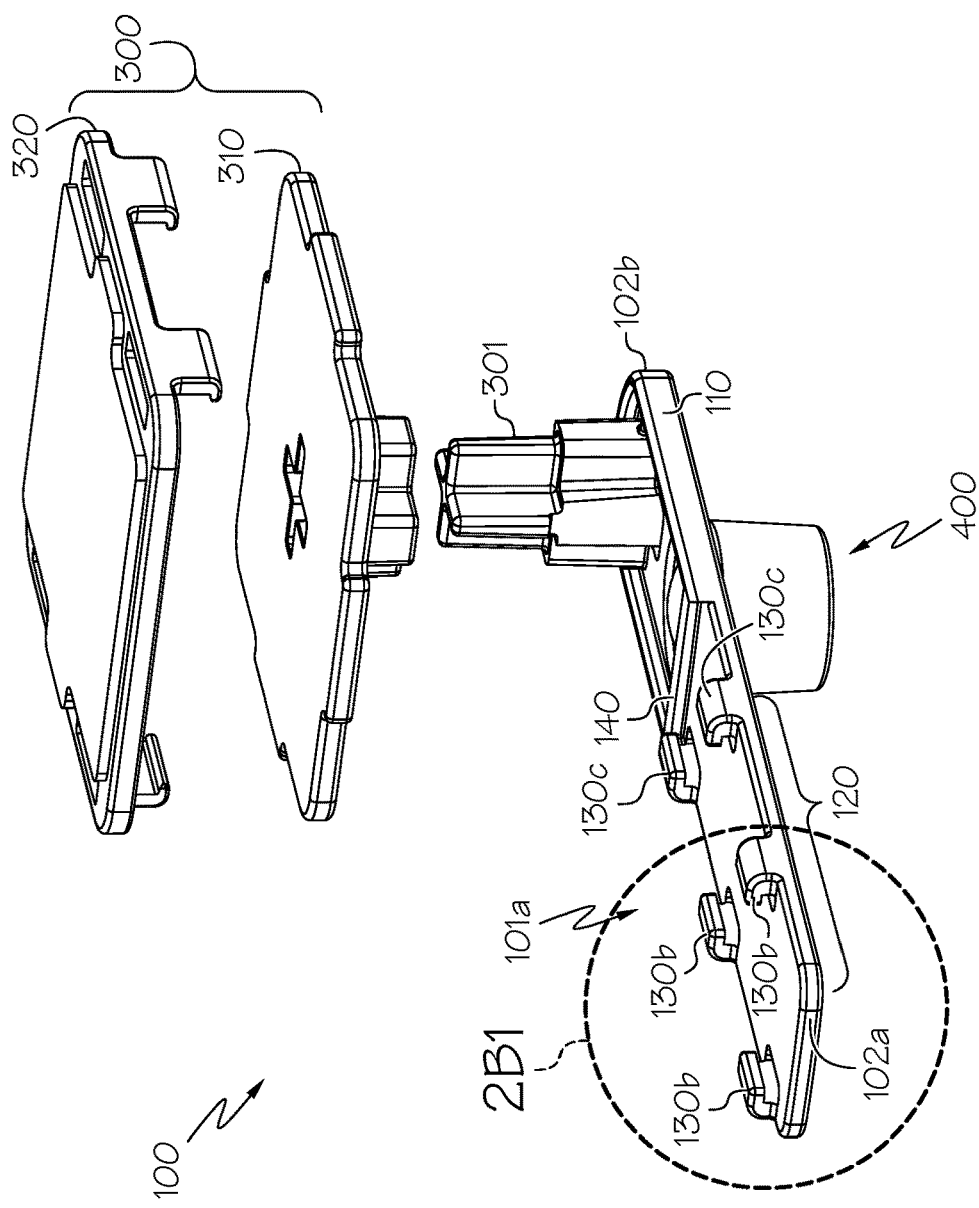

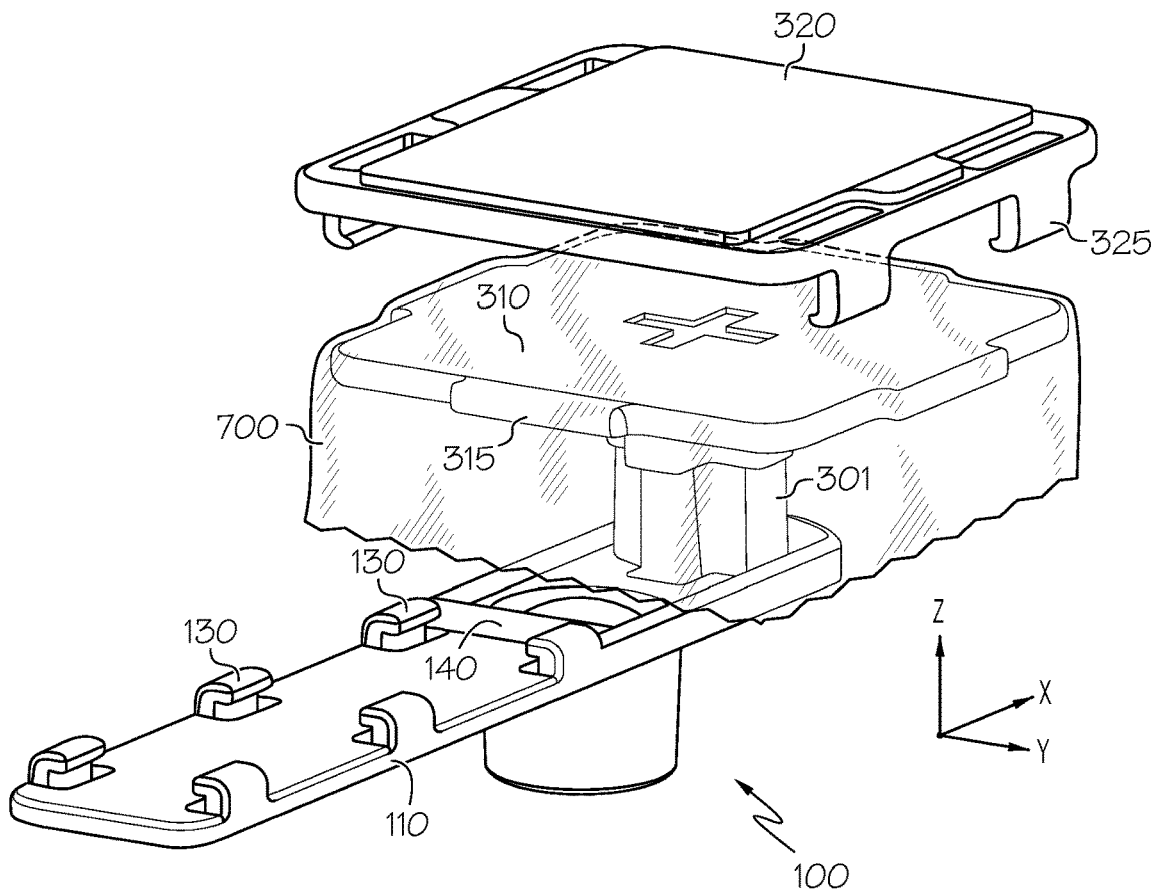
FIG. 9A1
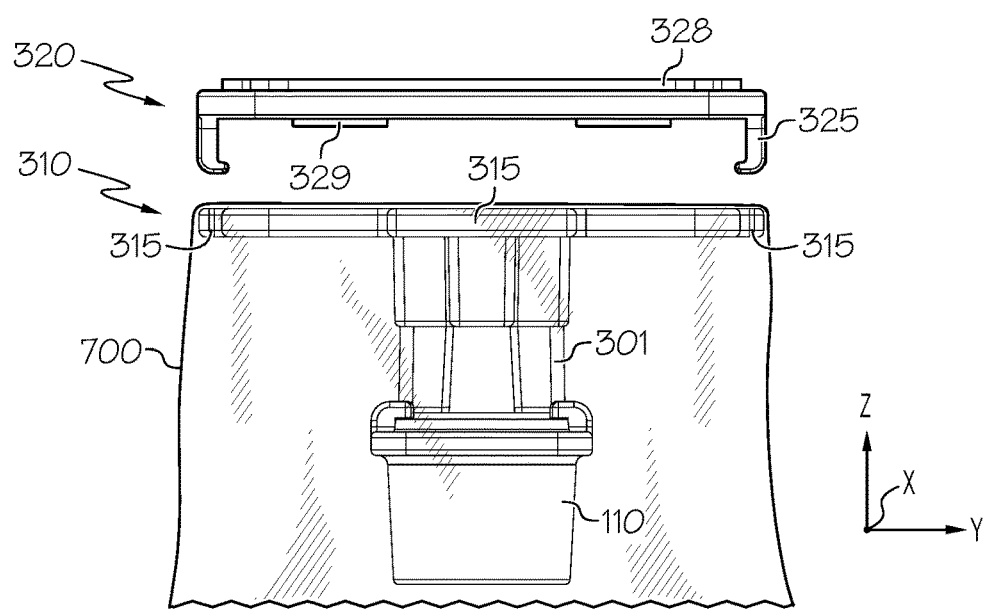
FIG. 9A2

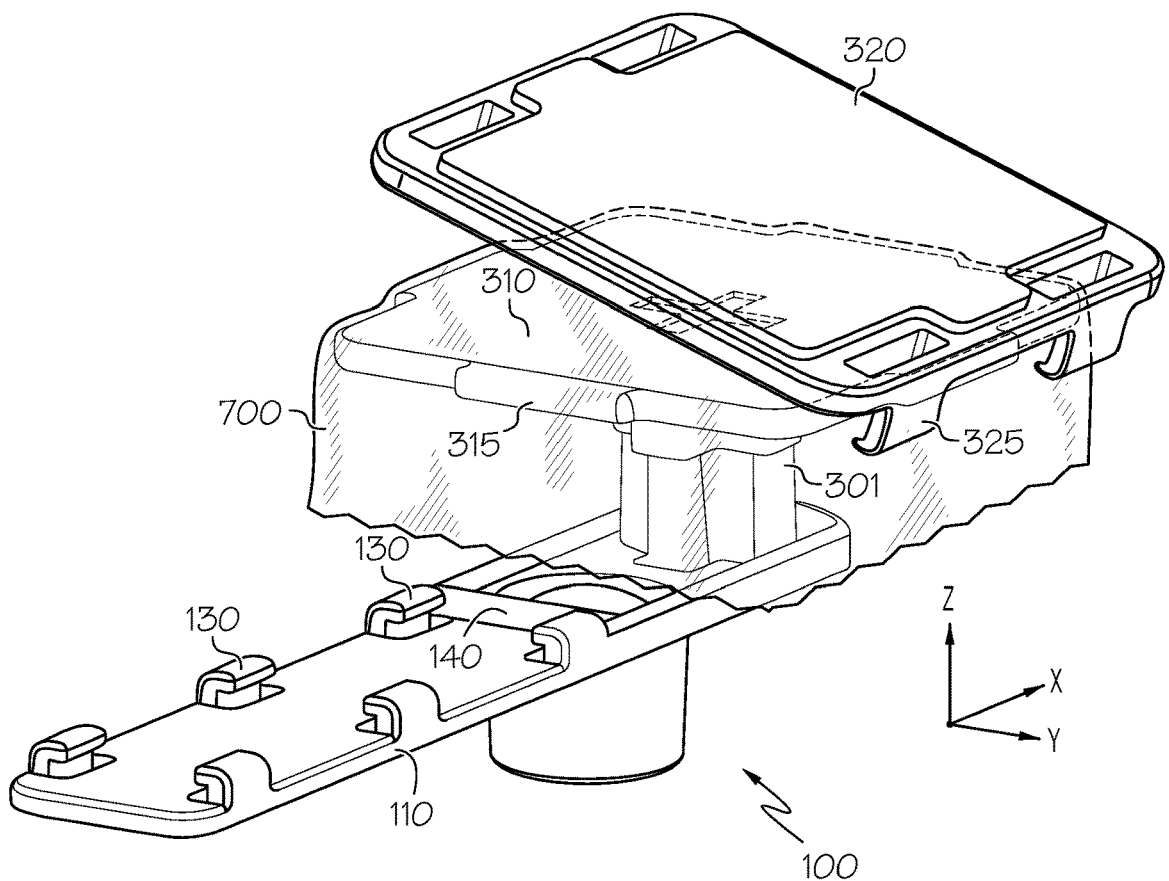
FIG. 9B1
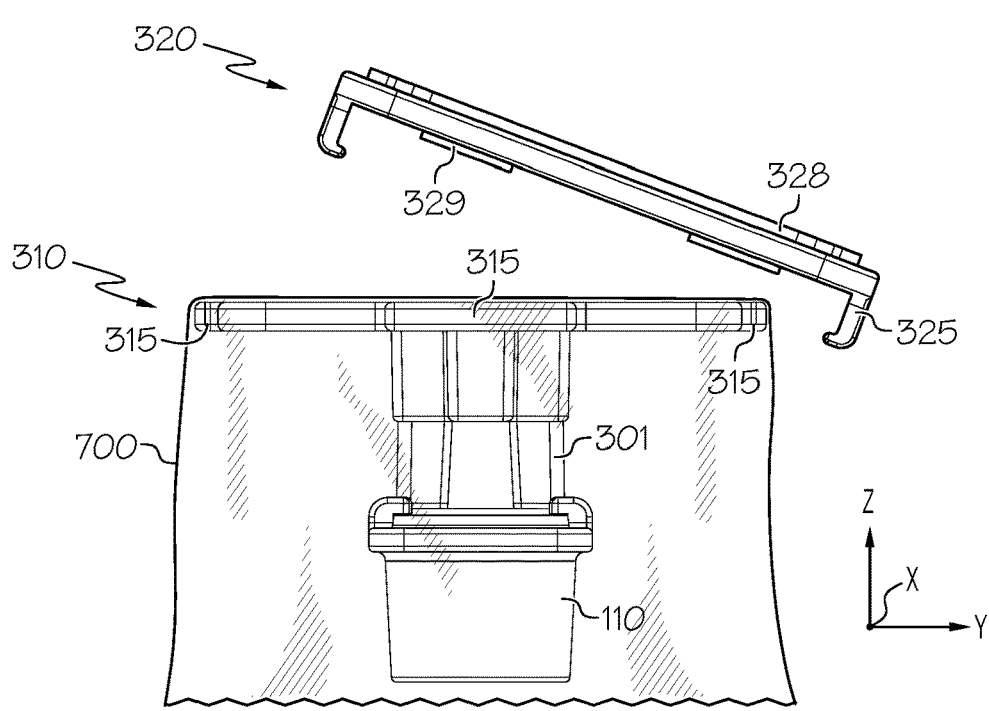
FIG. 9B2

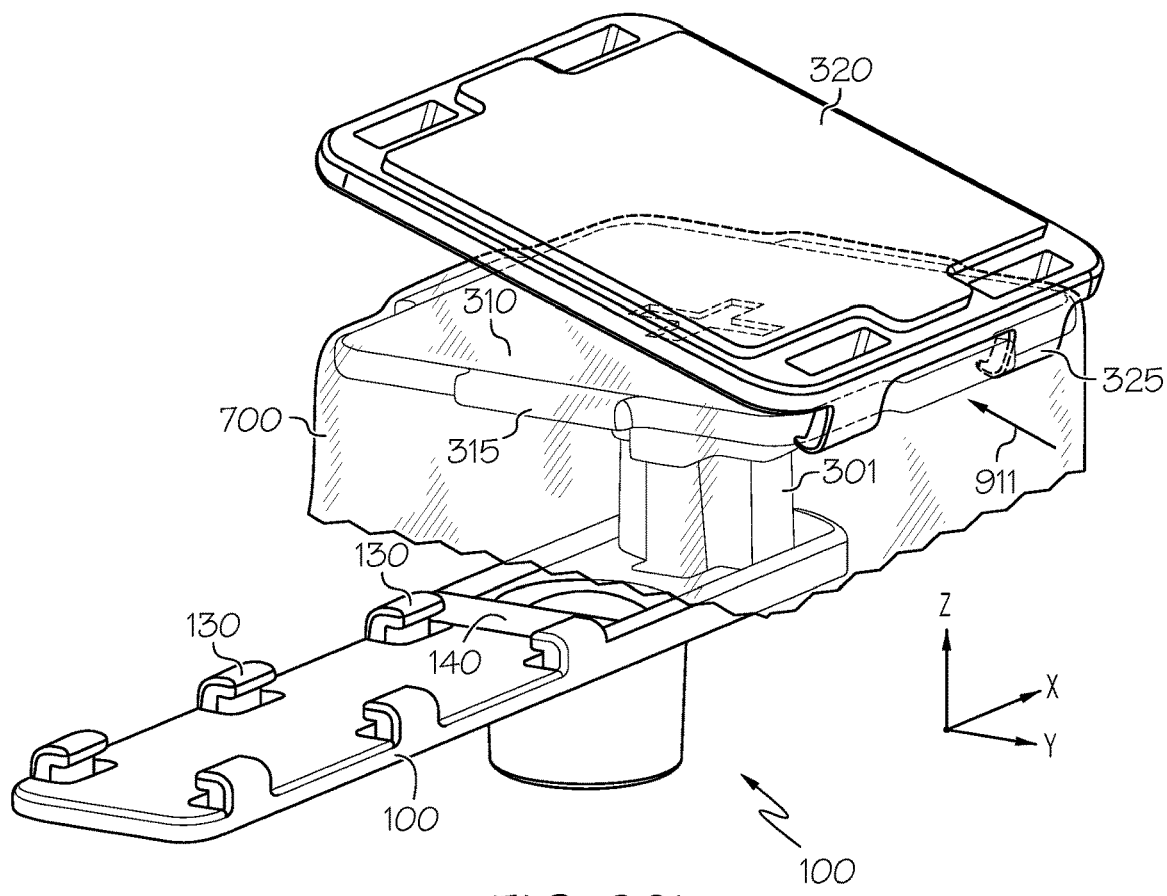
FIG. 9C1
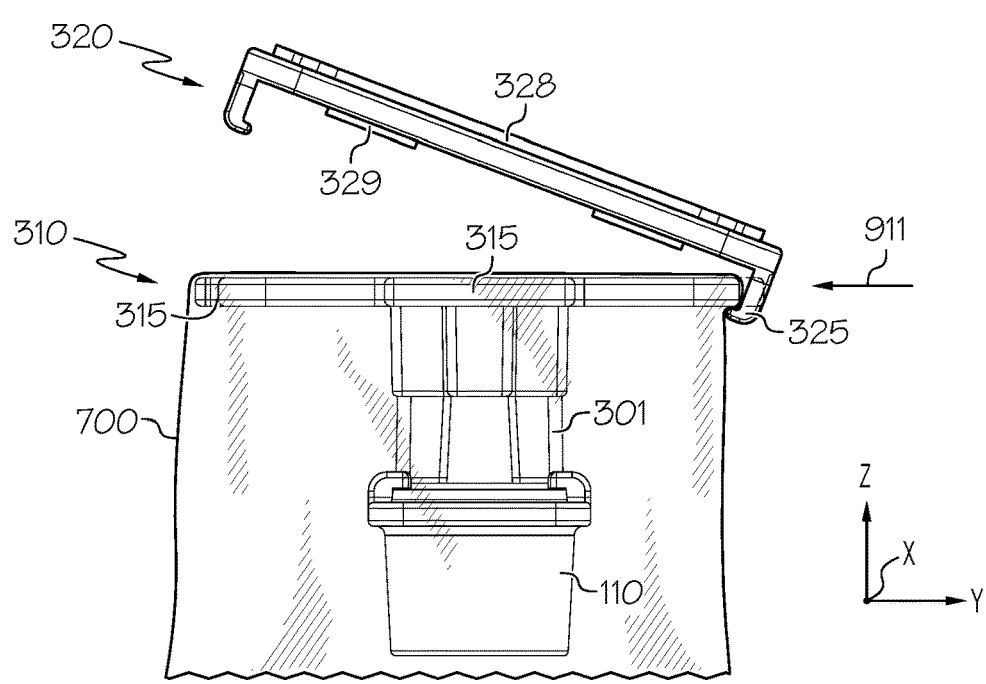
FIG. 9C2

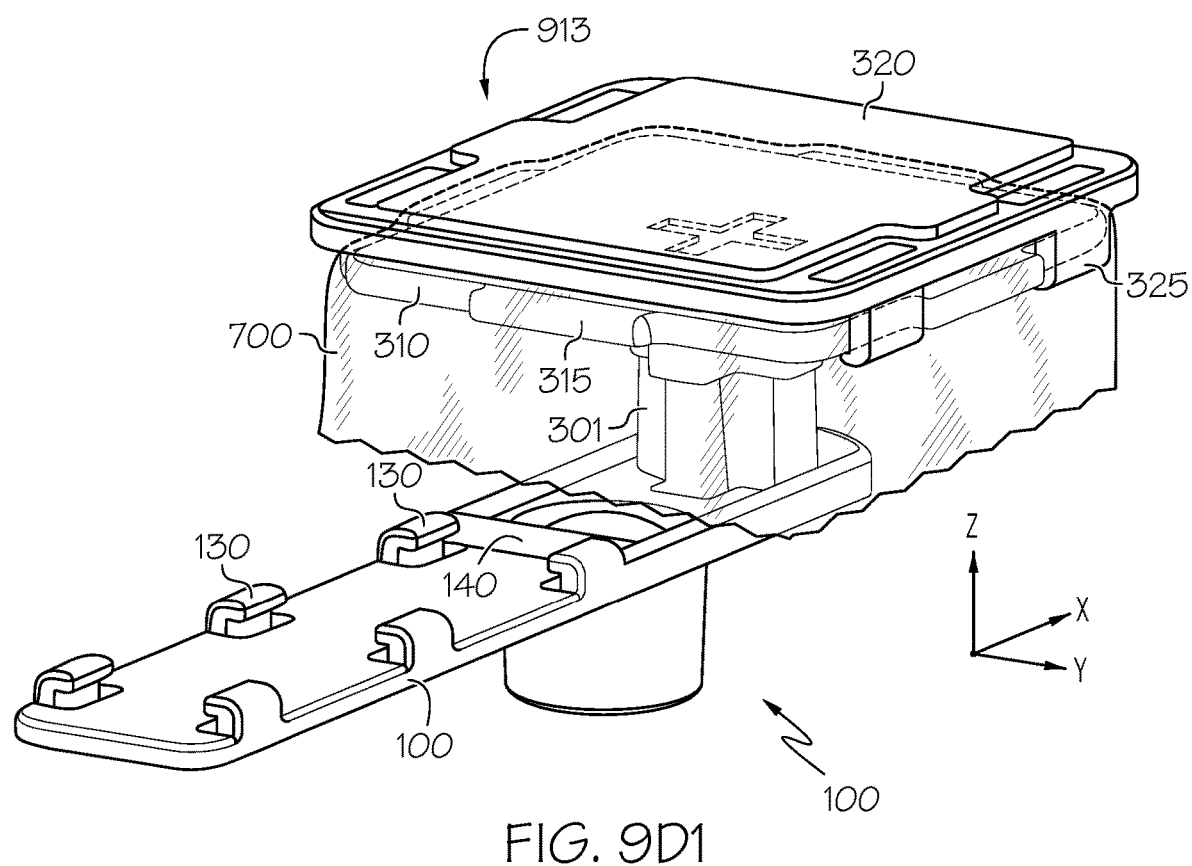
FIG. 9D1
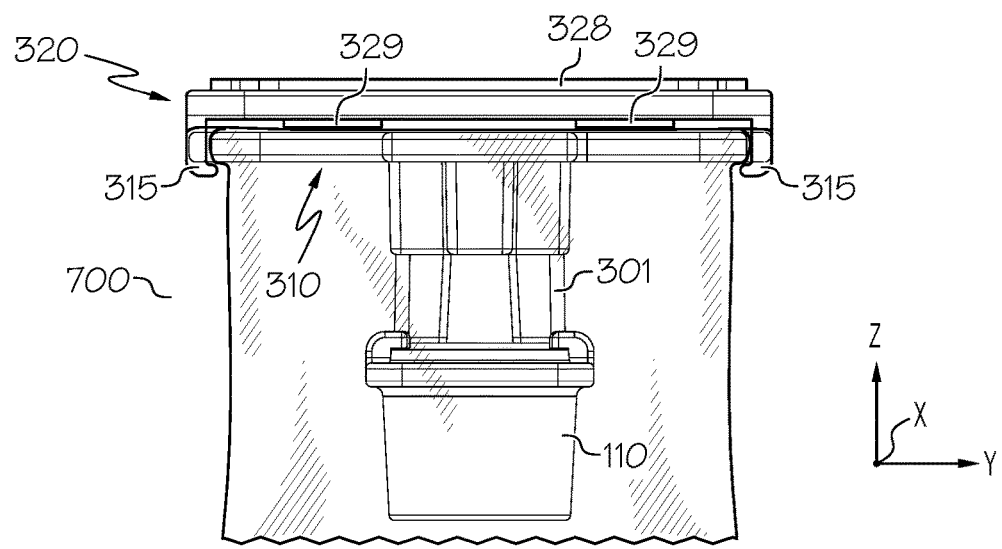
FIG. 9D2

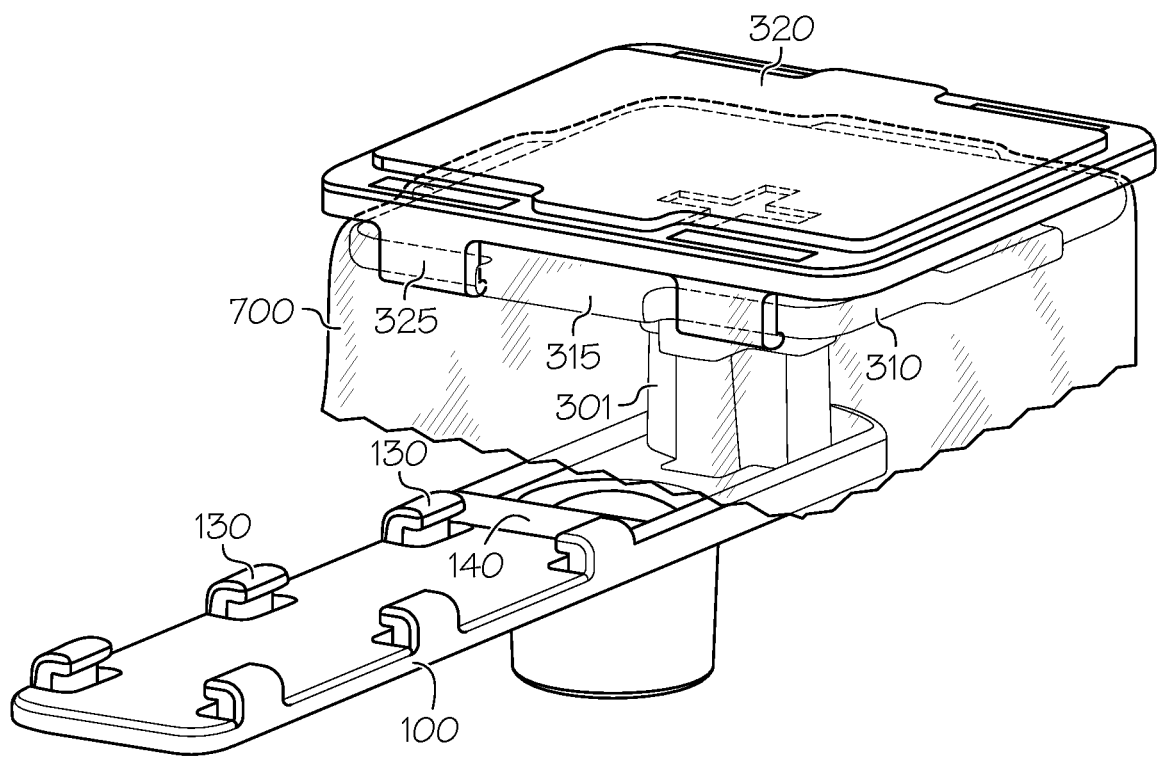
FIG. 9E1
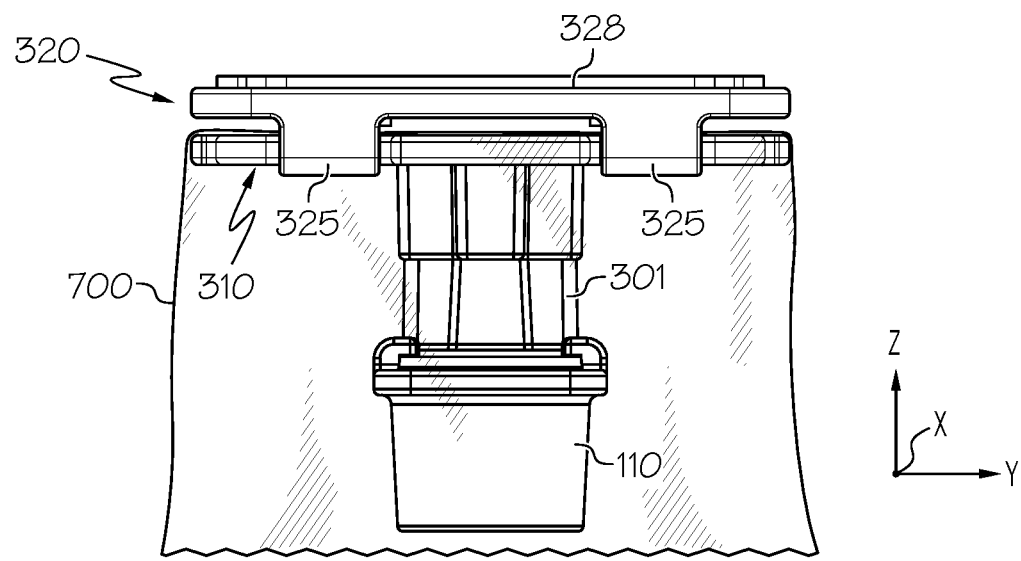
FIG. 9E2

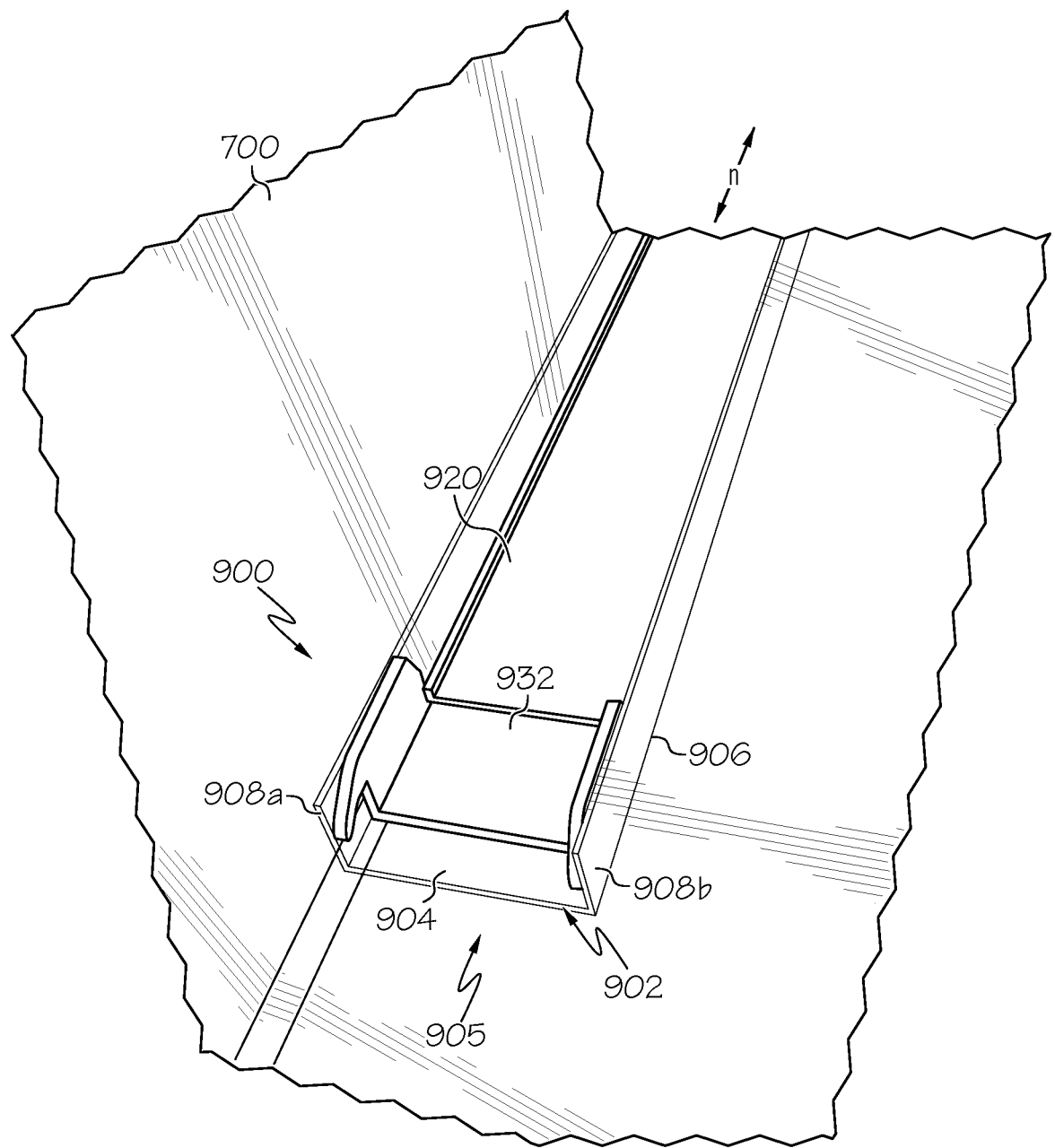
FIG. 19A1

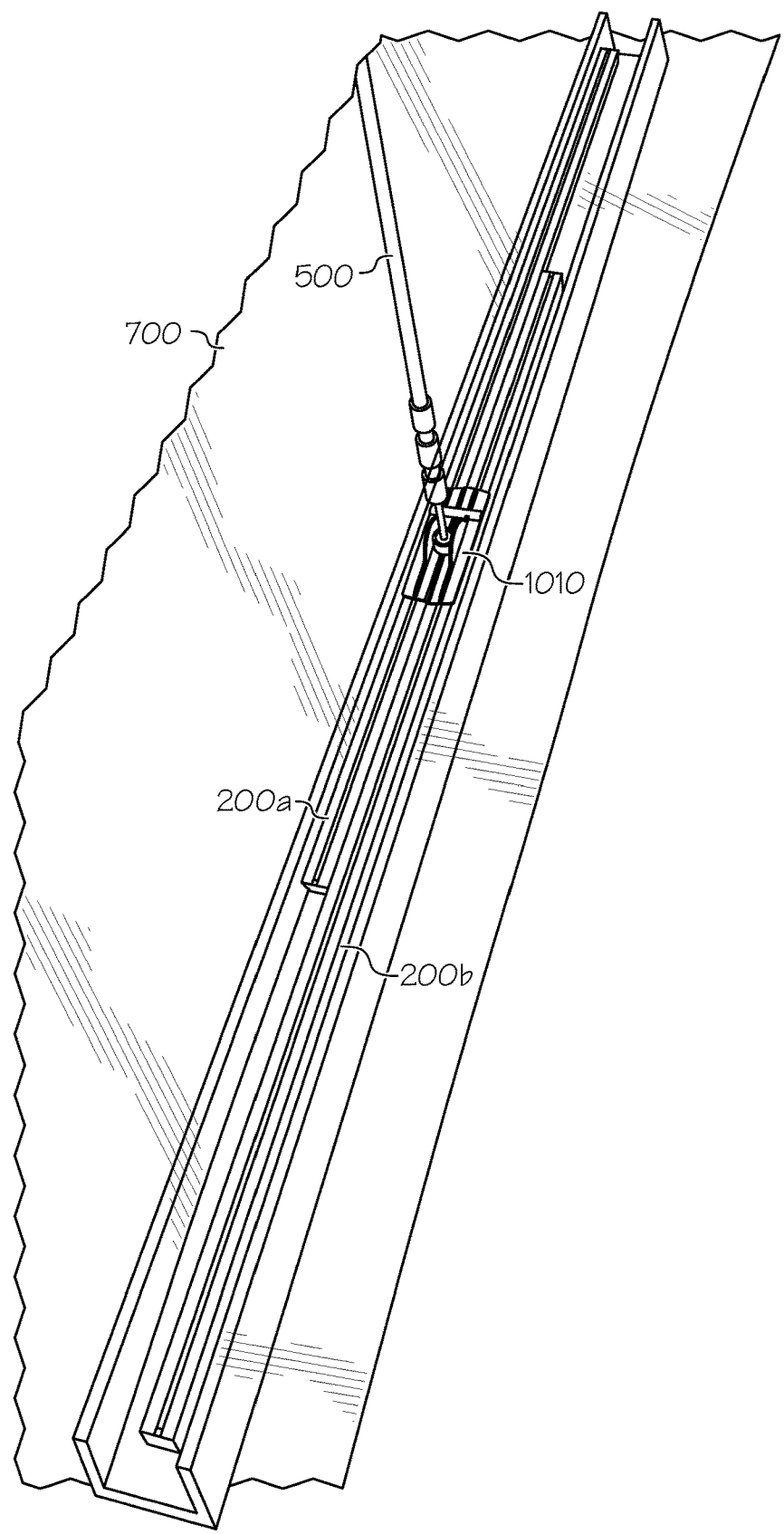
FIG. 19A2

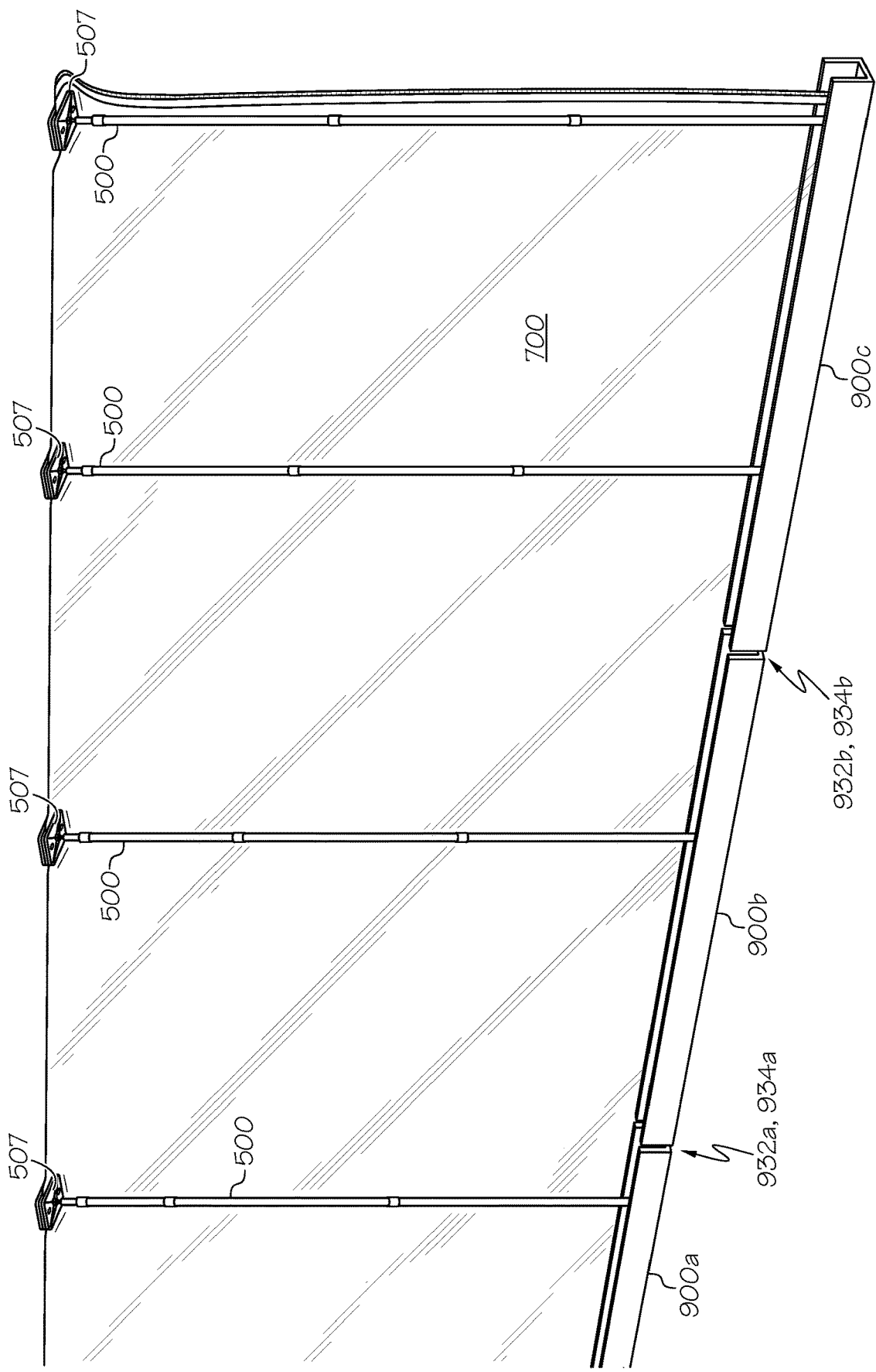

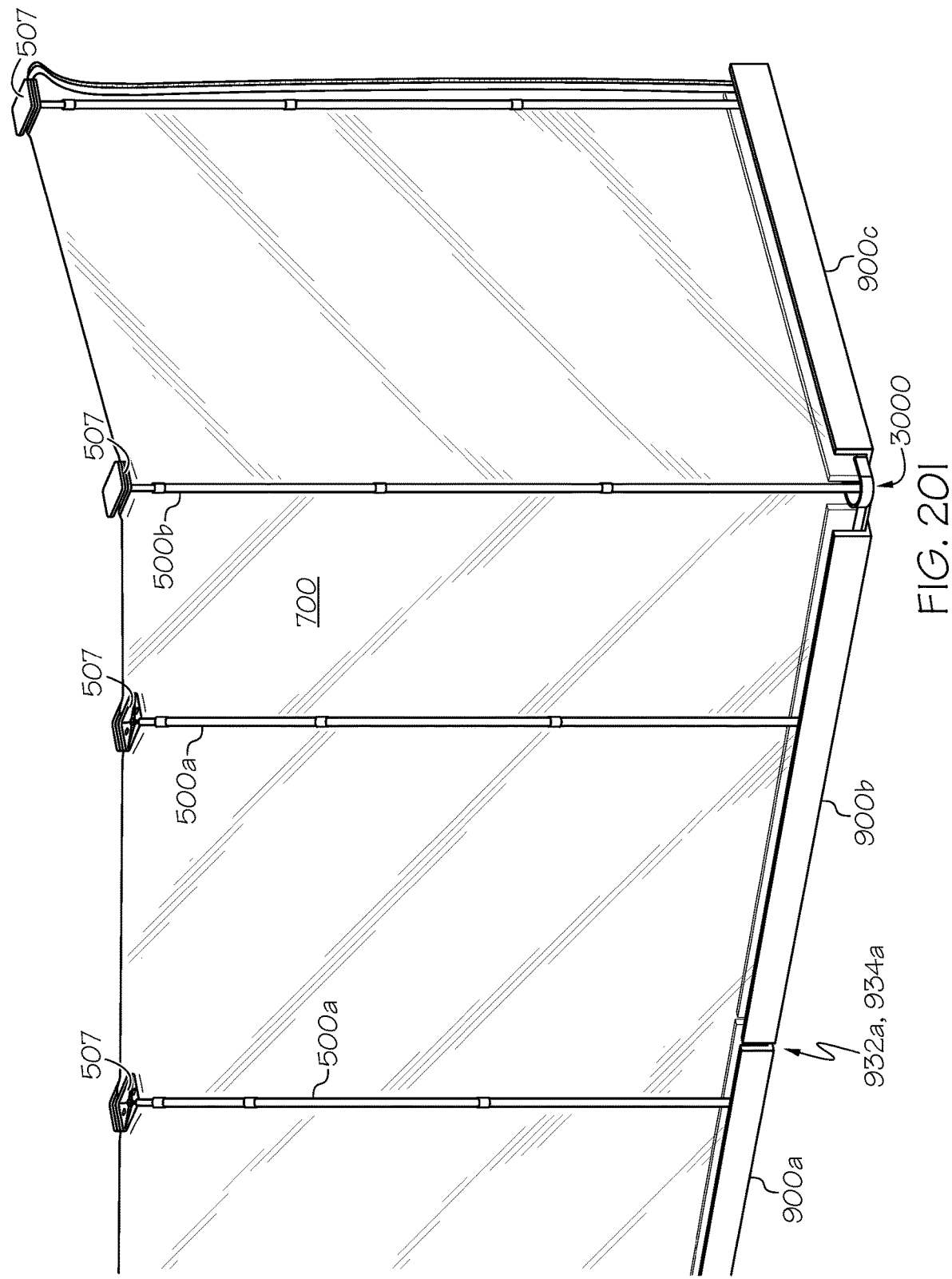

RAIL END MOUNT AND METHODS OF USE

RELATED APPLICATIONS

This application claims the benefit of:

U.S. Provisional Application Ser. No. 62/791,306, filed Jan. 11, 2019;

U.S. Provisional Application Ser. No. 62/893,465, filed Aug. 29, 2019;

U.S. Provisional Application Ser. No. 62/791,233, filed Jan. 11, 2019; and

U.S. Provisional Application Ser. No. 62/931,380, filed Nov. 6, 2019; the content of each being incorporated herein by reference, in its entirety.

This application is related to:

U.S. Pat. No. 5,924,469, issued on Jul. 20, 1999;
U.S. Pat. No. 6,564,512, issued on May 20, 2003;
U.S. Pat. No. 7,073,758, issued on Jul. 11, 2006;
U.S. Pat. No. 7,533,712, issued on May 19, 2009;
U.S. Pat. No. 7,658,219, issued on Feb. 9, 2010;
U.S. Pat. No. 7,670,401, issued on Mar. 2, 2010;
U.S. Pat. No. 7,743,512, issued on Jun. 29, 2010;
U.S. Pat. No. 7,717,382, issued on May 18, 2010;
U.S. Pat. No. 9,115,539, issued on Aug. 25, 2015;
U.S. Pat. No. 9,657,514, issued on May 23, 2017;
U.S. Pat. No. 9,663,962, issued on May 30, 2017;
U.S. Pat. No. 10,081,955, issued on Sep. 25, 2018;
U.S. Pat. No. 10,174,514, issued on Jan. 8, 2019;
U.S. Pat. No. 10,428,539, issued on Oct. 1, 2019;

Patent Cooperation Treaty Application Serial Number PCT/US16/068493, filed on Dec. 23, 2016, PCT Publication No. WO 2017/117042, published Jul. 6, 2017; and U.S. patent application Ser. No. 15/822,423, filed on Nov. 27, 2017, United States Publication No. 2018-0154293, published Jun. 7, 2018; the content of each being incorporated herein by reference in its entirety.

BACKGROUND

Partition systems are often employed to isolate portions of a building or room, by serving as a barrier to dust, noise, light, odors, and other intrusions. In construction zones, partitions are useful for protecting a clean area from a work area, for example, protecting an area where furniture and rugs are temporarily stored from an area where wood floors are being refinished.

Workers at construction sites often use rudimentary techniques for installing partitions. Some simply nail, screw, or staple the curtain or partition material to the floor, ceiling, and abutting walls, resulting in damage to their surfaces. Other workers setting up a barrier employ tape or other adhesives which could result in paint being removed from the wall or the adhesive material being difficult to remove. The tape usually fails to stick, but, if it does stick, as the tape is removed, paint can pull off with the tape, or adhesive is left behind.

U.S. Pat. Nos. 5,924,469 and 7,658,219, incorporated herein by reference, disclose partition mount systems that address these limitations. These systems utilize a plurality of spring-biased pole mounts that secure a curtain or drape material, such as plastic, cloth, and the like, to form a temporary partition. The disclosed system is a "clean" system configured to be installed and removed without damaging or otherwise marking the ceiling, floor or walls in the construction zone. Assembly is easy and fast and can be accomplished by a single individual. In certain applications, however, a sag, or gap, may be present in the curtain along a pole next to a wall, ceiling, door frame, or other abutting surface, compromising the effectiveness of the installation.

U.S. Pat. No. 7,533,712, the content of which is incorporated herein by reference, discloses a mount system that mitigates or eliminates sag, or gaps, between an installed curtain and an abutting surface such as a wall or ceiling. The system accomplishes this in a manner that avoids permanent damage to the wall or ceiling surface. The system includes a head with an elongated body and a compressible curtain interface. A pole, for example, as described in connection with U.S. Pat. Nos. 5,924,469 and 7,658,219, may be configured to urge the head and the curtain to the abutting surface, thereby eliminating a sag, or gap in the curtain.

In certain configurations, a pole supporting the elongated body of the head may be positioned so as to inhibit human movement. In addition, a single, elongated head may not be long enough to eliminate all of the sag in the partition system, and, thus, multiple poles and corresponding elongated heads may be required.

SUMMARY

In an aspect, a mount, comprises a base having opposed upper and lower surfaces; at least one channel on the upper surface of the base extending in a first horizontal direction, wherein the at least one channel comprises a head-mounting feature constructed and arranged to removably retain a rail head in the first horizontal direction; at least one curtain attachment mechanism constructed and arranged to secure a curtain, wherein the at least one curtain attachment mechanism extends in a direction that is transverse to the first horizontal direction; and a socket at the lower surface of the base that is constructed and arranged to interface with a pole.

In some embodiments, the base comprises a substantially flat surface.

In some embodiments, the base comprises a curved surface.

In some embodiments, the mount further comprises at least one head mounting feature.

In some embodiments, the head-mounting feature comprises at least one retention tab.

In some embodiments, the head-mounting feature comprises at least two retention tabs constructed and arranged at opposite sides of the at least one channel.

In some embodiments, the head mounting feature comprises multiple pairs of retention tabs opposite each other along the channel, and wherein a spacing between a first one of the pairs of retention tabs is different than a spacing between a second one of the pairs of retention tabs.

In some embodiments, the head-mounting feature is constructed and arranged to slidingly retain the rail head.

In some embodiments, the at least one channel comprises a channel stop constructed and arranged to impede motion of the rail head in the first horizontal direction.

In some embodiments, the mount further comprises a lock constructed and arranged to secure a rail head in the at least one channel.

In some embodiments, the mount further comprises an end cap constructed and arranged to couple with the end of the rail head.

In some embodiments, the mount further comprises an end cap constructed and arranged to couple with an end of the rail head, wherein the end cap has grooves on opposing sides aligned with mounting grooves of the rail head.

In some embodiments, the at least one curtain attachment mechanism comprises a curtain head coupled to the base and a curtain clip removably coupled to the curtain head.

In some embodiments, the curtain head that is constructed and arranged to mate with the curtain clip.

In some embodiments, the curtain head comprises a flat surface.

In some embodiments, the curtain head has a substantially rectangular shape.

In some embodiments, the curtain head has a substantially square shape.

In some embodiments, the curtain head comprises at least one extension constructed and arranged to secure the curtain clip to the curtain head.

In some embodiments, the curtain head is fixed in position with respect to the base.

In some embodiments, the curtain head is constructed and arranged to have an adjustable positional relationship with the base.

In some embodiments, the curtain head is constructed and arranged to pivot relative to the base.

In some embodiments, the curtain head is constructed and arranged to form a universal joint with the base.

In some embodiments, the curtain head is constructed and arranged to form a cylindrical joint with the base.

In some embodiments, the curtain clip comprises a flat surface that is constructed and arranged to mate with the curtain head.

In some embodiments, the curtain clip has a substantially rectangular shape.

In some embodiments, the curtain clip has a substantially square shape.

In some embodiments, the curtain clip comprises at least one curtain claw that is constructed and arranged to secure the curtain clip to the curtain head.

In some embodiments, the curtain claw comprises a neck that extends below the curtain clip and a lip that extends in a direction transverse to a direction of extension of the neck.

In some embodiments, the curtain clip comprises at least one pair of opposed curtain claws, and wherein a first distance between the necks of the curtain claws, a second distance between the lips of the curtain claws and a first width of the curtain head are determined so that the curtain clip can be seated and removed only when positioning the curtain clip at an acute angle relative to the curtain head.

In some embodiments, the curtain claw further comprises a clip friction pad that is constructed and arranged to provide friction between a top of the curtain clip and another surface.

In some embodiments, the curtain clip is constructed and arranged to mate with the curtain head in at least two different orientations.

In some embodiments, the curtain attachment mechanism is positioned at an distal end thereof.

In some embodiments, an upper position of the curtain attachment mechanism in a first vertical direction is lower than an upper position of the rail head in the first vertical direction when the rail head is seated in the at least one channel.

In some embodiments, the at least one curtain attachment mechanism extends upward from the upper surface of the base from a position that is offset from the at least one channel along the first horizontal direction.

In some embodiments, the at least one curtain attachment mechanism extends upward from the upper surface of the base from a position that is offset from the at least one channel along a second horizontal direction normal to the first horizontal direction.

In some embodiments, at least one curtain attachment mechanism extends upward from the upper surface of the base from a position that is offset from the at least one channel along the first horizontal direction and at least one curtain attachment mechanism extends upward from the upper surface of the base from a position that is offset from the at least one channel along a second horizontal direction normal to the first horizontal direction.

In some embodiments, the at least one curtain attachment mechanism extends upwards from the upper surface of the base from a position that is offset from the center of the base along the first horizontal direction.

In some embodiments, a position of the socket is offset from a center of the base along the first horizontal direction.

In some embodiments, the socket mates with a ball of a pole and the socket has a depth that is greater than a height of the ball of the pole.

In some embodiments, the socket surrounds, in a horizontal direction the ball of an inserted pole.

In some embodiments, the socket extends in a direction transverse to the base of the mount.

In some embodiments, the socket is constructed and arranged to form a fixed connection with an inserted pole.

In some embodiments, the socket is constructed and arranged to form a universal joint with an inserted pole.

In some embodiments, the socket is constructed and arranged to form a cylindrical joint with an inserted pole.

In some embodiments, the mount further comprises at least one neck retainer that extends below the lower surface of the base.

In some embodiments, the socket mates with a ball of a pole, wherein the socket is constructed and arranged such that the ball of an inserted pole can be readily removed from the socket.

In some embodiments, a position of the at least one channel relative to the base is adjustable.

In another aspect, a bridge comprises: a base at a proximal end of the bridge constructed and arranged to interface with a pole; a connector at a distal end of the bridge constructed and arranged to interface with a socket; and a neck between the base and the connector.

In some embodiments, the base extends in a first horizontal direction normal to a direction of extension of the neck, and wherein the base is curved along a second horizontal direction orthogonal to the direction of extension of the neck and the first horizontal direction.

In some embodiments, the bridge further comprises a bridge friction pad on the base constructed and arranged to create friction with a pole at the interface.

In some embodiments, the friction pad comprises at least one groove constructed and arranged to enhance the friction.

In some embodiments, the at least one groove is raised relative to a surface of the pad.

In another aspect, a method of installing a dust partition system comprise inserting a first end of a first rail head into a coupler. The coupler comprises: a first channel comprising a first axis of extension in a first horizontal direction, the first channel comprising a first set of head-mounting features constructed and arranged to retain the first rail head to the coupler while permitting movement of the first rail head relative to the coupler in the first horizontal direction; and a second channel comprising a second set of head-mounting features constructed and arranged to retain a second rail head to the coupler while permitting movement of the second rail head relative to the coupler in a second horizontal direction. A first end mount is inserted at an end of the first rail head. A second end mount is inserted at an end of the second rail head. Each of the first and second end mounts comprise: a base having opposed upper and lower surfaces; at least one channel on the upper surface of the base, the at least one channel comprising a head-mounting feature constructed and arranged to removably retain the respective first or second rail head; and at least one curtain attachment mechanism constructed and arranged to secure a curtain, wherein the at least one curtain attachment mechanism extends in a transverse direction from the base; and a socket at the lower surface of the base that is constructed and arranged to interface with a pole. The method further comprises adjusting positions of the first and second rail heads relative to the coupler to thereby adjust a distance between the first and second end mounts; attaching a curtain to the first and second rail end mounts; mounting a first pole to the coupler; raising the coupler, first and second rail heads, first rail end mount, second rail end mount and curtain with a first pole; inserting a second pole into the socket on the first rail end mount; inserting a third pole into the socket on the second rail end mount; and removing the first pole.

In some embodiments, raising the coupler, first and second rail heads, first rail end mount, second rail end mount and curtain with the first pole urges the curtain against a neighboring surface.

In some embodiments, the first and second rail heads each include compressible pads that compress the curtain against a neighboring surface.

In an aspect, a system comprises: a floor rail extending in a first horizontal direction of extension, the floor rail comprising a channel extending along the length of the floor rail in the first horizontal direction of extension; and a curtain positioned between an upper surface of the floor rail.

In some embodiments, the system further comprises a pole platform positioned in the channel, wherein the curtain is positioned between the upper surface of the floor rail and a lower surface of the pole platform.

In some embodiments, a width of the pole platform in a second horizontal direction perpendicular to the first horizontal direction is greater than one half a width of the channel in the second horizontal direction.

In some embodiments, a width of the pole platform in a second horizontal direction perpendicular to the first horizontal direction is greater than one quarter a width of the channel in the second horizontal direction.

In some embodiments, the system further comprises a pole positioned on the pole platform, the pole extending in a third direction of extension transverse to the first and second horizontal directions of extension.

In some embodiments, the floor rail further comprises a first connector portion positioned at a first end of the channel.

In some embodiments, the first connector portion is moveable relative to the floor rail.

In some embodiments, the first connector portion is moveable in the first horizontal direction.

In some embodiments, the floor rail further comprises a second connector portion at a second end of the channel opposite the first end.

In some embodiments, the second connector portion is moveable relative to the floor rail.

In some embodiments, the second connector portion is fixed relative to the floor rail.

In some embodiments, the second connector portion is constructed and arranged to mate with the first connector portion of a neighboring floor rail to thereby secure positions of the neighboring floor rails.

In some embodiments, the channel is curved.

In some embodiments, the system further comprises at least one rail head.

In some embodiments, a width of the channel in a second horizontal direction perpendicular to the first horizontal direction is at least as wide as a width of the at least one rail head.

In some embodiments, a width of the channel in a second horizontal direction perpendicular to the first horizontal direction is at least as wide as a combined width of two rail heads.

In some embodiments, the floor rail further comprises at least one side wall at a side of the channel.

In some embodiments, at least one of the at least one side wall comprises at least one lip.

In some embodiments, the at least one lip comprises a friction material.

In some embodiments, the floor rail comprises a friction material at a lower surface.

In some embodiments, the system further comprises a rail clip positioned at the channel of the floor rail, the rail clip comprising: at least one side panel; and a base coupled to the at least one side panel.

In some embodiments, the at least one side panel extends in a direction transverse to the direction of extension of the base.

In some embodiments, the rail clip is coupled to the floor rail via an attachment mechanism.

In some embodiments, the system further comprises a curtain positioned between the rail clip and the floor rail.

In some embodiments, the rail clip comprises at least one protrusion.

In some embodiments, the floor rail comprises at least one hole constructed and arranged to couple with the at least one protrusion.

In some embodiments, the floor rail comprises at least one side rail, and wherein the at least one hole is at the at least one side rail.

In some embodiments, the at least one protrusion is at the at least one side panel of the rail clip.

In some embodiments, the at least one protrusion is at the base of the rail clip.

In some embodiments, at least one of the at least one side panel is bendable.

In some embodiments, at least one of the at least one side panel is elastically deformable.

In an aspect, a system, comprises: a first floor rail, comprising a first channel extending along the length of the first floor rail; a first connector portion positioned at a first end of the first floor rail; a second floor rail, comprising a second channel extending along the length of the second floor rail; and a second connector portion positioned at a first end of the second floor rail, wherein the first connector portion of the first floor rail and the second connector portion of the second floor rail are constructed and arranged to mate.

In some embodiments, the mating of the first connector portion of the first floor rail and the second connector portion of the second floor rail secures relative positions of the first and second floor rails.

In an aspect, a system comprises: a floor rail, comprising a channel extending along the length of the floor rail; a rail clip positioned at the channel of the floor rail, the rail clip comprising: at least one side panel; and a base coupled to the at least one side panel; and a curtain positioned between an upper surface of the floor rail and a lower surface of the rail clip.

In some embodiments, the at least one side panel extends in a direction traverse to the direction of extension of the base.

In some embodiments, the rail clip is coupled to the floor rail via an attachment mechanism.

In some embodiments, the system further comprises a curtain positioned between the rail clip and the floor rail.

In some embodiments, the rail clip comprises at least one protrusion.

In some embodiments, the floor rail comprises at least one hole constructed and arranged to couple with the at least one protrusion.

In some embodiments, the floor rail comprises at least one side rail, and the at least one hole is at the at least one side rail.

In some embodiments, the at least one protrusion is at the at least one side panel of the rail clip.

In some embodiments, the at least one protrusion is at the base of the rail clip.

In some embodiments, the at least one of the at least one side panel is bendable.

In an aspect, a corner mount comprises: a first portion comprising a first channel that extends along a first axis of elongation; a second portion comprising a second channel that extends along a second axis of elongation; and a connection region constructed and arranged to couple the first portion to the second portion, wherein the first axis of elongation is transverse the second axis of elongation.

In some embodiments, the first portion further comprises one or more head-mounting features.

In some embodiments, the corner mount further comprises a rail head coupled to the one or more head-mounting features.

In some embodiments, the corner mount further comprises a pad coupled to the second portion.

In some embodiments, the connection region comprises one or more joints.

In some embodiments, the first axis of elongation and the second axis of elongation lie at an obtuse angle relative to each other.

BRIEF DESCRIPTION OF THE DRAWINGS

The foregoing and other features and advantages of the inventive concepts will be apparent from the more particular description of embodiments of the inventive concepts, as illustrated in the accompanying drawings in which like reference characters refer to the same parts throughout the different views. The drawings are not necessarily to scale, emphasis instead being placed upon illustrating the principles of the inventive concepts.

FIGS. 2A and 2B are perspective views of alternative embodiments of rail end mounts in accordance with embodiments of the present inventive concepts. FIG. 2B1 is a close-up top view of the rail end mount embodiment of FIG. 2B in accordance with embodiments of the present inventive concepts.

FIGS. 9A1 through 9E1 are sequential perspective views and FIGS. 9A2 through 9E2 are sequential side views, illustrating a mounting sequence for mounting a curtain between a curtain clip and a curtain head in accordance with the present inventive concepts.

FIG. 19A1 is a perspective view of an embodiment of a floor rail for a partition system, in accordance with aspects of the present inventive concepts.

FIG. 19A2 is a perspective view of an embodiment of a floor rail and two rail heads, in accordance with aspects of the present inventive concepts.

FIGS. 20H and 20I are perspective views of installations of a dust partition system employing floor rail embodiments, in accordance with the present inventive concepts.

DETAILED DESCRIPTION OF EMBODIMENTS

Figure 1:
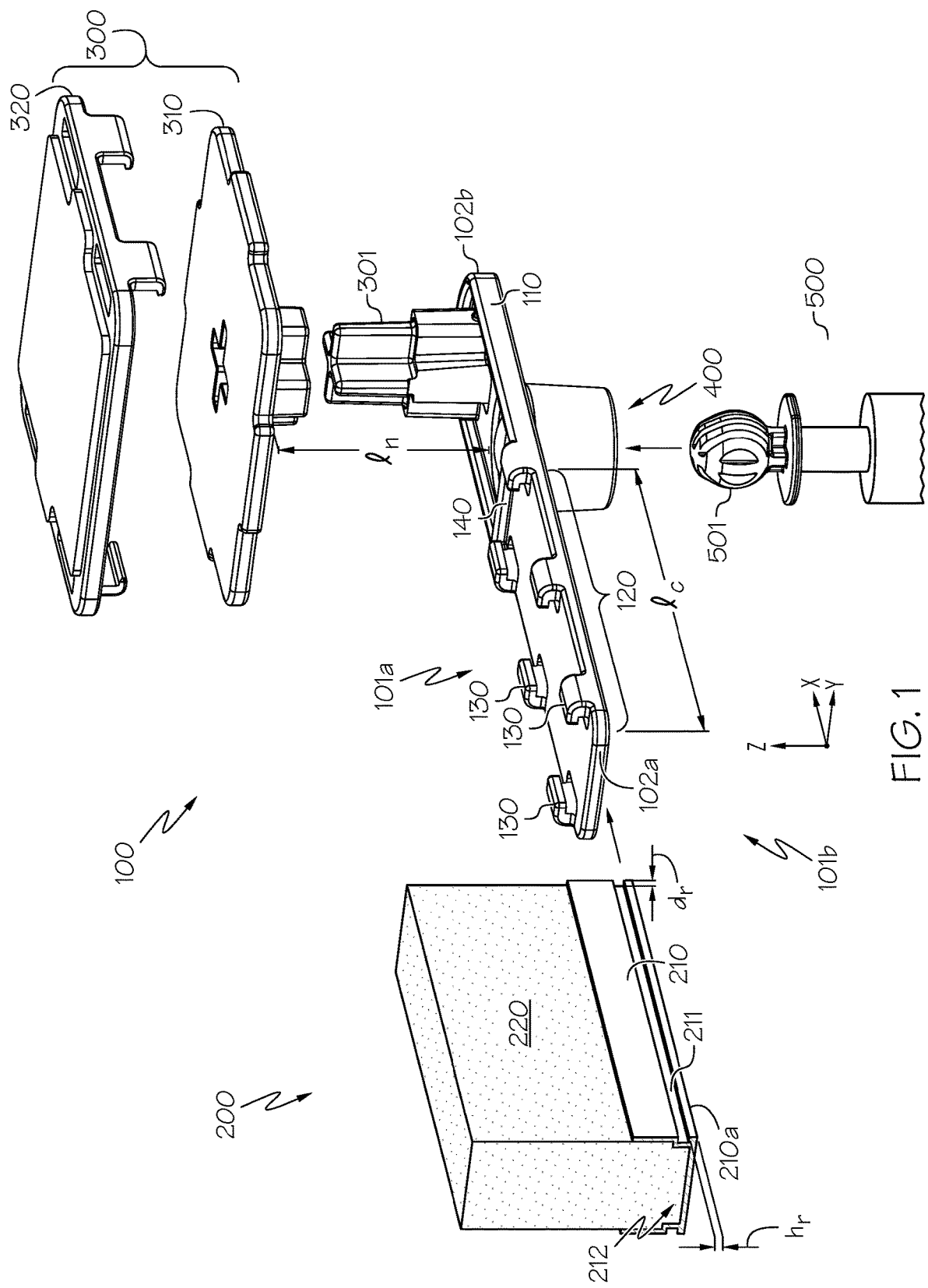
FIG. 1 is an exploded perspective view of a rail end mount in accordance with embodiments of the present inventive concepts.

Various example embodiments will be described more fully hereinafter with reference to the accompanying drawings, in which some example embodiments are shown. The present inventive concepts may, however, be embodied in many different forms and should not be construed as limited to the example embodiments set forth herein.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concepts.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. A first element may be said to be "transverse" to a second element if the first element has a direction of extension that is not parallel to the direction of extension of the second element.

The terminology used herein is for the purpose of describing particular example embodiments only and is not intended to be limiting of the present inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in such shapes.

FIG. 1 is an exploded perspective view of a rail end mount 100 in accordance with embodiments of the present inventive concepts. The rail end mount 100 includes a base 110 having opposed upper 101a and lower surfaces 101b. In some embodiments the base 110 may be substantially flat and in other embodiments the base may be curved. At least one channel 120 on the upper surface of the base 110 extends in a first horizontal direction x. The at least one channel 120 is elongated in the first horizontal direction x and comprises at least one head-mounting feature 130 that is constructed and arranged to removably retain a rail head 200. In some embodiments, the rail head 200 can take the form of a rail head as described in connection with U.S. Pat. No. 7,533,712, the content of which is incorporated herein by reference. In some embodiments, a lower end portion of the rail head 200 may slide through the at least one channel 120 of the rail end mount 100 to couple the rail head 200 to the rail end mount 210.

The rail head 200 may include a rail 210 and a pad 220. In some embodiments, the pad 220 comprises a compressible foam block. In other embodiments, the pad 220 may comprise a resilient or pliable material that is compressible, for example, a rubber, foam, or plastic member, an air-filled bag, a brush, or the like. In some example, the pad may comprise low-density foam or low-density rubber. Other resilient or pliable materials may be equally applicable to the principles of the present inventive concepts. In some embodiments, the rail 210 comprises, for example, an extruded member formed of plastic, aluminum, alloy, graphite, wood, or the like. In some embodiments, the rail 210 may have a generally U-shaped cross-sectional profile including a cavity 212 serving as a base or seat for the pad 220. The pad 220 can be mounted in the cavity 212 of the rail 210, and may be press-fit, bonded, or otherwise secured, into place. In some embodiments, the pad 220 extends from an upper surface of the rail 210. The pad 220 may be, for example, rectangular or cylindrical in shape and having a certain degree of compressibility so as to conform to an abutting surface, while still exhibiting resiliency and shape memory. The rail 210 may further include at least one horizontal groove 211 at each outer side surface for interfacing with the at least one head-mounting feature 130 of the channel 120 of the rail end mount 100.

In some embodiments, the rail end mount 100 further comprises at least one curtain attachment mechanism 300 extending in the first horizontal direction x and in a second horizontal direction y that is transverse to the first horizontal direction x of extension of the base. In some embodiments, the at least one curtain attachment mechanism 300 is attached to the base 110 and extends from the base 110 in the vertical direction z, for example as shown in the embodiment depicted in FIG. 1. In some embodiments, the curtain attachment mechanism 300 comprises a curtain head 310 and a curtain clip 320 removably coupled to the curtain head 310. The curtain head 310 and the curtain clip 320 are constructed and arranged to secure a portion of a curtain therebetween. Various curtain attachment mechanism arrangements are described in connection with U.S. Pat. Nos. 5,924,469 and 7,658,219, the contents of which are incorporated herein by reference.

In some embodiments, the rail end mount 100 further comprises a socket 400 at the lower surface 101b of the base 110 that is constructed and arranged to interface with a pole 500. In some embodiments, the socket 400 is constructed and arranged to interface with a pole 500, for example, of the type as described in connection with U.S. Pat. Nos. 5,924,469 and 7,658,219, the contents of which are incorporated herein by reference. In this manner, the pole 500, when positioned in the socket 400, may be configured to raise and urge the rail end mount 100, the rail head 200, and an installed curtain against an abutting surface. In some embodiments, the pole 500 may be spring-loaded to be thereby compressible, along with the rail head 200 and rail end mount 100, between two surfaces of a room or hallway of a building, as described in connection with U.S. Pat. Nos. 5,924,469 and 7,658,219, incorporated herein by reference.

In some embodiments, the at least one channel 120 on the upper surface 101a of the base 110 is constructed and arranged such that the rail head 200 may be inserted, located, and adjusted in position relative to the base 110. In some embodiments, the length $l_c$ of the channel 120 in the direction of the first horizontal axis x may be substantially less than the length of the rail head 200 in the direction of the first horizontal axis x. In other embodiments, the length $l_c$ of the channel may be substantially similar to the length of the rail head 200. In other embodiments, the length $l_c$ of the channel may be longer than the length of the rail head 200.

In some embodiments, the length of the channel $l_c$ is determined as a distance between a first end 102a of the base 110, the first end 102a being opposite a position at which the curtain attachment mechanism 300 is coupled to the base 110, and a channel stop 140 which operates as a stop to limit the degree of insertion of the rail head 200 into the base 110. In some embodiments, the channel length $l_c$ corresponds with the resultant length of coupling between the end of the rail head 200 and the rail end mount 100 when the rail head 200 is fully inserted into the rail end mount 100 so as to be hindered from further insertion by the channel stop 140.

In some embodiments, the rail end mount 100 includes at least one head-mounting feature 130 constructed and arranged to removably retain the rail head 200 in the channel 120. In some embodiments, the at least one head-mounting feature 130 is constructed and arranged to slidingly retain the rail head 200, and, in particular, retain an end region of the rail head 200. In some embodiments, the head-mounting feature 130 comprises one or more retention tabs. In the embodiment of FIG. 1, the at least one head-mounting features comprise retention tabs 130 that are constructed and arranged on opposite sides of the channel 120 so as to oppose and face each other. In this embodiment, an end portion of the rail head 200 is inserted into the channel 120 at first end 102a such that the horizontal grooves 211 of the rail 210 of the rail head 200 slide freely in the channel 120 in the first horizontal direction x relative to the opposed pairs of retention tabs 130. At the same time, the retention tabs 130 capture the grooves 211 of the rail 210 of the rail head 200 to prevent the rail head 200 from being released from the base 110 in the vertical direction z and to prevent the rail head 200 from shifting or moving in the second horizontal direction y.

While the present embodiment of FIG. 1 illustrates the use of three pairs of opposing retention tabs 130 per channel 120, any of a number of suitable pairs of retention tabs 130 may be employed, for example, as few as a single, elongated, pair of retention tabs 130a may be employed as shown in FIG. 2A. In other embodiments, two pairs of opposed retention tabs 130 four pairs of opposed retention tabs 130, or more than four pairs of opposed retention tabs 130 may be employed to form the channel 120. In other embodiments, the retention tabs 130b, while positioned on opposite sides of the channel 120, do not face each other at the same position along the first horizontal direction x, but instead may alternate in horizontal position, as shown in FIG. 2B, and the close-up top view of FIG. 2B1. In such an embodiment, some or all of the retention tabs 130b may alternate in horizontal position in the first horizontal direction x along the channel 120, while others 130c may be positioned at the same horizontal position in the first horizontal direction x along the channel 120 and therefore face each other.

In some embodiments, the rail end mount 100 comprises a channel stop 140 at a first end, referred to herein as a proximal end, of the channel 120. In some embodiments, the channel stop 140 is constructed and arranged to impede or limit the motion of the rail head 200 so as to locate the position of the rail head 200 when fully inserted in the channel 120. In the present embodiment shown in FIG. 1, the channel stop 140 is located at a position on the base 110 that is at a first side of the socket 400 along the first horizontal axis x, while the curtain attachment mechanism 300 is located at a position on the base 110 that is at a second side of the socket 400 along the first horizontal axis x. In the present embodiment, the channel stop 140 includes a tab or suitable feature that rises above the base 110 so as to interfere with a lower distal end of the rail 210 of the rail head 200 when inserted. Other positions and configurations of the channel stop 140 are equally applicable to the principles and objectives of the present inventive concepts.

In some embodiments, the retention tabs 130 can be constructed and arranged to snugly capture the end of the rail head 200. Such a configuration mitigates or prevents inadvertent release of the rail head 200 from the base 110. In some embodiments, the retention tabs 130 can be formed of a resilient material that is elastically deformable so as to maintain a pressure or compressive force on the sidewalls and/or grooves 211 of a rail 210 of an inserted rail head 200. In other embodiments, the retention tabs 130 can comprise a friction material that induces a friction force on the sidewalls and/or grooves 211 of a rail 210 of an inserted rail head 200. With reference to the embodiment of FIG. 3A, in another embodiment, the retention tabs 130 can be arranged so that the spacing between the at least one head-mounting feature 130 and the rail head 200 is different at different positions in the channel 120. As shown in the present example, in some embodiments, the head-mounting features 130 comprise pairs of retention tabs 130a, 130b, 130c that face one another at opposite sides of the channel 120. In these embodiments, the spacing between opposing retention tabs 130a, 130b, 130c may vary over the channel 120. For example, the distance between a first, distal-most set of retention tabs 130a may be a first distance d1, the distance between a second, intermediate set of retention tabs 130b may be a second distance d2, and the distance between a third, set of retention tabs 130c proximal the channel stop 140 may be a third distance d3. In some embodiments, the third distance d3 may be less than the second distance d2. In some embodiments the second distance d2 may be less than or equal to the first distance d1. In this manner, the progressively decreased spacing between opposing retention tabs 130a, 130b, 130c places progressively increased interference pressure on the rail head 200, and in particular, on the grooves 211 of the rail head 200, to thereby increasingly imparting a force that secures the rail head 200 in place as it is seated further into position toward, and eventually against, the rail stop 140.

Figure 3A:
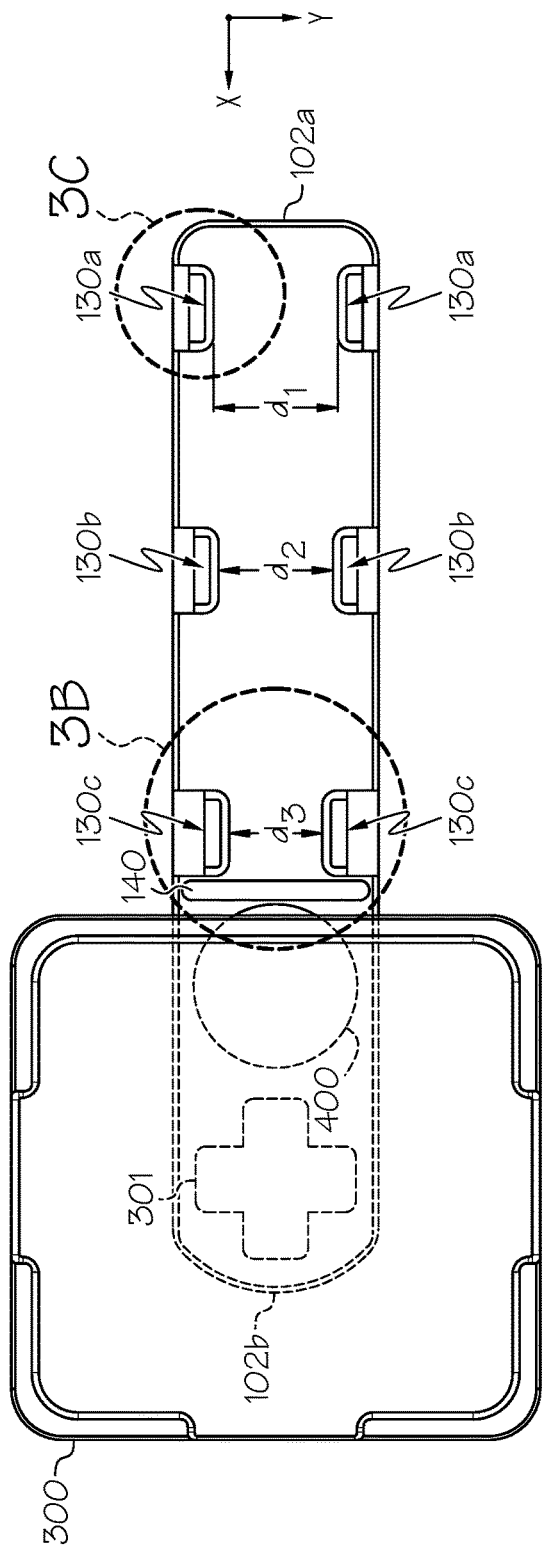
FIGS. 3A, 3B and 3C are a top view, close-up top view and close-up perspective view respectively of a rail end mount in accordance with embodiments of the present inventive concepts.
Figure 3C:
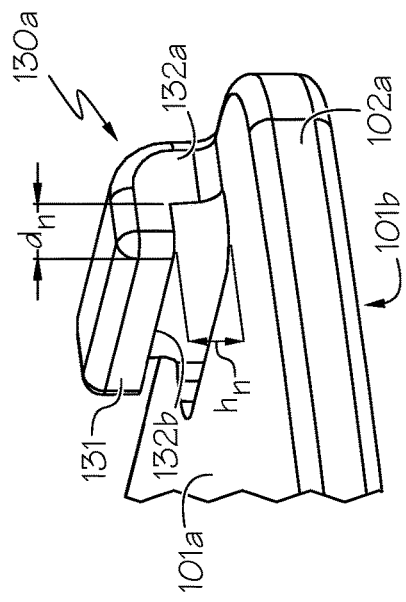
Figure 3B:
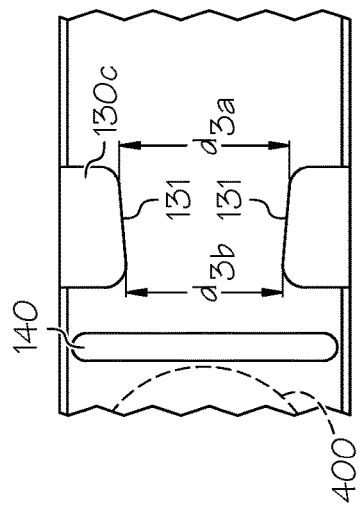

FIG. 3B is a close-up top view of the mount of FIG. 3A in accordance with embodiments of the present inventive concepts. In the embodiment of FIG. 3B, one or both of the set of retention tabs 130c most proximal the channel stop 140, in this case the third retention tabs 130c, have a tapered profile at their respective opposed rail faces 131. For example, the distal ends of the rail faces 131 of the retention tabs 130c are spaced at a first distance d3a, while the proximal ends of the rail faces 131 of the retention tabs 130c are spaced at a second distance d3b. In some embodiments, the second distance d3b is less than the first distance d3a. In this manner, the tapered profile between the proximal set of retention tabs 130c places progressively increased interference pressure on the rail head 200, and, in particular, on the opposed grooves 211 of the rail head 210, to thereby secure the rail head 200 in place.

FIG. 3C is a close-up perspective view of the retention tab 130a of FIG. 3A in accordance with embodiments of the present inventive concepts. In this view, it can be seen that the present embodiment of the retention tab 130a includes a leg 132a that extends from the base 110, and a neck 132b that extends from an upper region of the leg 132a. The height of the neck hn relative to the upper surface 101a of the base 110 corresponds with the height of the rail groove hr relative to a lower surface 210a of the rail 210, as shown in FIG. 1. Similarly, the length of the neck dn relative to the leg 132a corresponds with a depth of the rail groove dr, as shown in FIG. 1.

Figure 4A:
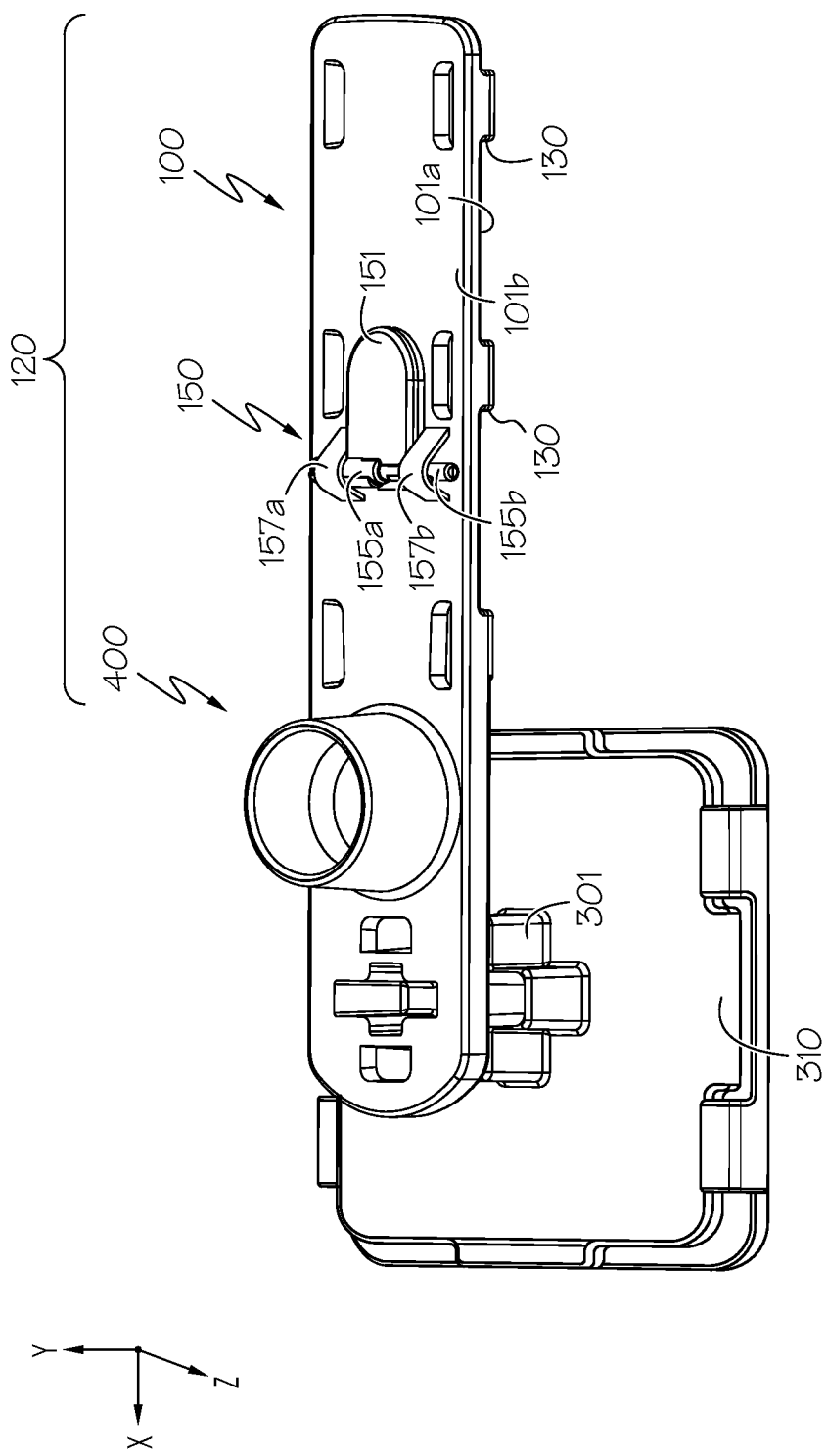
FIG. 4A is a bottom perspective view of a rail end mount in accordance with embodiments of the present inventive concepts.
Figure 4B:
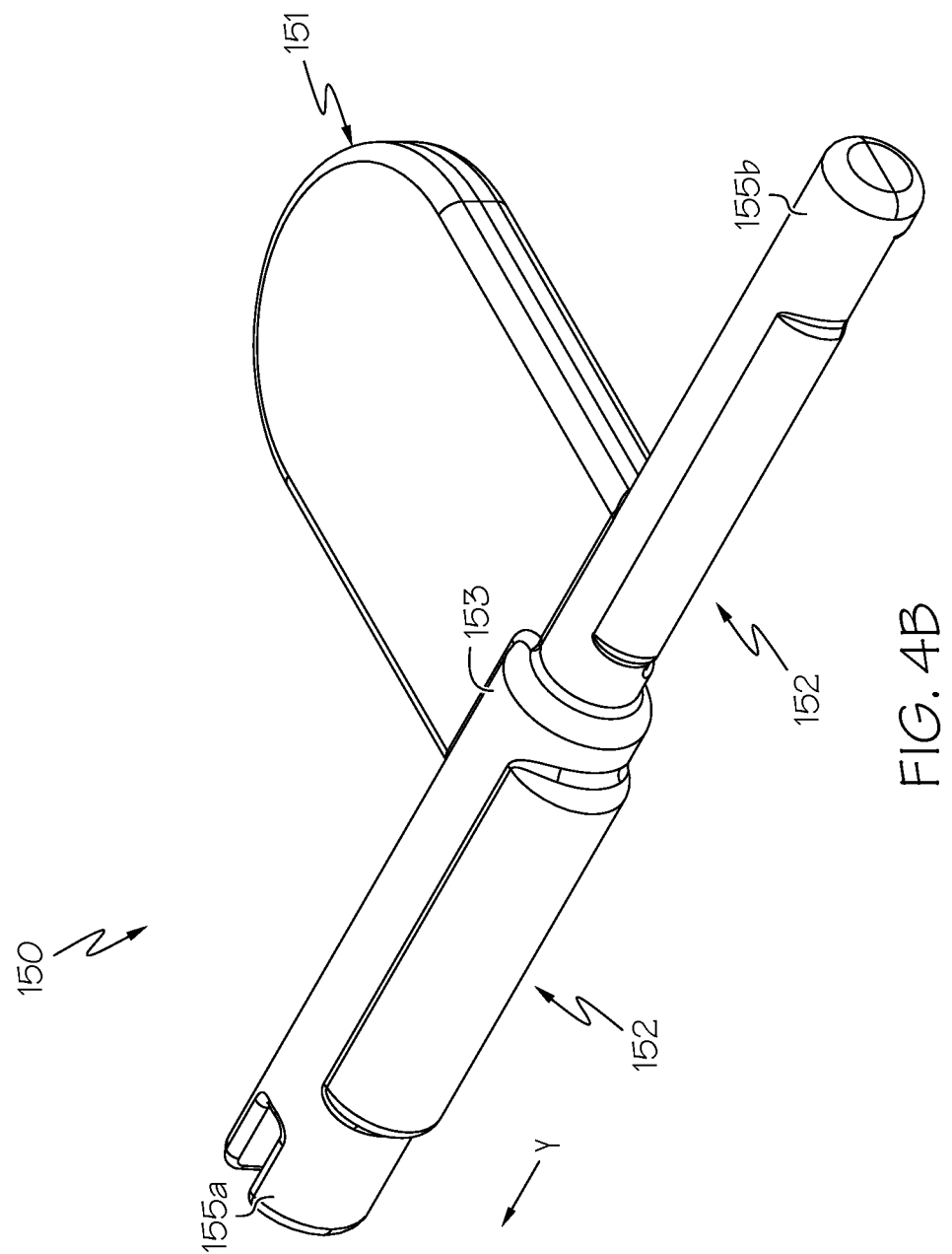
FIG. 4B is a perspective view of a locking mechanism for a rail end mount in accordance with embodiments of the present inventive concepts.

FIG. 4A is a bottom perspective view of the rail end mount 100 including an optional locking mechanism 150 of the rail end mount 100 in accordance with embodiments of the present inventive concepts. In some embodiments, a locking mechanism 150 may include a tab 151, for locking the rail head 200 into position in the channel 130. FIG. 4B is a perspective view illustrating components that may be included in a locking mechanism 150 in accordance with embodiments of the present inventive concepts. The locking mechanism 150 may be engaged by tab 151 and rotates in a slot provided across channel 120 of the rail end mount 100. In some embodiments, a pivot joint can be provided at a junction between an axle 155a, 155b of the locking mechanism 150 and an axle hinge 157a, 157b, permitting the locking mechanism 150 to pivot relative to the lower surface 101b of the base 110. When the locking mechanism is in an engaged position, an interference bulb 152 of the locking mechanism 150 operates to frictionally interfere with the underside of the rail 210 of the rail head 200, for example, through a window or opening in the base 110, thereby fixing the rail head 200 in place relative to the rail end mount 100. When the locking mechanism 150 is in a disengaged, or open, position, a flat surface 153 of the locking mechanism 150 is positioned to face the channel 130 so that the position of the rail head 200 can be freely and slidably adjusted relative to the channel 120 of the base 110.

Figure 5:
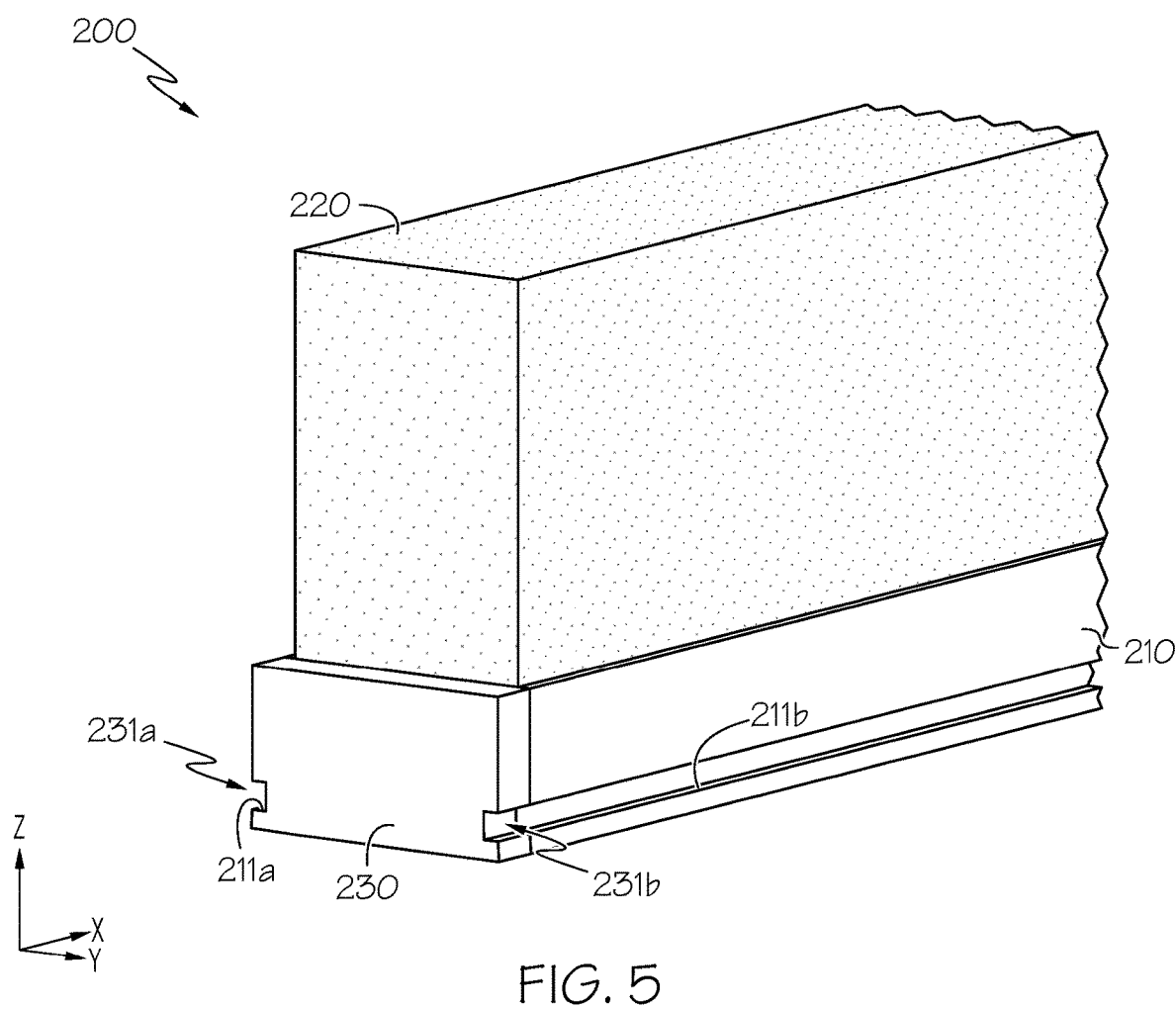
FIG. 5 is a perspective view of a grooved end cap in accordance with embodiments of the present inventive concepts.

FIG. 5 is a perspective view of a grooved end cap 230 that is constructed and arranged to couple with the end of rail head 200. The grooved end cap 230 includes grooves 231a, 231b that extend in the first horizontal direction x on opposing sides of the rail 210. The grooved end cap 230 is constructed and arranged to cover one or both ends of the rail 210. A first groove 231a is positioned at a first side of the grooved end cap 230 and a second groove 231b is positioned at a second side of the grooved end cap 230, the first and second sides being opposite each other in the second horizontal direction y. The grooves 231a, 231b are positioned at a location along the vertical direction z such that, when the grooved end cap 230 is inserted into rail head 200, groove 231a and groove 231b of the end cap 230 are aligned with corresponding grooves 211a, 211b of the rail 210 so that the left grooves 231a, 231a and right groves 213b, 211b are aligned along the first horizontal axis x. The grooves 231a, 231b are positioned such that, when the grooved end cap 230 is inserted into rail 210, groove 231a and groove 231b will be spatially offset along the second horizontal axis y. The groove 231a and the groove 231b are positioned substantially similar to the horizontal grooves 211a, 211b on the rail 210, such that the rail 210 can freely slide in a direction along channel 120 when the grooved end cap 230 and rail 210 are inserted in the channel 120. In some embodiments, the rail 210 comprises an extruded aluminum member. In some embodiments, the end cap 230 comprises a plastic plug constructed and arranged to be press fit into the end of the rail 210. In some embodiments, the end cap 230 is operable to secure the pad in the rail 210. In some embodiments, the end cap 230 is operable as a protective cover to prevent inadvertent operator engagement with sharp edges that may be present at the end of the rail 210.

Referring back to FIG. 1, in some embodiments, the rail end mount 100 may include one or more curtain attachment mechanisms 300 that are constructed and arranged to secure a curtain in place to the rail end mount 100. In some embodiments, the curtain attachment mechanism 300 comprises a curtain head 310 and a curtain clip 320. In some embodiments, the curtain clip 320 is removably coupled to the curtain head 310. Various example embodiments of curtain heads and curtain clips having similar functionality are described in U.S. Pat. Nos. 5,924,469 and 7,658,219, the content of each being incorporated herein by reference.

In some embodiments, referring back to the embodiment of FIG. 1, the curtain attachment mechanism may be positioned at the base 110 at a position at a second side of the socket 400 along the first horizontal axis x while the channel stop 140 is positioned at a position on the base that is at a first side of the socket 400 along the first horizontal axis x. In some embodiments, the curtain attachment mechanism 300 is positioned at or near a second end 102b of the base, opposite the first end 102a. In some embodiments, the curtain attachment mechanism 300 further comprises a neck 301 that operates as a vertical extension to provide a vertical space in the vertical direction z between the curtain head 310 and the base 110. In some embodiments, the length of the neck ln is configured so that an upper surface of the curtain clip 320, when coupled to the curtain head 310, is positioned at a vertical position relative to the base 110 that is less than an upper surface of a pad 220 on a rail head 200 coupled to the channel 120 of the base 110. Configuring the length ln of the neck 301 in this manner ensures that the resilient pad 220 of the rail head 200 compresses slightly against an abutting surface when a curtain is installed between the curtain clip 320 and curtain head 310 and when the rail end mount is raised into position on a pole 500. An illustration of this arrangement is provided in the side view of FIG. 6A. In this view it can be seen that the length ln of the neck 301 is configured so that the resultant height hc of the upper surface 321 of the curtain clip 320 relative to the base 110 is less than the height hr of the upper surface of the pad 220 of the rail head 200 relative to the base 110. As a result, when the rail end mount 100 is installed against an abutting surface of a structure, for example, a ceiling, the pad 220 compresses against the ceiling to a certain degree until the curtain clip 320 is likewise made to contact the ceiling, and, in particular, as the rail head 200 and rail end mount 100 are urged against the ceiling under the bias of a spring-loaded pole 500.

Figure 6A:
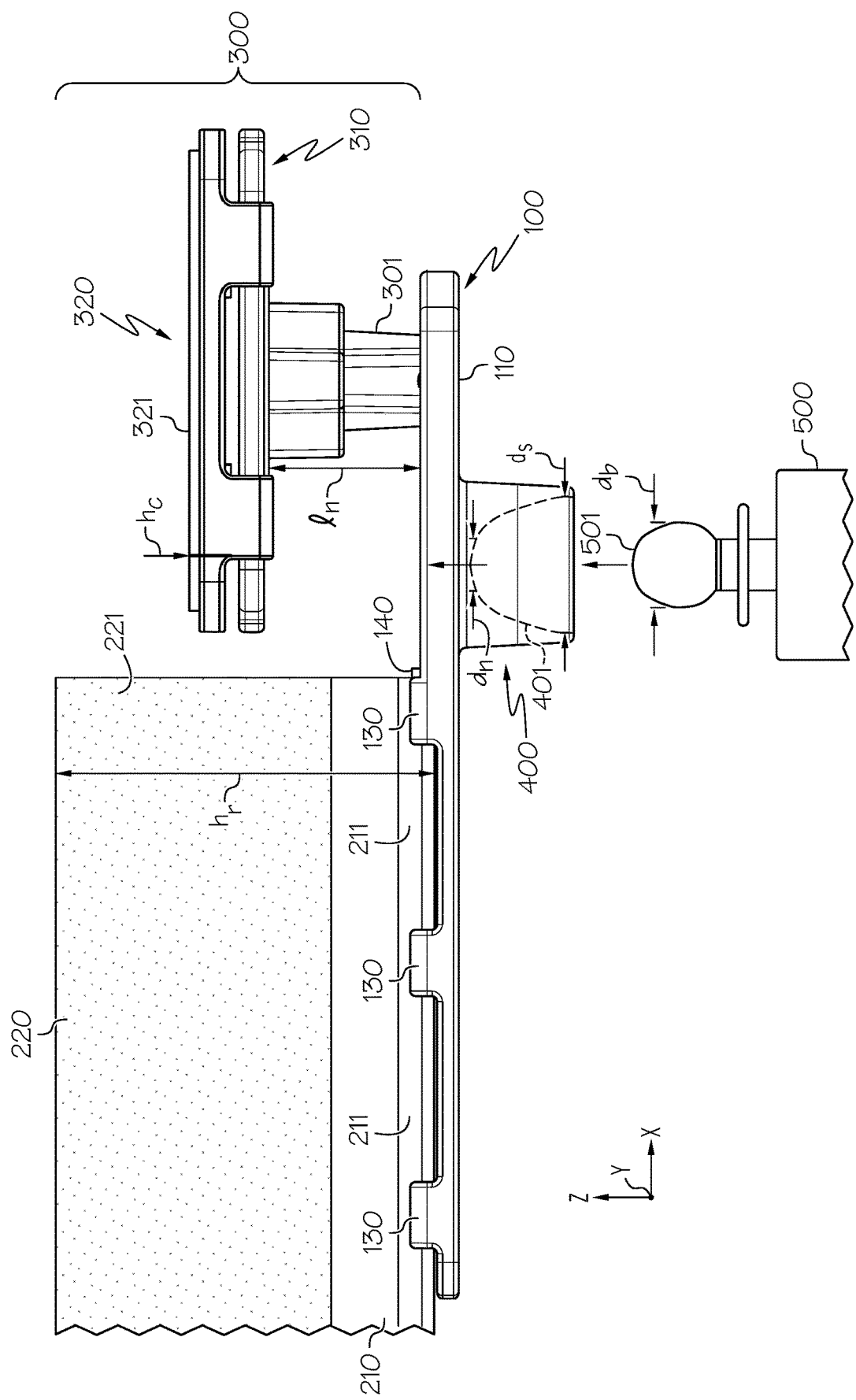
FIG. 6A is a side view illustrating relative positioning of a rail end mount mounted to a rail head in the process of being mounted to a mounting pole in accordance with embodiments of the present inventive concepts.
Figure 6B:
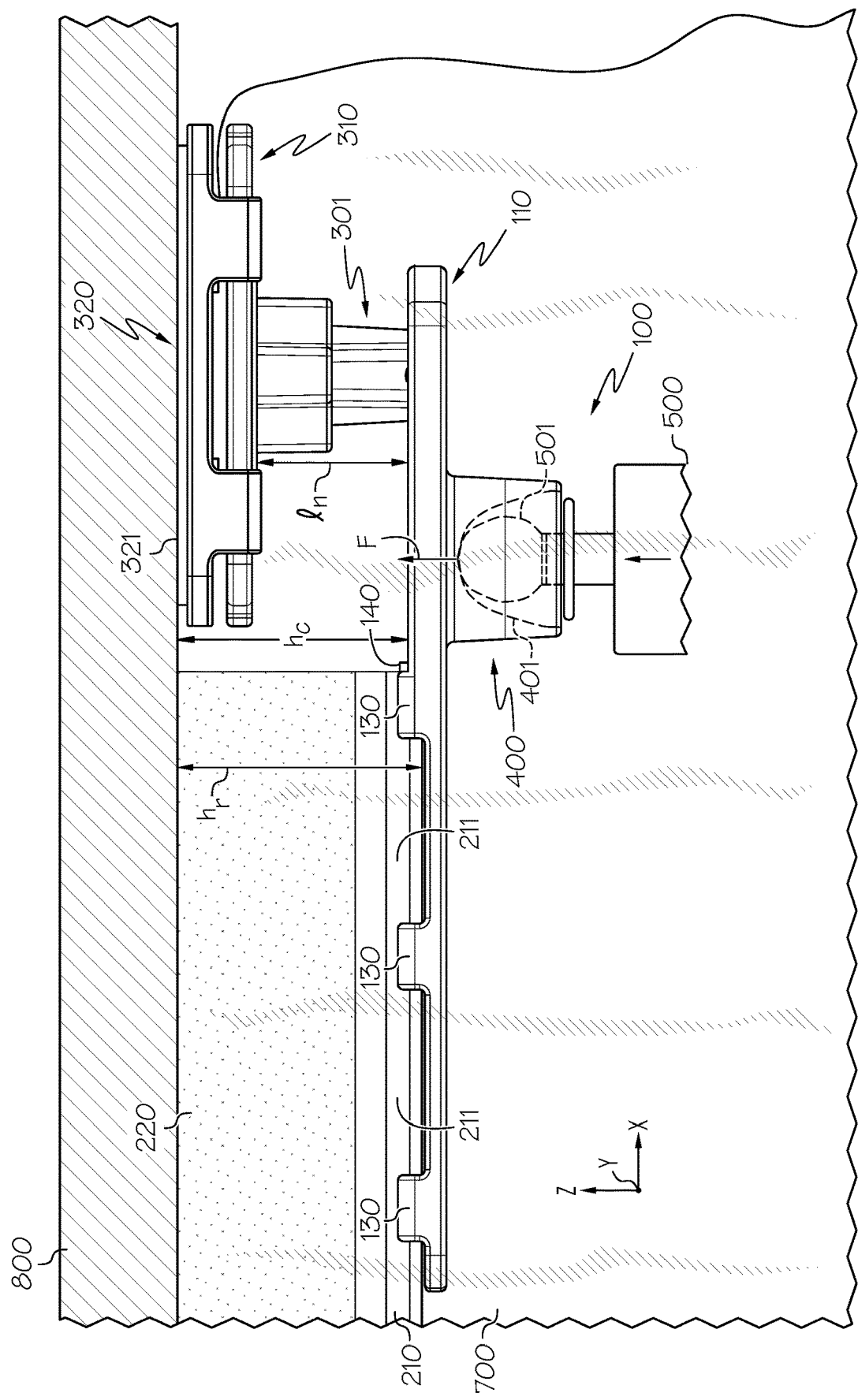
FIG. 6B is a side view illustrating the configuration of FIG. 6A having a curtain mounted thereto, and compressed against an abutting surface, such as a ceiling, by the pole in accordance with embodiments of the present inventive concepts.

An installed configuration can be seen in the side view of FIG. 6B. In an installation, a first portion of the installed curtain 700 is positioned between the curtain clip 320 and curtain head 310 while a second portion is urged against the ceiling 800 and positioned between the pad 220 and ceiling 800. A pole 500 inserted in socket 400 imparts an upward force F on the rail end mount 100 which passes through the pad 220 and curtain clip 320 to urge and secure the rail end mount 100 curtain clip 320 and curtain against the ceiling.

It can be seen that the height hr of the compressed rail pad 220 relative to the base 110 is approximately equal to the height hc of the upper surface of the curtain clip 320 relative to the base 110.

In some embodiments, the curtain attachment mechanism 300 is spatially offset from the channel 120 in the second horizontal direction y. In some embodiments, the curtain attachment mechanism 300 is spatially offset from the location of the channel 120 in the first horizontal direction x and in the second horizontal direction y. In some embodiments, the curtain attachment mechanism 300 extends in an upward direction from the upper surface of the base 110 from a position that is offset from the center of the base 110 along the first horizontal direction x. In some embodiments, the curtain attachment mechanism 300 extends upward from the upper surface of the base 110 from a position that is offset from the center of the base 110 along the second horizontal direction y. In some embodiments, the rail end mount 100 may comprise more than one curtain attachment mechanism 300. In such an embodiment, each curtain attachment mechanism 300 may extend from a different top location on the base 110 of the upper surface of the rail end mount 100. Each curtain attachment mechanism 300 extends in a direction that is transverse to the first horizontal axis. In some embodiments, the curtain attachment mechanism 300 may be spatially offset from the channel 120 in the first horizontal direction x.

Figure 7B:
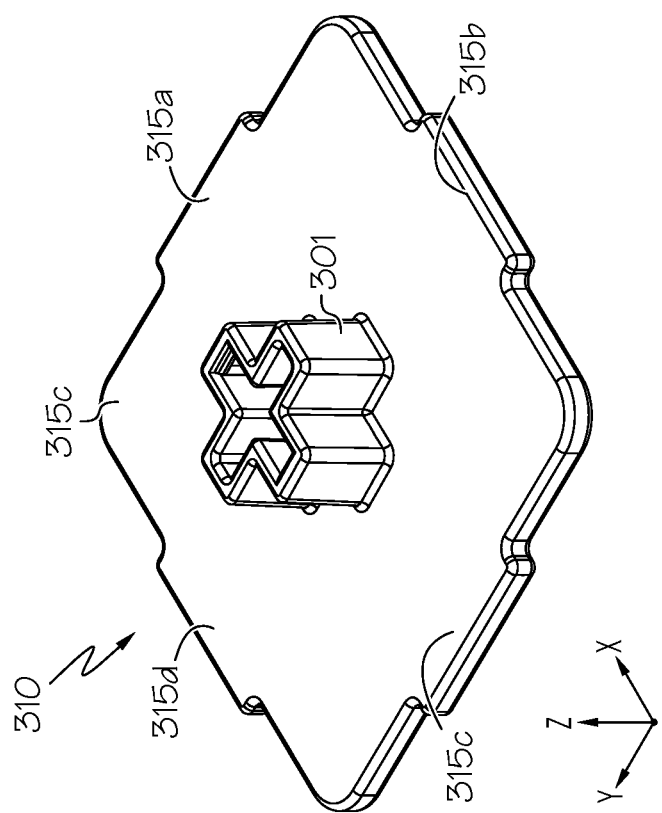
FIGS. 7A and 7B are top and bottom perspective views of a curtain head in accordance with embodiments of the present inventive concepts.
Figure 7A:
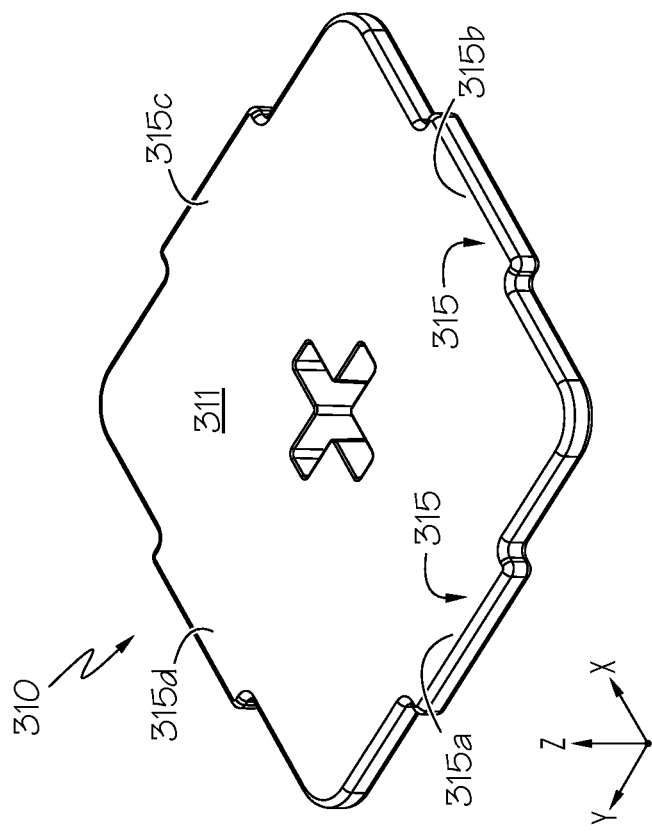

FIG. 7A and FIG. 7B are a perspective top view a perspective bottom view, respectively of the curtain head 310 that is constructed and arranged to mate with a curtain clip 320. In some embodiments, the curtain head 310 comprises an upper surface 311 that is constructed and arranged to mate with a lower surface 322 (see FIGS. 8A-8C) of the curtain clip 320. In the embodiment of FIGS. 7A, 7B, the curtain head 310 is depicted as having a substantially square shape. In other embodiments, the curtain head may take other shapes such as, but not limited to, a rectangle, a circle, or other suitable shapes. In the embodiment shown in FIGS. 7A, 7B, the upper surface 311 of the curtain head 310 is substantially planar. In other embodiments, the upper surface 311 of the curtain head 310 may be curved.

The curtain head 310 may have at least one extension 315. For example, the embodiment shown in FIG. 7A has four extensions 315a, 315b, 315c, 315d. Each extension 315 comprises a lateral protrusion, or lobe, extending from a side of the curtain head 310. In the embodiment shown, the lateral protrusions are positioned at central portions along each of the four outer edges of the curtain head. Other configurations are equally applicable to the inventive concepts. In some embodiments, extensions 315 on the curtain head are constructed and arranged to provide a registration surface so that the curtain clip 320 can be registered and seated on the curtain head 310. In some embodiments, the curtain head 310 is square in configuration and is symmetric along the x and y horizontal axes.

Figure 8A:
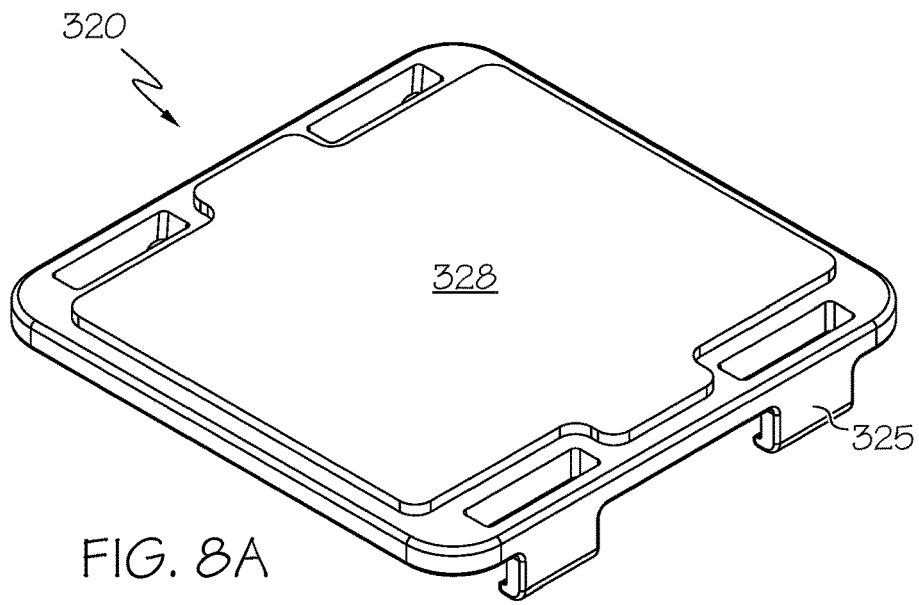
FIGS. 8A, 8B, and 8C are top, side and bottom perspective views of a curtain clip in accordance with embodiments of the present inventive concepts.
Figure 8B:
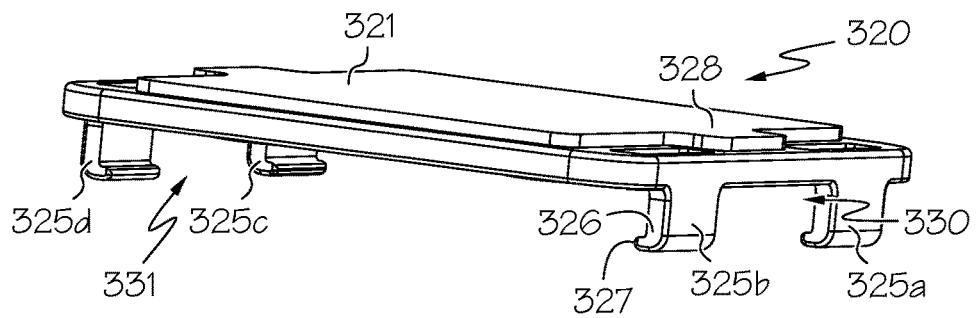
Figure 8C:
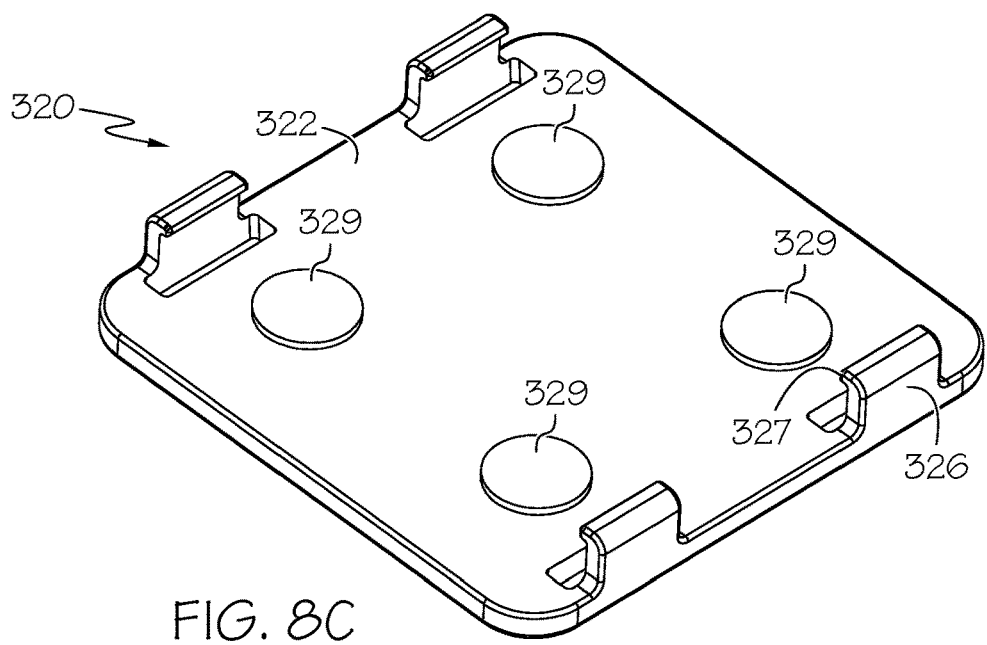

FIGS. 8A and 8B are top and side perspective views respectively of a curtain clip 320 in accordance with embodiments of the present inventive concepts. FIG. 8C is a bottom perspective view of the curtain clip 320 in accordance with embodiments of the present inventive concepts. In some embodiments, the curtain clip 320 comprises an upper surface 321 and a lower surface 322, and is constructed and arranged to mate with a curtain head 310. In some embodiments, the curtain clip 320 may comprise at least one curtain claw 325 constructed and arranged to mate with the curtain head 310 such that the curtain can be secured between the curtain clip 320 and the curtain head 310.

In some embodiments, the upper and lower surfaces of the curtain clip 320 may have a substantially square shape. In other embodiments the upper and lower surfaces of the curtain clip 320 may be shaped differently such as, but not limited to, a rectangle, triangle, polygon, oval, circle, and the like. In some embodiments the shape of the upper and lower surfaces of the curtain clip 320 is symmetrical and can be mated with the curtain head 310 in different configurations.

The curtain clip 320 may include at least one curtain claw 325 that extends below the curtain clip 320. In some embodiments, multiple curtain claws 325 at opposed sides of the curtain clip 320. For example, in the embodiment shown in FIGS. 8A-8C there are four curtain claws: two at a first side of the curtain clip 325a, 325b and two at the opposing second side 325c, 325d. The curtain claws 325 are spaced apart such that when the curtain clip 320 is mated with the curtain head 310, the curtain claws 325 are positioned on neighboring sides of one of the extensions 315. When the curtain clip 320 is mated with a curtain head 310, one of the extensions 315 may be present in Region A 330 between curtain claws 325a and 325b. An extension 315 may also be present in Region B 331 between curtain claws 325c and 325d. The positioning of claws 325 at opposite sides of an extension 315 operates to prevent the curtain clip 320 from inadvertently sliding or releasing from the curtain head 310 when force is applied to the curtain clip 320 oriented in the first horizontal direction x or second horizontal direction y.

FIG. 8C is a bottom perspective view of the curtain clip 320 in accordance with embodiments of the present inventive concepts. In some embodiments, at least one curtain friction pad 329 may be coupled to the lower surface 322 of the curtain clip 320. The at least one curtain friction pad 329 is constructed and arranged to create a high-friction interface with the curtain. The embodiment shown in FIG. 8C shows the curtain clip 320 with four curtain friction pads 329. Other embodiments may have a different number of curtain friction pads 329. In some embodiments, the curtain friction pads 329 may be embedded in the lower surface 322 of the curtain clip 320. In some embodiments, the curtain friction pads 329 may be embedded in the lower surface 322 of the curtain clip 320 such that a surface of the curtain friction pad 329 is flush with the lower surface 322 of the curtain clip 320. The embodiment illustrated in FIGS. 8A-8C includes four curtain claws 325, including two pairs of opposed claws 325a, b, 325c, d, however other embodiments equally applicable to the present inventive concepts may include a different number of curtain claws.

In some embodiments, such as the one shown in FIG. 8, curtain claws 325 are present at opposing sides of the curtain clip 320, and the spacing between opposing claws is arranged such that the upper surface 311 of the curtain head 310 can fit between them. In some embodiments, the curtain claw 325 may comprise a neck 326 and a lip 327. The neck 326 extends below the lower surface 322 of the curtain clip 320 in a direction that is transverse to the lower surface 322 of the curtain clip 320. In some embodiments, the direction of extension of the neck 326 may be orthogonal to the direction of extension of the lower surface 322 of the curtain clip 320. When an installer is in the process of securing a curtain in place, the installer places the curtain over the curtain head 310 and then mates the curtain clip 320 onto the curtain head 310 with the curtain positioned between the curtain clip 320 and curtain head 310. The neck 326 is constructed and arranged to extend below the bottom of the curtain head 310, even at a time when a curtain is positioned between the curtain head 310 and the curtain clip 320. Each claw includes a lip 327 that is constructed and arranged to secure the curtain clip 320 to the curtain head 310. Each lip 327 extends in a direction transverse to the direction of extension of its corresponding neck 326. When the curtain clip 320 is mated with the curtain head 310, when an attempt is made to lift the curtain clip 320 in a vertical direction z (see FIG. 1) relative to the curtain head 310, the lip 327 will interfere with the bottom of the curtain head 310, preventing the curtain clip 320 from releasing from the curtain head 310.

Figure 8D:
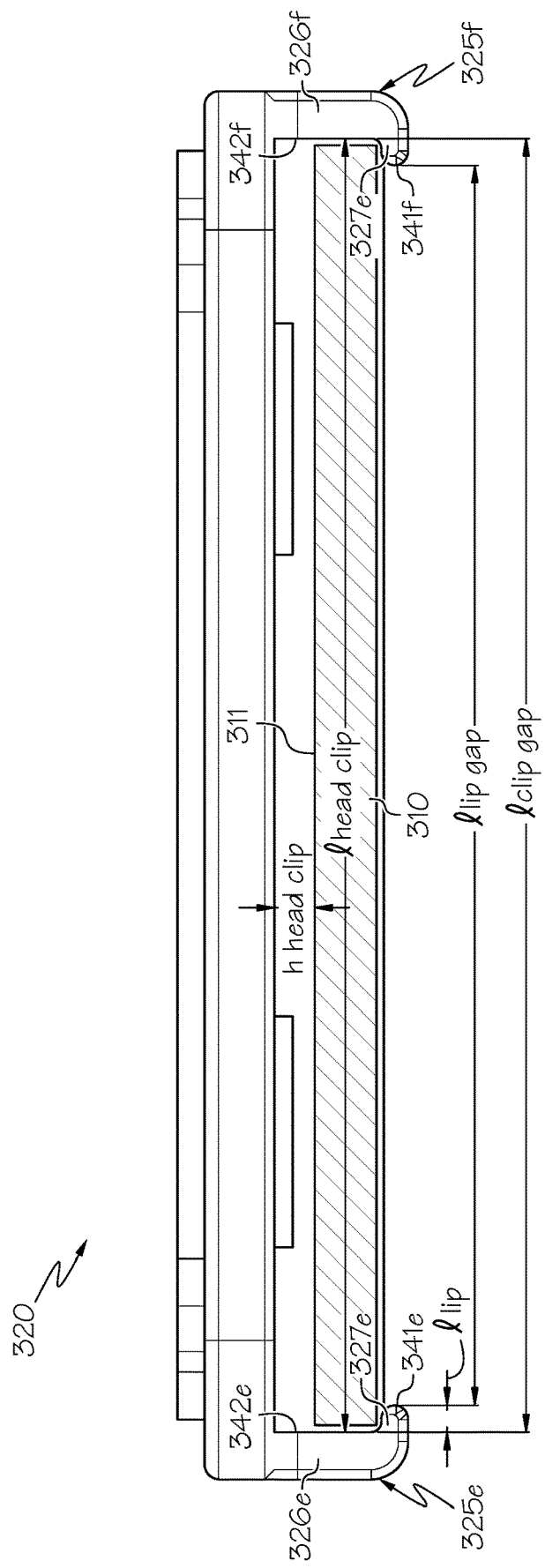
FIG. 8D is a side view of a curtain clip in accordance with embodiments of the present inventive concepts.

FIG. 8D is a side view of the curtain clip 320 mated with the curtain head 310 in accordance with embodiments of the present inventive concepts. In some embodiments, a lip gap, $l_{lip\ gap}$, is defined as the distance between the inner end 341e of a first lip 327e of a first curtain claw 325e and the inner end 341f of a second lip 327f of a second curtain claw 325f, where the first and second curtain claws 325e, 325f are positioned at opposite sides of the curtain clip 320. An inner end 341e, 341f of the respective lip 327e, 327f is defined as an end that faces toward an axis that passes through the center of the upper surface 321 of the curtain clip 320. In some embodiments, a clip gap $l_{clip\ gap}$ is defined as the distance between the inner wall 342e of a first neck 326e of the first curtain claw 325e and the inner wall 342f of a second neck 326e of the second curtain claw 325f. In some embodiments, in order for the curtain clip 320 to properly mate with, or otherwise receive, the curtain head 310, the length of the clip gap $l_{clip\ gap}$ is greater than a side length $l_{head}$ of the upper surface of the curtain head 310. In some embodiments, in order to retain the curtain clip 320 to the curtain head 310, the length of the lip gap $l_{lip\ gap}$ is less than the side length $l_{head}$ of the upper surface of the curtain head 310.

Figure 8E:
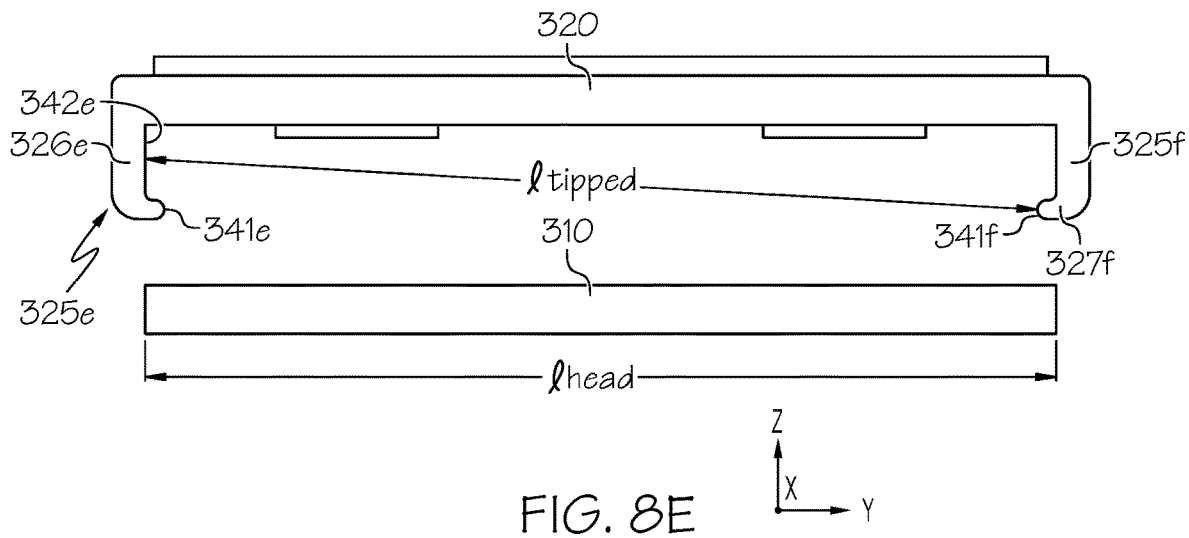
FIGS. 8E, 8F, and 8G are sequential side views of a curtain clip being mounted to a curtain head in accordance with embodiments of the present inventive concepts.
Figure 8F:
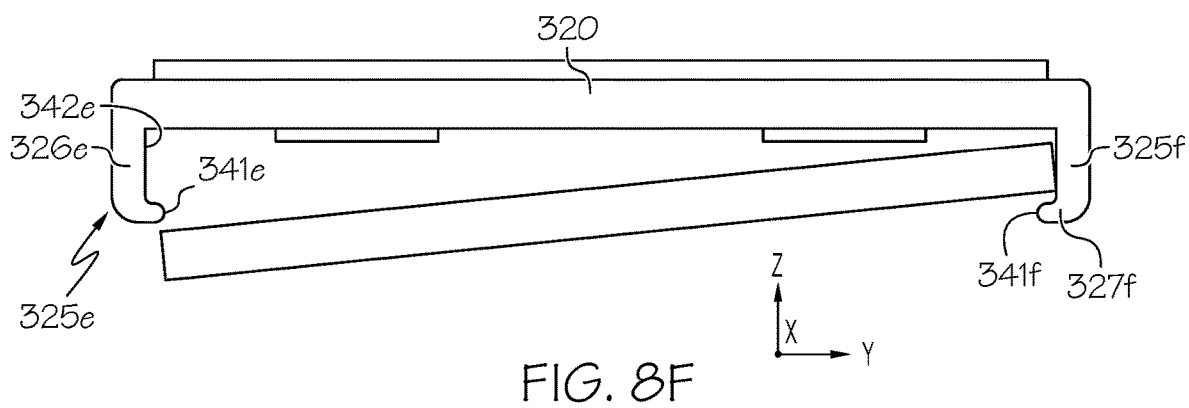
Figure 8G:
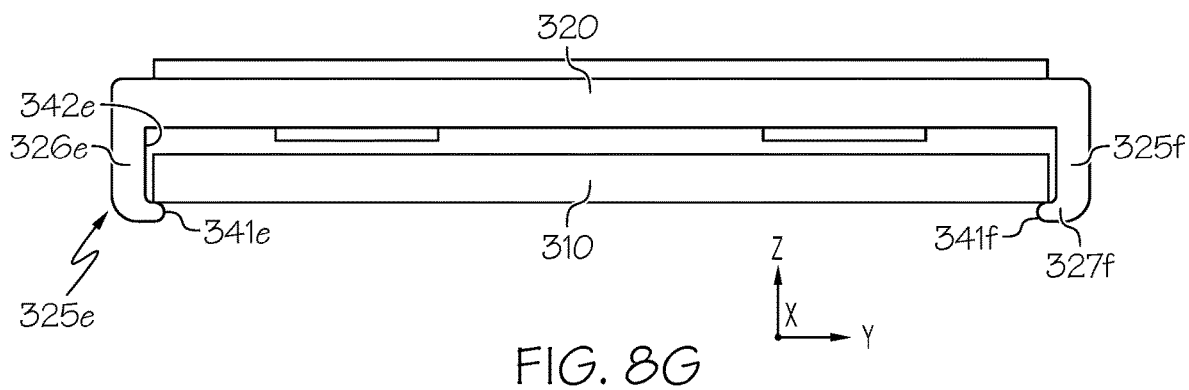

Referring to the side views of FIG. 8E through 8G, in the present embodiment, the curtain clip 320 and curtain head 310 are configured such that installation of the curtain clip 320 to the curtain head 310 and removal of the curtain clip 320 from the curtain head 310 requires that the curtain clip 320 be tipped an angle relative to the curtain head 310 during installation and removal. To accommodate this, as shown in FIG. 8E, the curtain clip 320 is dimensioned such that an angular distance $l_{tipped}$ between an inner wall 342e of a neck 326e of a first curtain claw 325e and an inner end 341f of a lip 327f of an opposed curtain claw 325f is slightly greater than a length of the curtain head $l_{head}$. As shown in FIG. 8F, this permits the curtain head 310 to be placed between the lips 327e, 327f of the curtain clip 320 at an angle. When positioned at the angle, the head 310 can pass between the lips 327e, 327f and be inserted entirely between the claws. At the same time, referring to FIGS. 8D and 8G, since the length of the curtain head $l_{head}$ is greater than the length of the gap $l_{lipgap}$ between the lips 327e, 327f, of the curtain clip 320, the curtain clip 320 is prevented from being inadvertently released from the curtain head 310. For example, as shown in FIG. 8G, when moved in a vertical direction along the vertical axis z, the curtain clip 320 will not release from the curtain head 310, and the lips 327e, 327f of the claws 325e, 325f are too narrow for the head 310 to pass through. Only by fully tipping the curtain clip 320 at an angle, as shown in FIG. 8F, will the curtain clip 320 be released from the curtain head 310.

In some embodiments, the head 310 and clip 320 can be dimensioned so that during application and removal of the clip 320 on the head, the necks 326e, 326f and lips 327e, 327*f* of the first and second curtain claws 325*e*, 325*f* touch the end of the head 310. In such an embodiment, the necks 326*e*, 326*f* and lips 327*e*, 327*f* of the first and second curtain claws 325*e*, 325*f* can be constructed and arranged to flex or bend around the end of the head 310 during installation or removal in a press-fit or snap-on arrangement.

FIGS. 9A1 through 9E1 are sequential perspective views and FIGS. 9A2 through 9E2 are sequential side views, illustrating a mounting sequence for mounting a curtain 700 between a curtain clip 320 and a curtain head 310 in accordance with the present inventive concepts. Referring to FIGS. 9A1 and 9A2, initially, a portion of a curtain 700 is positioned between the curtain head 310 and the curtain clip 320. FIG. 9A2 is a side view of the curtain attachment mechanism 300 showing the curtain positioned on the curtain head 310 and the curtain clip 320 positioned above the curtain head in accordance with embodiments of the present inventive concepts. In the embodiment shown in FIG. 9A2, the curtain claw 325 is constructed and arranged such that when the neck 326 (see FIG. 8B) of the curtain claw 325 extends below the bottom of the curtain head 310, the lip 327 of the curtain claw 325 extends directly underneath the bottom of the curtain head 310, thereby securing a first end of the curtain clip 320 to the curtain head 310. When the curtain clip 320 is in contact with the curtain head 310, there may be a certain amount of vertical play in the direction of the z-axis between the top of the curtain head 310 and the bottom of the curtain clip 320, forming a gap between the upper surface of the curtain head 310 and the lower surface of the curtain clip 320. A portion of the curtain 700 can be positioned in that gap.

FIGS. 9B1 and 9B2 are top perspective and side views, respectively, of the curtain clip 320 at an angled position prior to mounting onto the curtain head 310 in accordance with embodiments of the present inventive concepts. In this view it can be seen that the curtain clip 320 is initially tipped at an angle to allow the curtain claws 325 at a first end of the curtain clip 320 to grasp a first edge of the curtain head 310.

FIGS. 9C1 and 9C2 are top perspective and side views, respectively, of the curtain clip 320 at an angled position relative to the curtain head 310 in accordance with embodiments of the present inventive concepts. FIGS. 9C1 and 9C2 also show the curtain clip 320 making contact with one side of the curtain 700 at the position identified by arrow 911. The lip 327 on one of the curtain claws 325 is positioned below the lower surface of the curtain head 310. As described in connection with FIGS. 8D-8G, in order to secure the curtain clip 320 to the curtain head 310, the curtain clip 310 is tipped at an angle relative to the curtain head 310 when placing the curtain clip 320 on the curtain head 310.

FIGS. 9D1 and 9D2 are top perspective and side views, respectively, of the curtain clip 320 mated with the curtain head 310 in accordance with embodiments of the present inventive concepts. It can be seen in this view that when the curtain clip 320 is tipped at an angle and made to contact the curtain head 310 at one end, as shown in FIG. 9C1, 9C2, the curtain clip 320 can then be pivoted in a downward direction identified by arrow 913 and made to fully seat on the curtain head 310. In this position, the curtain 700 is secured and the rail end mount 100 is prepared for mounting.

In the embodiments shown in FIGS. 9A1, 9A2, 9B1, 9B2, 9C1, 9C2, 9D1, and 9D2 the curtain clip 320 is positioned with respect to the curtain head 310 such that there are two curtain claws 325 at a first y position and there are two additional curtain claws 325 at a second y position opposite the first y position. FIGS. 9E1 and 9E2 are top perspective and side views, respectively, of the curtain clip 320 mated with the curtain head 310 in accordance with embodiments of the present inventive concepts. The curtain clip 320 in FIGS. 9E1 and 9E2 is oriented differently than the curtain clip 320 in the previous figures. Rather than having the pairs of curtain claws 325 at different y positions, in this embodiment, there are two curtain claws 325 at a first x position and there are two additional curtain claws 325 at a second x position. In an embodiment where the curtain head 310 and curtain clip 320 are square in shape, the user can optionally mount the curtain clip 320 oriented as shown in the illustration of FIGS. 9E1, 9E2 or oriented as shown in the illustration of FIGS. 9D1, 9D2.

Figure 10A:
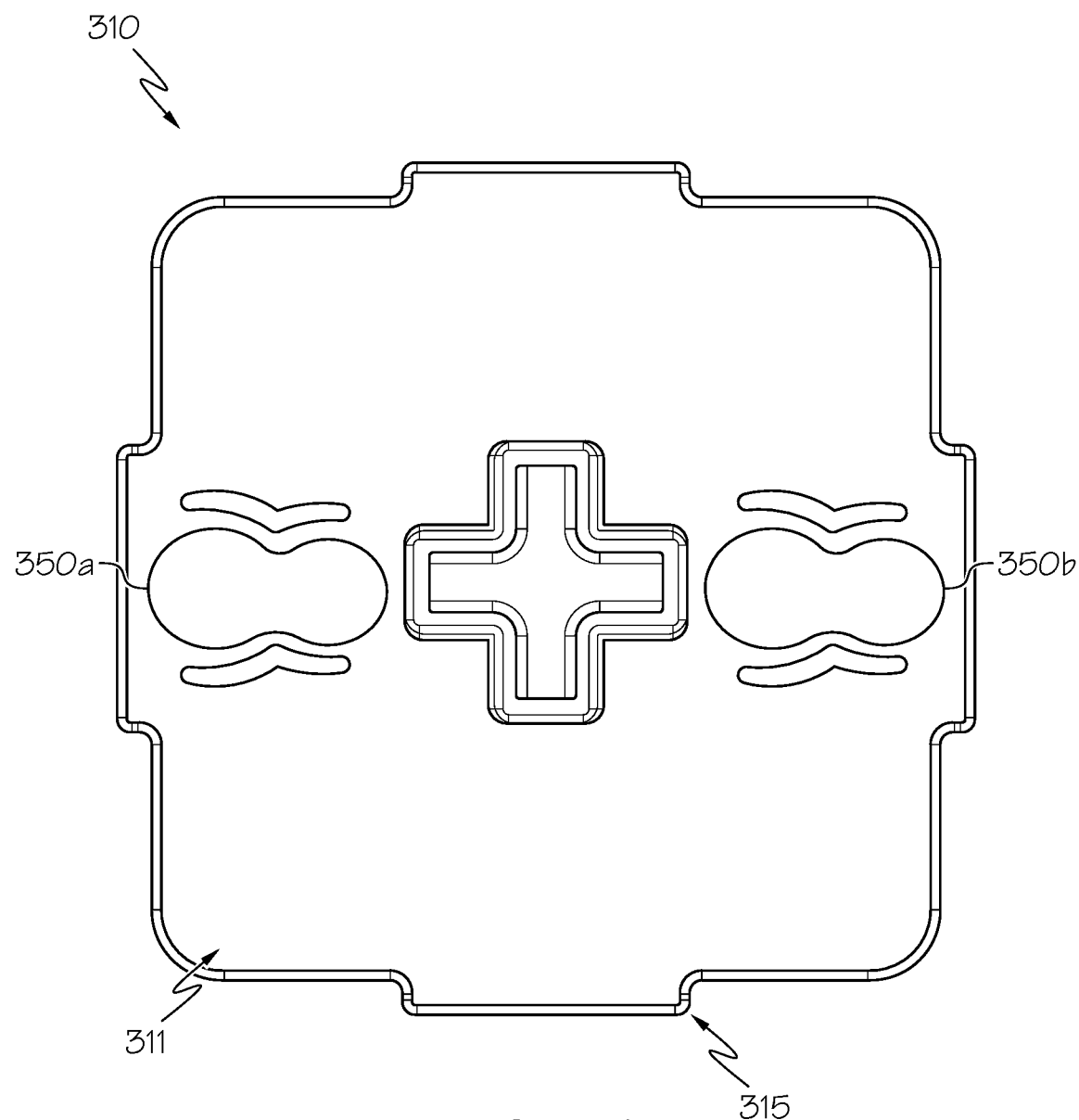
FIG. 10A is a top view of a curtain head in accordance with embodiments of the present inventive concepts.
Figure 10B:
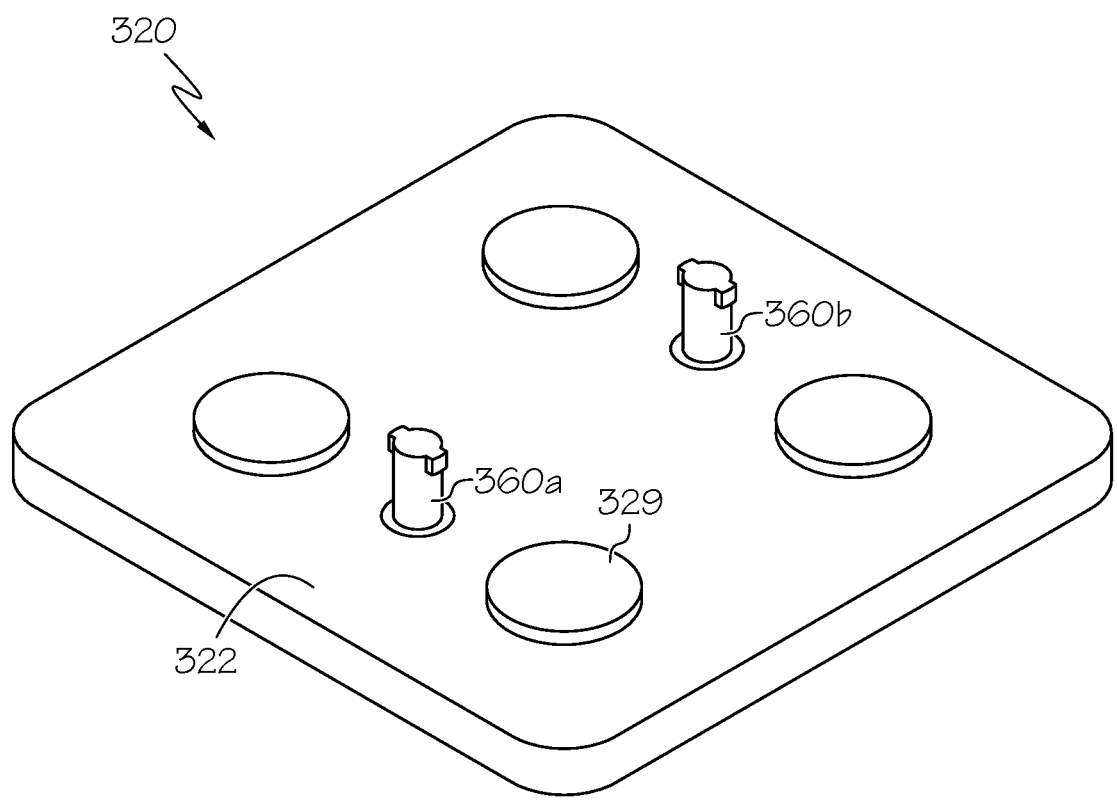
FIG. 10B is a perspective view of the lower surface of the curtain clip in accordance with embodiments of the present inventive concepts.

FIG. 10A is a top view of a curtain head 310 in accordance with embodiments of the present inventive concepts. FIG. 10B is a perspective view of the lower surface 322 of the curtain clip 320 in accordance with embodiments of the present inventive concepts. Referring to FIG. 10, in some embodiments, the curtain head 310 may include at least one keyhole 350*a*, 350*b* that is constructed and arranged to mate with at least one peg 360*a*, 360*b* on the curtain clip 320. In the embodiment shown, the curtain head has two key holes 350*a* and 350*b*, while the corresponding curtain clip 322 has two pegs 360*a* and 360*b* that are constructed and arranged to interface with the two key holes 350*a* and 350*b* on the curtain head 310. In this manner, the curtain head 310 and the curtain clip 320 have a mating relationship for securing a curtain therebetween. For illustrative purposes, an example of this configuration is described in U.S. Pat. No. 7,658,219, incorporated herein by reference. In the embodiment shown in FIG. 10A the curtain head has two key holes 350*a* and 350*b*. In other embodiments, the curtain head may have only one key hole 350 or more than two key holes 350. In the embodiment shown in FIG. 10B the curtain clip has two pegs 360*a* and 360*b*. In other embodiments, the curtain clip may have only one peg 360 or more than two pegs 360.

In some embodiments, for example referring to the embodiment depicted in FIG. 8A and FIG. 8B, a clip friction pad 328 is positioned at the upper surface 321 of the curtain clip 320. In some example embodiments, the friction pad 328 comprises a soft pliable material that avoids damage to an abutting surface when placed in contact with the abutting surface. The friction pad 328 is constructed and arranged to present friction between the top of the curtain clip 320 and an abutting surface so as to mitigate undesired horizontal movement of the rail end mount 100 when installed at an installation site.

Referring back to FIG. 1, the illustrated embodiment includes a curtain head 310 that is constructed and arranged to have a fixed positional relationship with the base 110 of the rail end mount 100. In other embodiments, the curtain attachment mechanism 300 can be constructed and arranged have an adjustable positional relationship with the base 110 of the rail end mount 100. For example, the position of the curtain attachment mechanism can be adjusted in the direction of the first horizontal axis x, or alternatively in the direction of the second horizontal axis y, or alternatively in both the direction of the first horizontal axis x and in the direction of the second horizontal axis y.

In some embodiments, the curtain attachment mechanism 300 may be constructed and arranged to pivot relative to the base 110. In some embodiments, the curtain attachment mechanism 300 and base 110 may be coupled by a cylindrical joint to allow pivot of the head 310 about the vertical direction of the vertical axis z relative to the base 110. In some embodiments, the curtain attachment mechanism 300 and base 110 may be coupled by a universal joint to allow pivot of the curtain attachment mechanism 300 about one or more of the first and second horizontal axes x, y or the vertical direction of the vertical axis z relative to the base 110. In other embodiments, the position of the curtain attachment mechanism 300 can vary in height relative to the vertical position of the base 110 in the vertical direction of the vertical axis z. For example, the vertical position can vary continuously or can be indexed in the vertical direction of the vertical axis z.

Referring back to FIG. 1, in some embodiments, the rail end mount 100 includes the socket 400 positioned at the lower surface of the base 110. As described herein, the socket 400 is constructed and arranged to interface with the pole 500, and, in particular, an end portion of the pole 500. In some embodiments, the socket 400 is constructed and arranged to interface with the ball 501 of the pole 500. In some embodiments, the position of the socket 400 is offset from the center of the base 110 along the first horizontal direction x. In some embodiments, the socket 400 extends in a direction transverse to the base 110. In some embodiments, the socket 400 extends in a direction orthogonal to the base 110. For example, in the embodiment of FIG. 1, the socket 400 extends in the vertical direction of the vertical axis z, and, in particular, in a direction of extension opposite the vertical direction of extension of the curtain attachment mechanism 300.

In some embodiments, referring in particular to FIG. 6A, the socket 400 may have an inner concave region 401 that has a depth that is deeper than a height of the ball 501 of a pole 500. In some embodiments, the socket 400 may be constructed and arranged so that the socket has an inner concave region 401 having a diameter ds at its opening, or mouth, that is slightly larger than an outer diameter db of the ball 501 of the pole 500. In this manner, the ball 501 can be readily removed from the socket 400 during a mounting procedure by an operator positioned at ground level. In such an embodiment, the inner concave region 401 of the socket 400 may have an inner surface that is gradually tapered in a vertical direction of the vertical axis z such that the socket 400 is gradually reduced in cross-sectional diameter from a mouth of the socket 400 distal the base 110 at its greatest width ds to an inner end of the socket proximal the base 110 at its narrowest width dn. In various embodiments, the gradual taper of the inner surface of the inner concave region 401 of the socket 400 can have a semi-conical shape, a semi-ellipsoidal shape, a semi-paraboloid shape or a semi-spherical shape, or other shape suitable for support of the rail end mount 200 during positioning and installation and for ready removal of the pole 500 from the socket 400 of the rail end mount 200 once the rail end mount 200 is positioned and installed.

In some embodiments, the socket 400 may be constructed and arranged to prevent the pole 500 from moving with respect to the rail end mount 100. For example, the socket 400 may include captures that operate to capture the ball 501 of the pole 500. In such an embodiment, the captures operate to secure the ball 501 until a suitable separation force is applied to the joint to separate the ball 501 from the socket 400. In such embodiments, the socket 400 is constructed and arranged to capture the ball 501 of the pole 500 so as to form a universal joint with the ball of the pole 500.

In some embodiments, the rail end mount 100 may include neck retainers (see retainers 1024 of FIG. 11A below) extending in the first horizontal direction along the bottom of the rail end mount 100 with the socket 400 therebetween. The optional neck retainers may be present to limit the rotation of the adjustable joint to one degree of freedom, for example, to limit rotation of the rail end mount 100 relative to the pole 500 in a direction about the first horizontal axis x, or to limit rotation of the rail end mount 100 relative to the pole 500 in a direction about the second horizontal axis y.

In some embodiments, the rail end mount 100 as described herein may be used in connection with the adjustable-length rail mount system described in U.S. patent application Ser. No. 15/216,877, filed Jul. 22, 2016, issued as U.S. Pat. No. 10,081,955 the content of which is incorporated herein by reference, in its entirety.

Figure 11A:
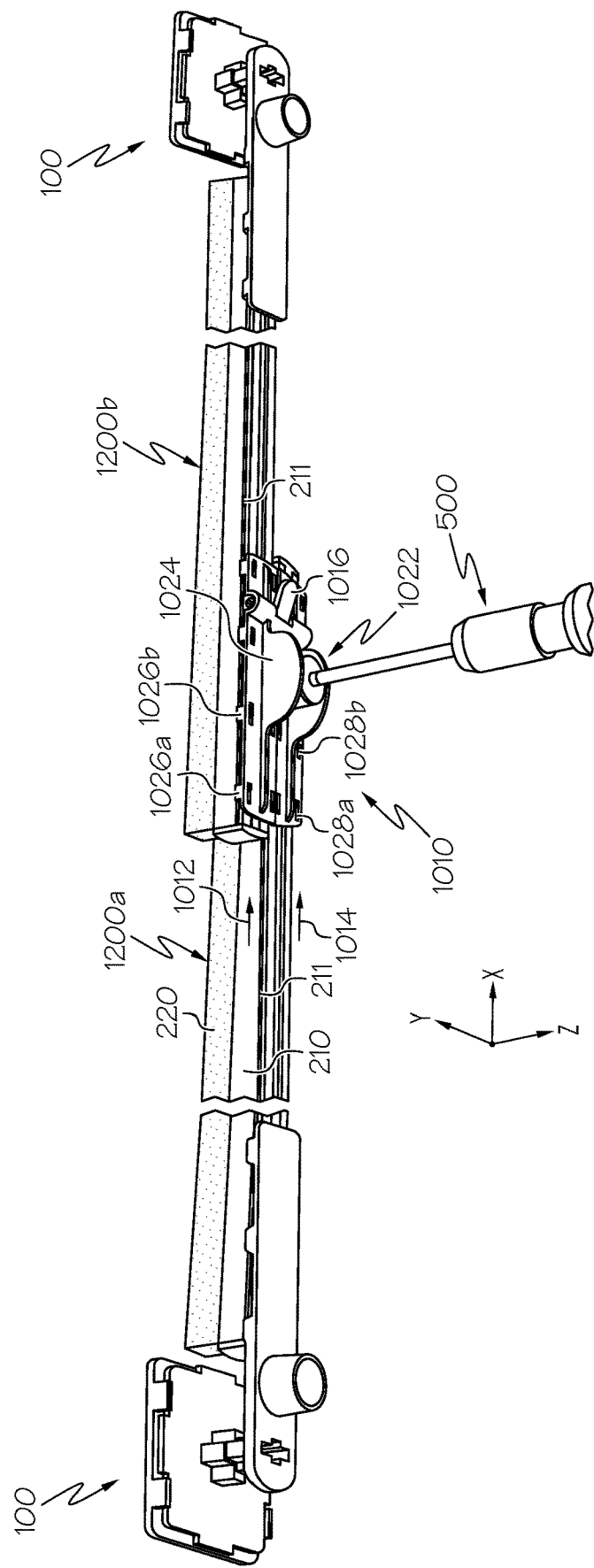
FIG. 11A is a perspective view of an adjustable-length rail mount system in accordance with the present inventive concepts.

FIG. 11A is a perspective view of an adjustable-length rail mount system in accordance with the present inventive concepts. The partition mount system of FIG. 11A operates to mitigate or eliminate sag, or gaps, between an installed curtain and an abutting surface such as a wall or ceiling. The system accomplishes this in a manner that avoids permanent damage to the wall or ceiling surface. The system includes multiple rail heads 1200a and 1200b, each having elongated bodies and compressible curtain interfaces. In some embodiments, the heads 1200a, 1200b can comprise lightweight aluminum, plastic or graphite rails with a compressible foam pad extending from an upper surface thereof.

The system can include, for example, a first head 1200a and a second head 1200b. The first and second heads 1200a and 1200b are joined together by a coupler 1010. In some embodiments, the heads 1200a, 1200b slide though first and second channels 1012, 1014 of the coupler 1010 so that they are slidably coupled together by the coupler 1010. In this manner, the combined longitudinal length of the first and second heads 1200a, 1200b can be freely adjusted. An extendable and compressible partition mount pole 500, for example, of the type as described in connection with U.S. Pat. Nos. 5,924,469 and 7,658,219, the contents of which are incorporated herein by reference, may be configured to urge the coupler 1010, rail heads 1200a, 1200b, and the curtain 700 against an abutting surface, thereby eliminating a sag or gap in the curtain. In some embodiments, the extendable pole 500 may be spring-loaded to be thereby compressible between two surfaces of a room or hallway of a building.

Each of the first and second rail heads 1200a and 1200b may include an elongated rail 210 and a compressible pad 220, for example, a foam block, as shown in the embodiment of FIG. 1. The rail 210 may comprise, for example, an extruded member formed of plastic, aluminum, alloy, graphite, wood, or the like. In some embodiments, the rail 210 may have a U-shaped profile. The pad 220 can be mounted in a cavity of the rail 210, and may be press-fit, or otherwise bonded, into place. The pad 220 may be, for example, rectangular in shape and may be formed of low-density foam or rubber, having a certain degree of compressibility so as to conform to an abutting surface, while still exhibiting resiliency and shape memory. The rail 210 may further include an elongated horizontal groove 211 on each outer side surface for interfacing with retention tabs 1026A, 1028A, 1026B, 1028B of the coupler 1010. Along with conforming to the shape of the abutting surface, the foam pad 220 is operable to avoid damage to the abutting surface.

The coupler 1010 includes multiple channels, for example, first and second channels, respectively, constructed and arranged such that the first and second heads 200a, 200b may be inserted, located, and adjusted in position relative to each other therein, respectively.

In some embodiments, the coupler 1010 includes a socket 1022 having teeth at a central, bottom location of the coupler 1010 and optional neck retainers 1024 extending in the first horizontal direction x along the bottom of coupler 1010 with the socket 1022 therebetween. The socket 1022 is configured to receive a ball of pole 500. In some embodiments, the ball and socket 1022 are in a snap-fit relationship and together form a universal joint for allowing rotation of the first and second rail heads 1200*a*, 1200*b* relative to the pole 500. In another embodiment, the socket 1022 can comprise a tapered concave region consistent with the socket 400 of the end mount 100 described herein. The optional neck retainers 1024 may be present to limit the rotation on the universal joint to one degree of freedom, for example to limit rotation of the coupler 1010 relative to the pole 500 in a direction about the first horizontal axis x, or to limit rotation of the coupler 1010 relative to the pole 500 in a direction about the second horizontal axis y.

The coupler 1010 may include retention tabs 1026A, 1026B, 1028A and 1028B along outer edges of first and second channels 1012 and 1014, respectively, and a locking mechanism 1016 between an edge of the coupler 1010 and the socket 1022. The first and second rail heads 200*a*, 200*b* are inserted into channels 1012 and 1014 such that the retention tabs 1026A, 1026B, 1028A and 1028B slide freely along the horizontal grooves 211 of the rails 210 of the first and second rail heads 200*a*, 200*b*. A locking mechanism 1016 includes a tab for locking the rail heads 200*a*, 200*b* into position in their channels 1012, 1014.

The first and second channels 1012 and 1014 extend in a first horizontal direction x. The first and second channels 1012 and 1014 are horizontally offset in a second horizontal direction y perpendicular to the first horizontal direction x. The horizontal axes of the first and second channels 1012, 1014 are pitched at an angle relative to each other in a vertical direction, such that the first channel 1012 extends below the second channel 1014 in a vertical direction along a section of channel 1012 and the second channel 1014 extends below the first channel 1012 in a vertical direction along a section of the channel 1014. The sections, and the regions between them are thus pitched relative to each other so that the resulting channels 1012, 1014 lie along axes of extension that are at a non-zero angle relative to each other in a vertical direction, for example, in some embodiments, an angle ranging between about 0.5 degrees to about 10 degrees, for example an angle of about 2 degrees. An example of the pitch angle θ can be viewed in the side view of FIG. 11B.

In this manner, the first channel 1012 has a first axis of extension in a first horizontal direction, while the second channel 1014 has a second axis of extension in the first horizontal direction. The second axis of extension is parallel to and spaced apart from the first axis of extension in the second horizontal direction y, the second axis of extension having a pitch angle relative to the first axis of extension in a vertical direction z. The pitch angle is non-zero and less than 180 degrees. The first channel 1012 includes first head-mounting features 1026*a*, 1026*b*, the head-mounting features constructed and arranged to retain the first elongated head 1200*a* to the coupler 1010 while permitting movement of the first elongated head 1200*b* relative to the coupler 1010 in the first horizontal direction. The second channel 1014 includes second head-mounting features 1028*a*, 1028*b*, the head-mounting features constructed and arranged to retain a second elongated head 1200*a* to the coupler 1010 while permitting movement of the second elongated head relative to the coupler in the second horizontal direction.

The locking mechanism 1016 of the coupler 1010 can be engaged by a tab and rotates in a slot provided across the first and second channels 1012, 1014 of the coupler 1010. When the locking mechanism is in an engaged position, interference bulbs of the locking mechanism 1016 operate to frictionally interfere with the undersides of the bodies of the rails 210 of the heads 1200*a*, 1200*b*, thereby fixing the heads 1200*a*, 1200*b* in place relative to the coupler 1010. When the locking mechanism 1016 is in a disengaged, or open, position, a flat surface of the locking mechanism 1016 is positioned to face the channels 1012, 1014 so that horizontal positions of the first and second heads 1200*a*, 1200*b* be freely and slidably adjusted as shown in FIG. 11B.

Figure 11B:
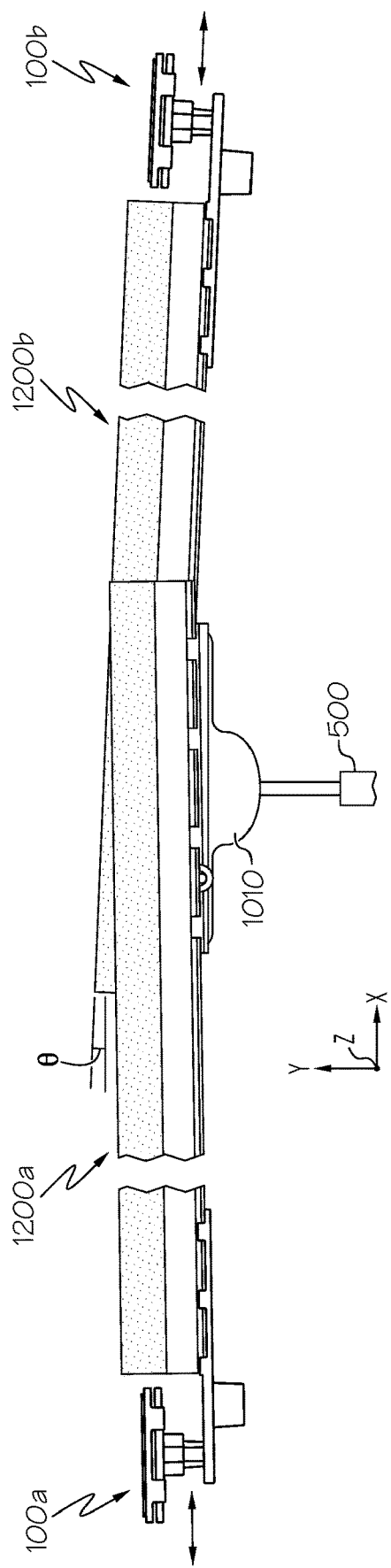
FIGS. 11B and 11C are perspective views of the coupler of FIG. 11A with extended-length rail heads coupled thereto, in accordance with embodiments of the present inventive concepts.

FIG. 11B is a perspective view of the coupler of FIG. 11A with extended-length rail heads 1200*a*, 1200*b* coupled thereto, in accordance with embodiments of the present inventive concepts. Referring to FIG. 11B, it can be seen that the first and second heads 1200*a*, 1200*b* are inserted in respective channels of the coupler 1010 in the first horizontal direction x so that the rail heads 1200*a*, 1200*b* are positioned parallel to each other in the second horizontal direction y.

In the example of FIG. 11B, it can be seen that first ends of each of the first and second rail heads 1200*a*, 1200*b* are inserted into their respective channels 1012, 1014 and the first and second rail heads are each slid through the channels almost throughout their lengths to their second ends. Due to the angular offset of the channels, it can be seen that, at this position, the longitudinal axes of the first and second rail heads 1200*a*, 1200*b* lie at a curved profile that has a generally convex shape relative to the ceiling.

The convex configuration of FIG. 11B is especially useful in applications where the rail heads 1200*a*, 1200*b* are to be supported at their end positions, by first and second rail end mounts 100*a*, 100*b*, as described herein. As a result, when the resulting mount is supported at its respective ends at the rail end mounts, the coupler 1010 ensures that the rails 1200*a*, 1200*b* maintain an upward bias on the curtain in the center position of the mount, after the center pole is removed, as will be described herein. Compression in the foam pad and any available longitudinal flex in the heads 1200*a*, 1200*b* collectively operate to urge the heads 1200*a*, 1200*b* against the ceiling in the eventually unsupported center region of the mount.

FIGS. 12A-12K illustrate a method for installing a curtain in accordance with embodiments of the present inventive concepts.

Figure 12A:
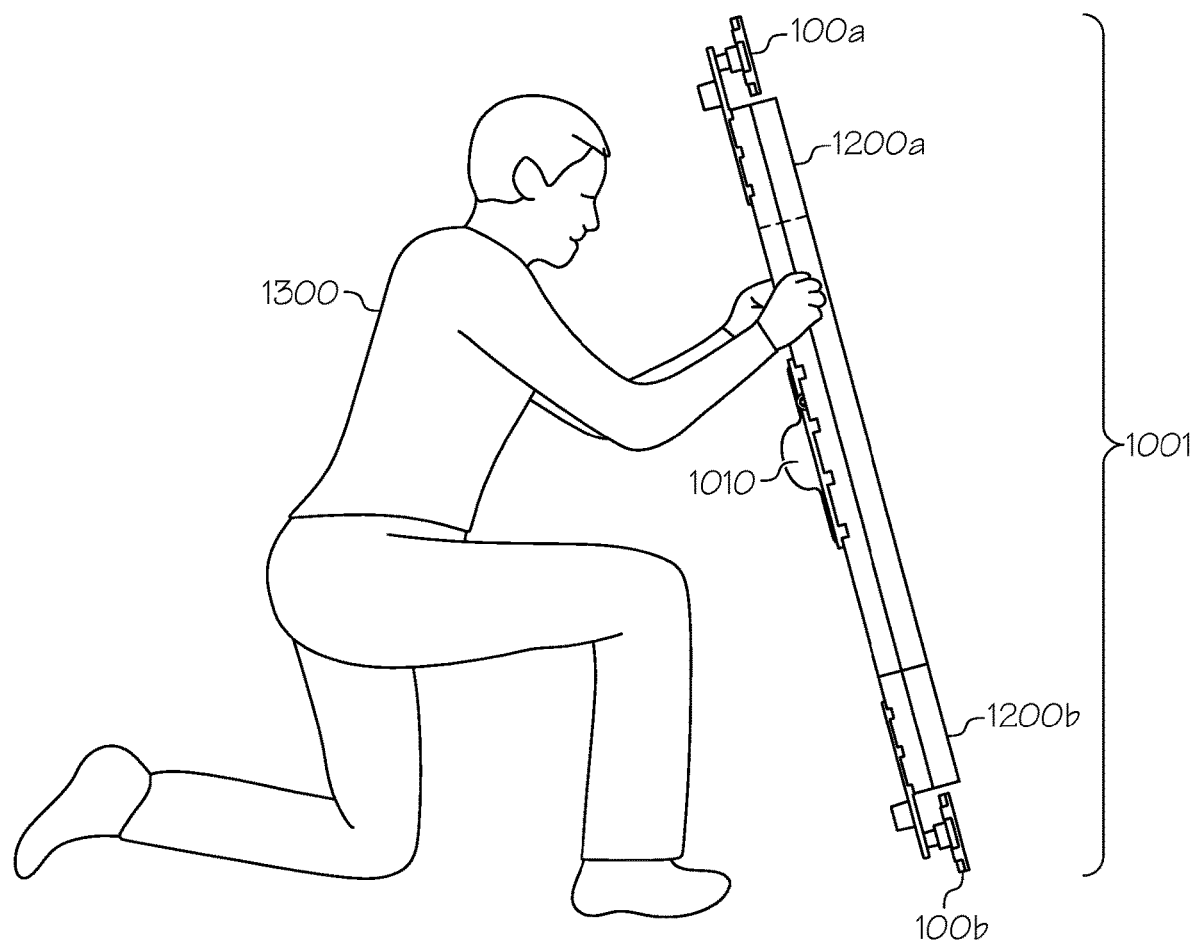
FIGS. 12A-12K illustrate a method for installing a curtain in accordance with embodiments of the present inventive concepts.

Referring to FIG. 12A, the installer 1300 inserts one end of a first rail head 1200*a* into a first channel 1012 of a coupler 1010 and inserts one end of a second rail head 1200*b* into a second channel 1014 of the coupler 1010. The installer attaches a first rail end mount 100*a* to an outer end of the first rail head 1200*a*, and attaches a second rail end mount 100*b* to an outer end of the second rail head 1200*b*. The first and second rail end mounts 100*a*, 100*b* are seated into position and secured at the opposite ends of the rails 1200*a*, 1200*b*. For purposes of the description of the present installation scenario, the collective components of the first and second rail heads 1200*a*, 1200*b*, as joined by the coupler 1010, along with the respective the first and second rail end mounts 100*a*, 100*b* will be referred to herein as the "partition unit" 1001.

Figure 12B:
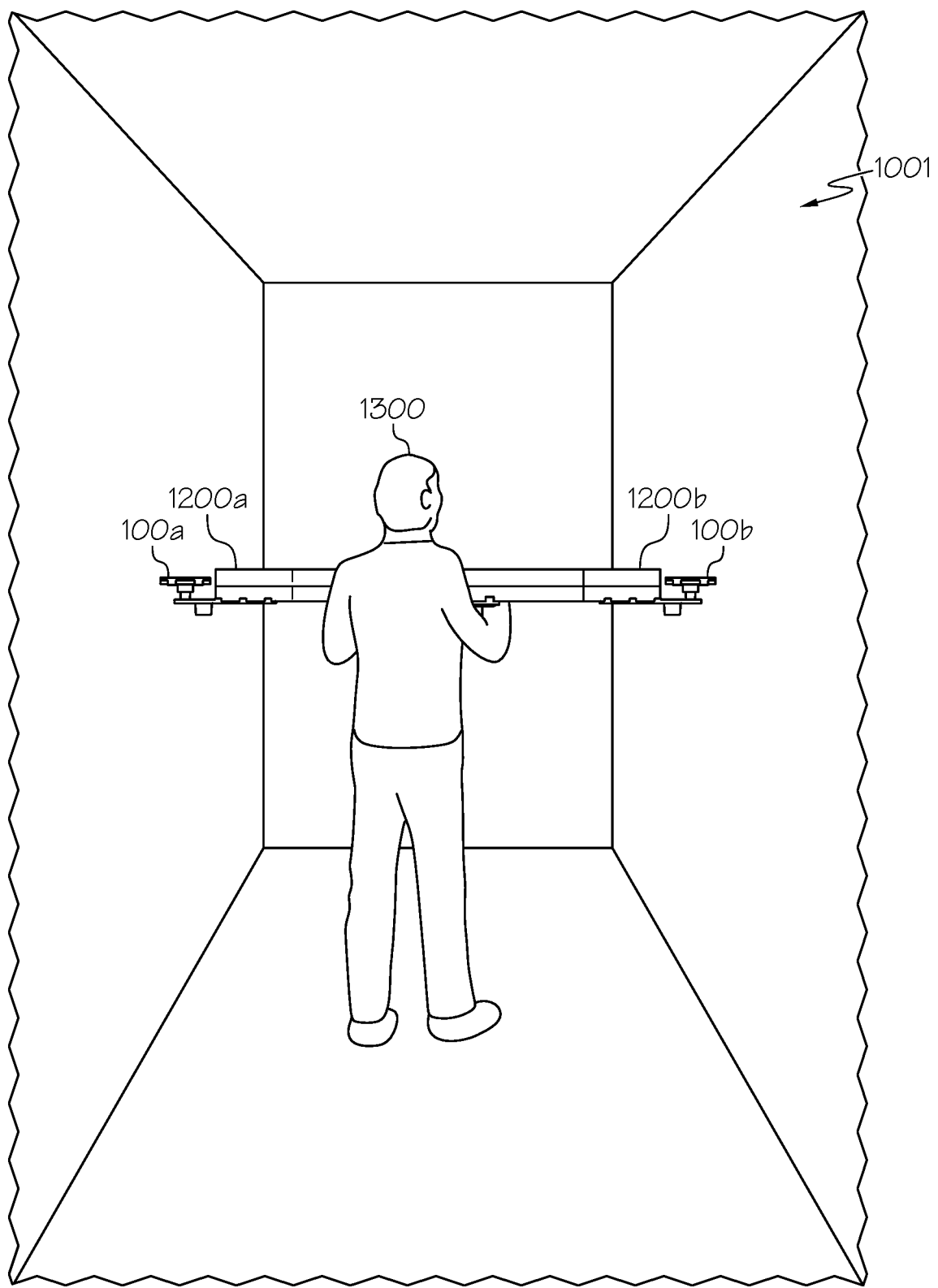

Referring to FIG. 12B, the installer 1300 manipulates the partition unit 1001 so that the first and second heads 1200*a*, 1200*b* extend along a direction x that is parallel to the plane of the desired partition. The installer adjusts the position of the first rail head 1200*a* and second rail head 1200*b* relative to the coupler 1010 so that the respective end mounts 100*a*, 100*b* are positioned at a suitable distance from each other. In the present embodiment, the partition unit is to be installed across the width of a hallway; accordingly, the installer adjusts the length of the partition unit 1001 so that the rail end mounts 100*a*, 100*b* are positioned at opposite walls of the hallway. Upon proper adjustment of the length of the partition unit 1001, the installer locks the positioning of the first and second heads 1200*a*, 1200*b* by engaging the lock lever 1016 (see FIG. 11A) of the coupler 1010.

Figure 12C:
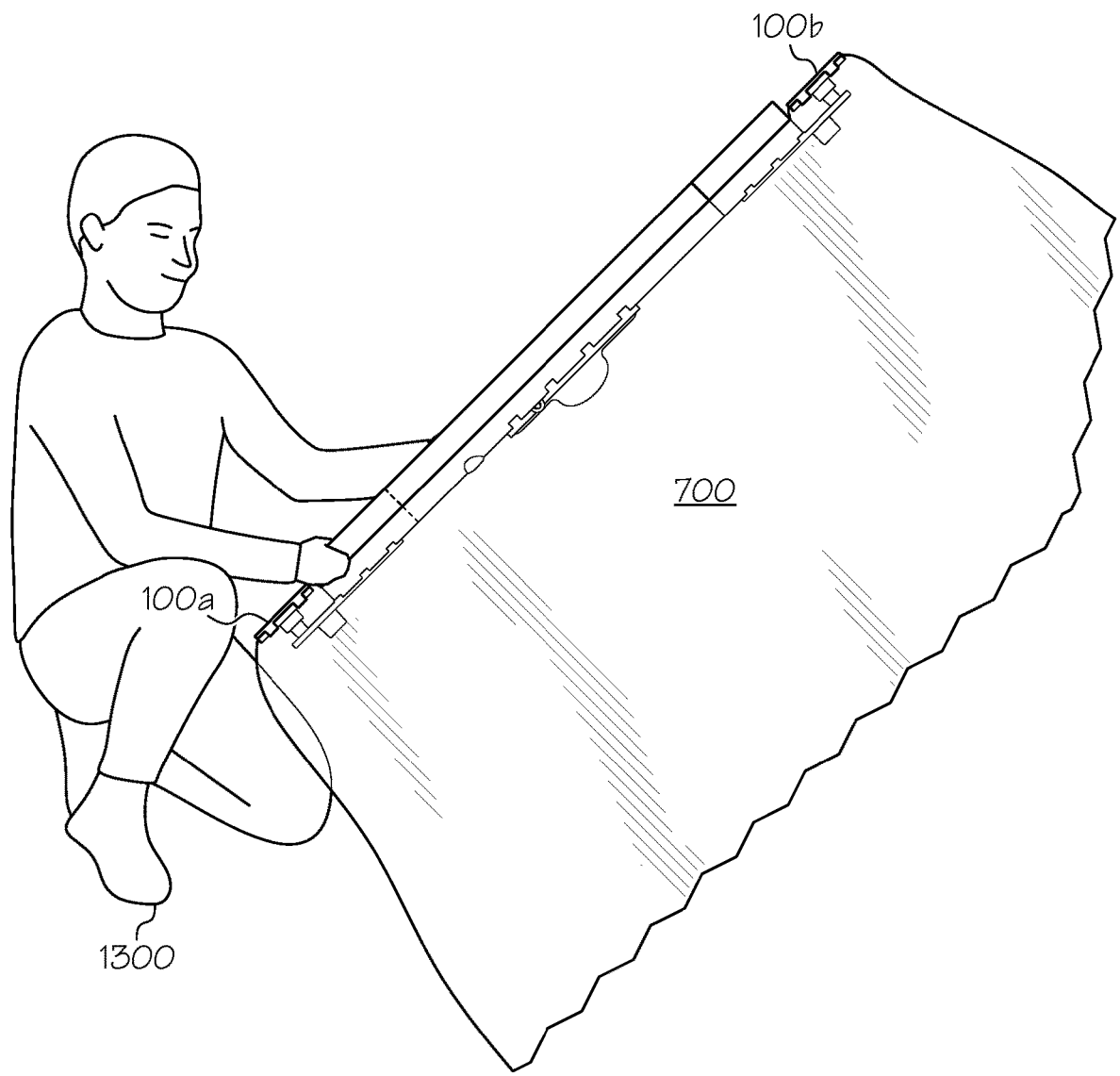

Referring to FIG. 12C, the installer secures a first portion of a curtain 700 to a first curtain attachment mechanism 300*a* of the first rail end mount 100*a*. The installer secures a second portion of a curtain 700 to a second curtain attachment mechanism 300*b* of the second rail end mount 100*b*. The curtain 700 is installed at the first and second end mounts 100*a*, 100*b*, so that a portion drapes over the bodies of the first and second heads 1200*a*, 1200*b*.

Figure 12D:
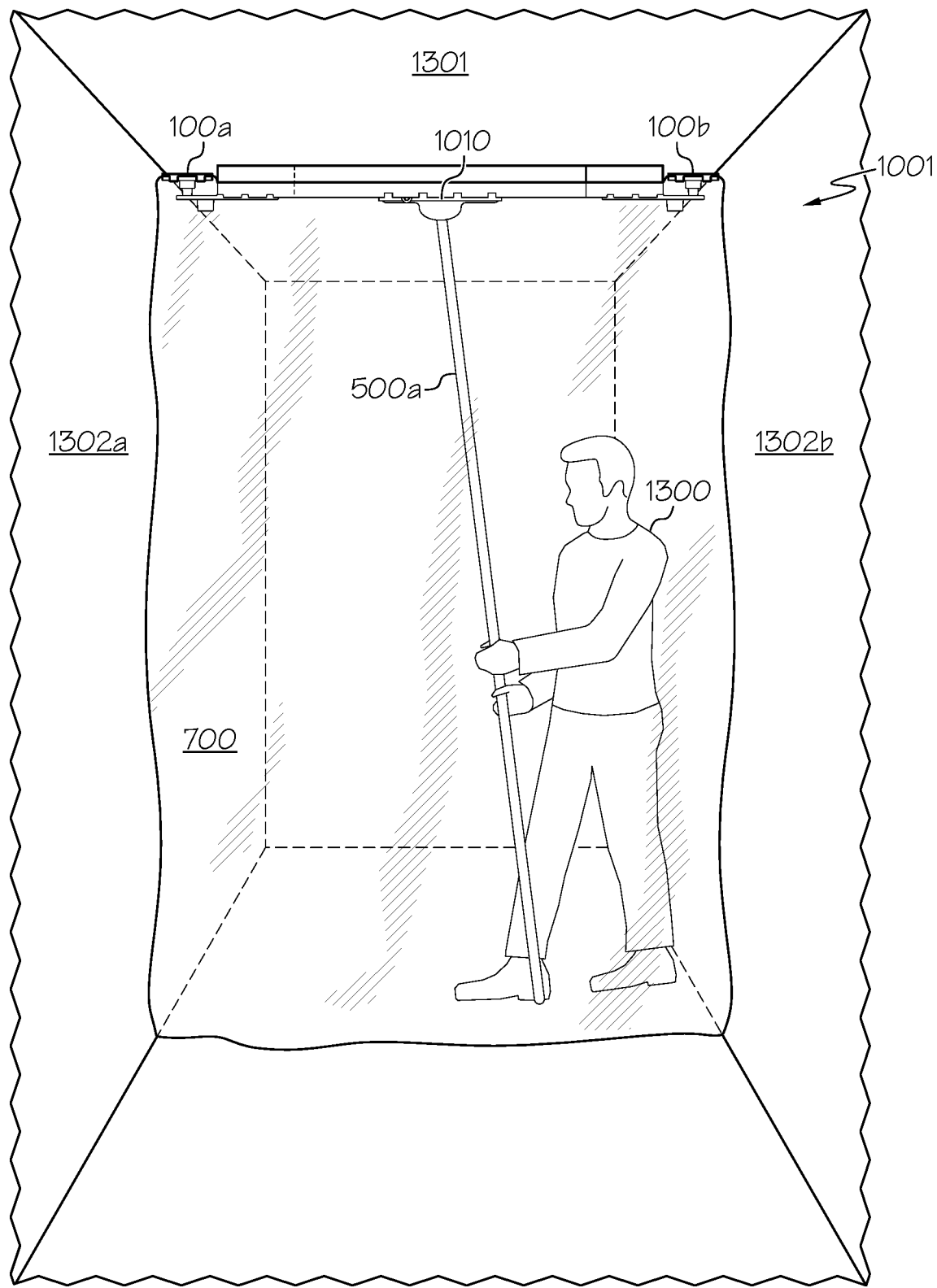

Referring to FIG. 12D, the installer attaches an end of a first pole 500*a* to the coupler 1010. In some embodiments, a ball 501 of the first pole 500*a* is secured to a socket 1022 of the coupler 1010. Together with the secured curtain, the partition unit 1001 is raised to the ceiling 1301 so that the partition unit 1001 abuts the ceiling 1301, while at the same time, the first and second rail end mounts 100*a*, 100*b* abut the corners of the respective walls 1302*a*, 1302*b* and ceiling 1301. In some embodiments the pole 500*a* is compressible, for example spring-loaded, and adjustable in length. Accordingly, the installer 1300 adjusts the length of the pole 500*a* so that the compression of the spring of the spring-loaded pole 500*a* operates upwardly to bias the partition unit 1001 against the ceiling 1301, thereby, in turn, pressing the curtain 700 against the ceiling 301. The installer locks the length of the pole 500*a* to secure the pole 500*a* in place.

Figure 12E:
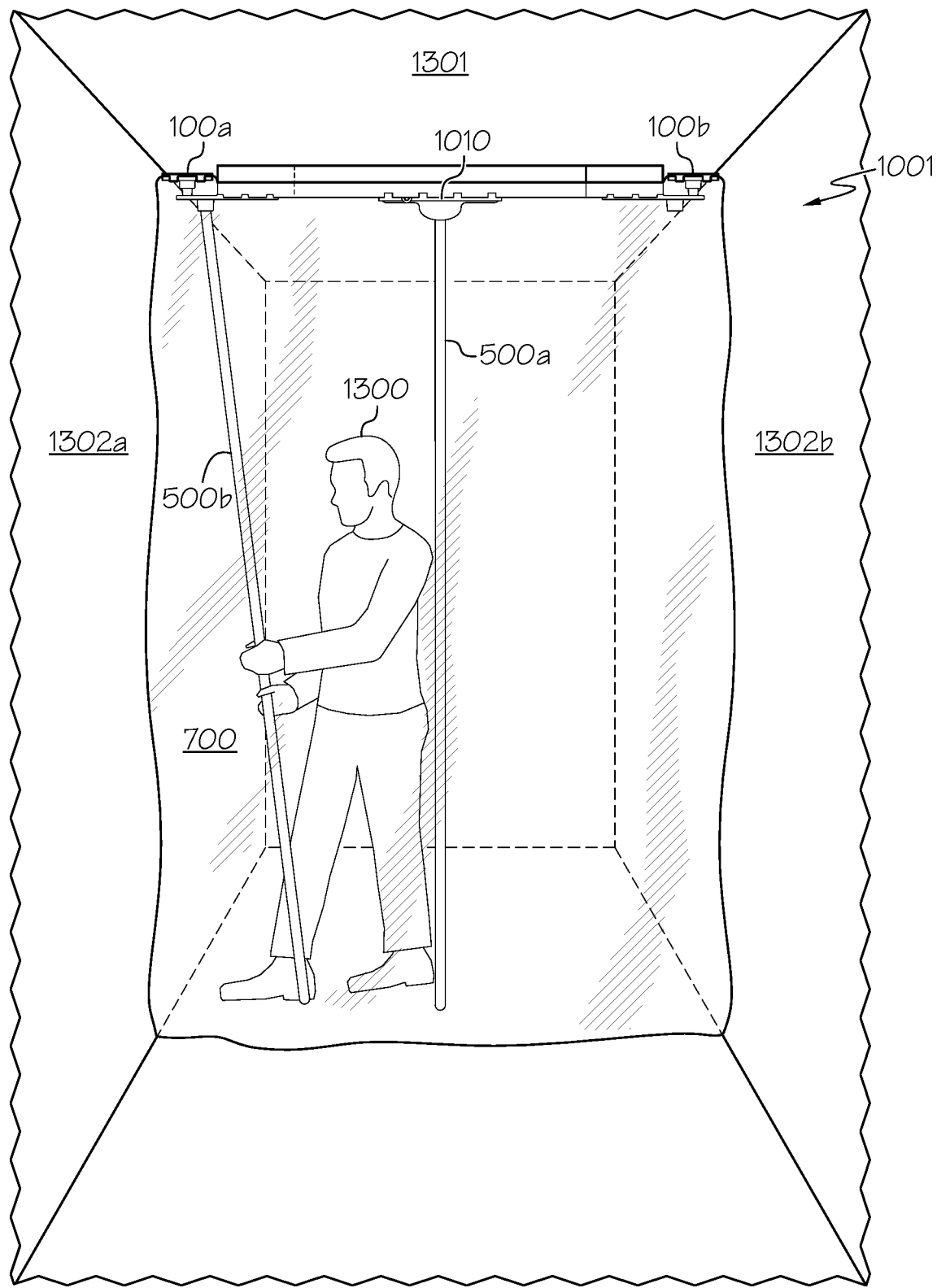

Referring to FIG. 12E, the installer places a second pole 500*b* to the first rail end mount 100*a* by positioning a ball 501 of the second pole 500*b* in the socket 400 of the first rail end mount 100*a*. The installer 1300 adjusts the length of the pole 500*b* so that the compression of the spring of the spring-loaded pole 500*b* operates outwardly to bias the first rail end mount 100*a* of the partition unit 1001 against the ceiling 1301, thereby, in turn, further pressing the curtain 700 against the ceiling 301 in the region of the first rail end mount 100*a*. The installer locks the length of the second pole 500*b* to secure the second pole 500*b* in place.

Figure 12F:
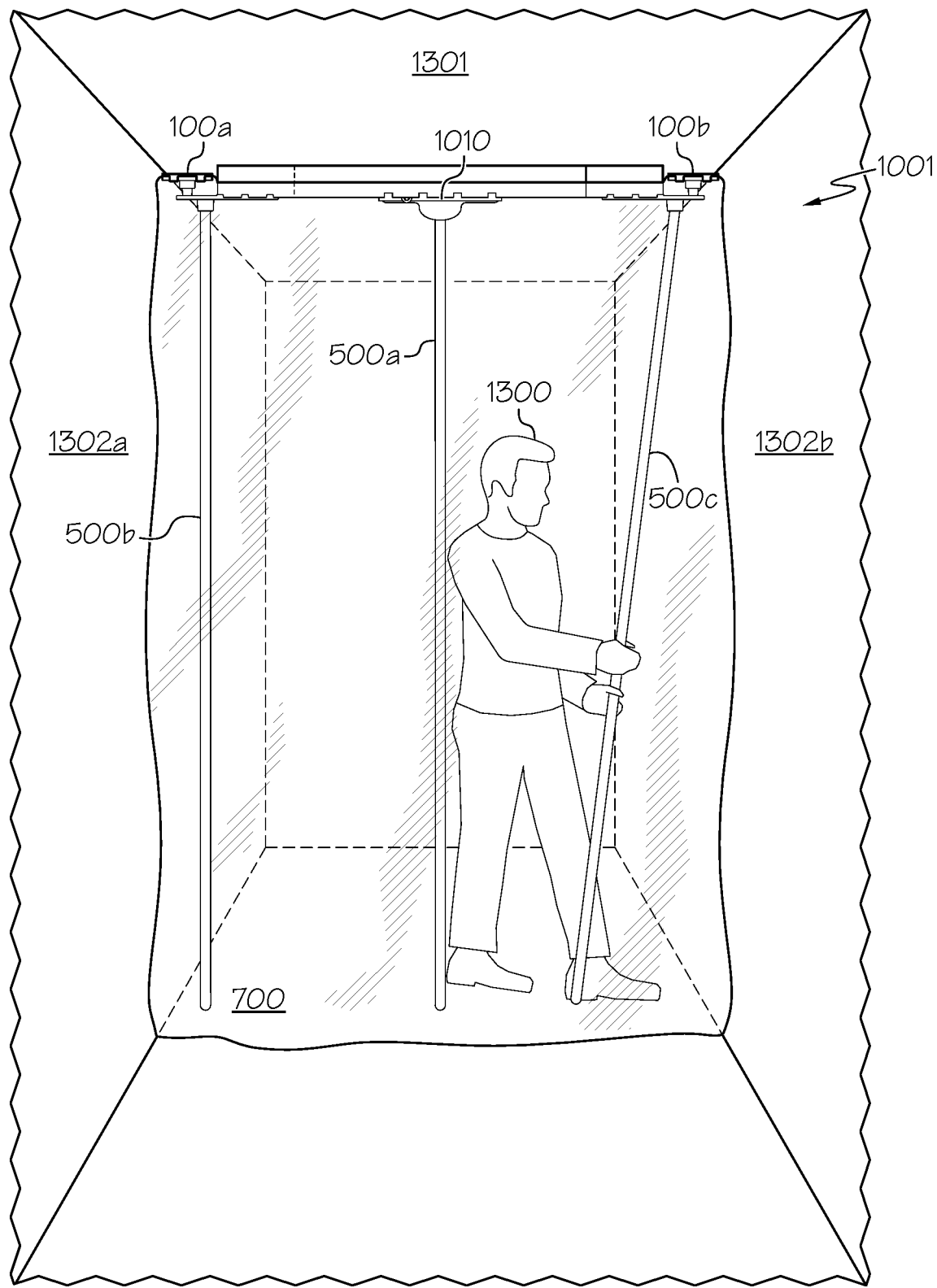

Referring to FIG. 12F, the installer places a third pole 500*c* to the second rail end mount 100*b* by positioning a ball 501 of the third pole 500*c* in the socket 400 of the second rail end mount 100*b*. The installer 1300 adjusts the length of the pole 500*c* so that the compression of the spring of the spring-loaded pole 500*c* operates outwardly to bias the second rail end mount 100*b* of the partition unit 1001 against the ceiling 1301, thereby, in turn, further pressing the curtain 700 against the ceiling 301 in the region of the second rail end mount 100*b*. The installer locks the length of the third pole 500*c* to secure the third pole 500*c* in place.

Figure 12G:
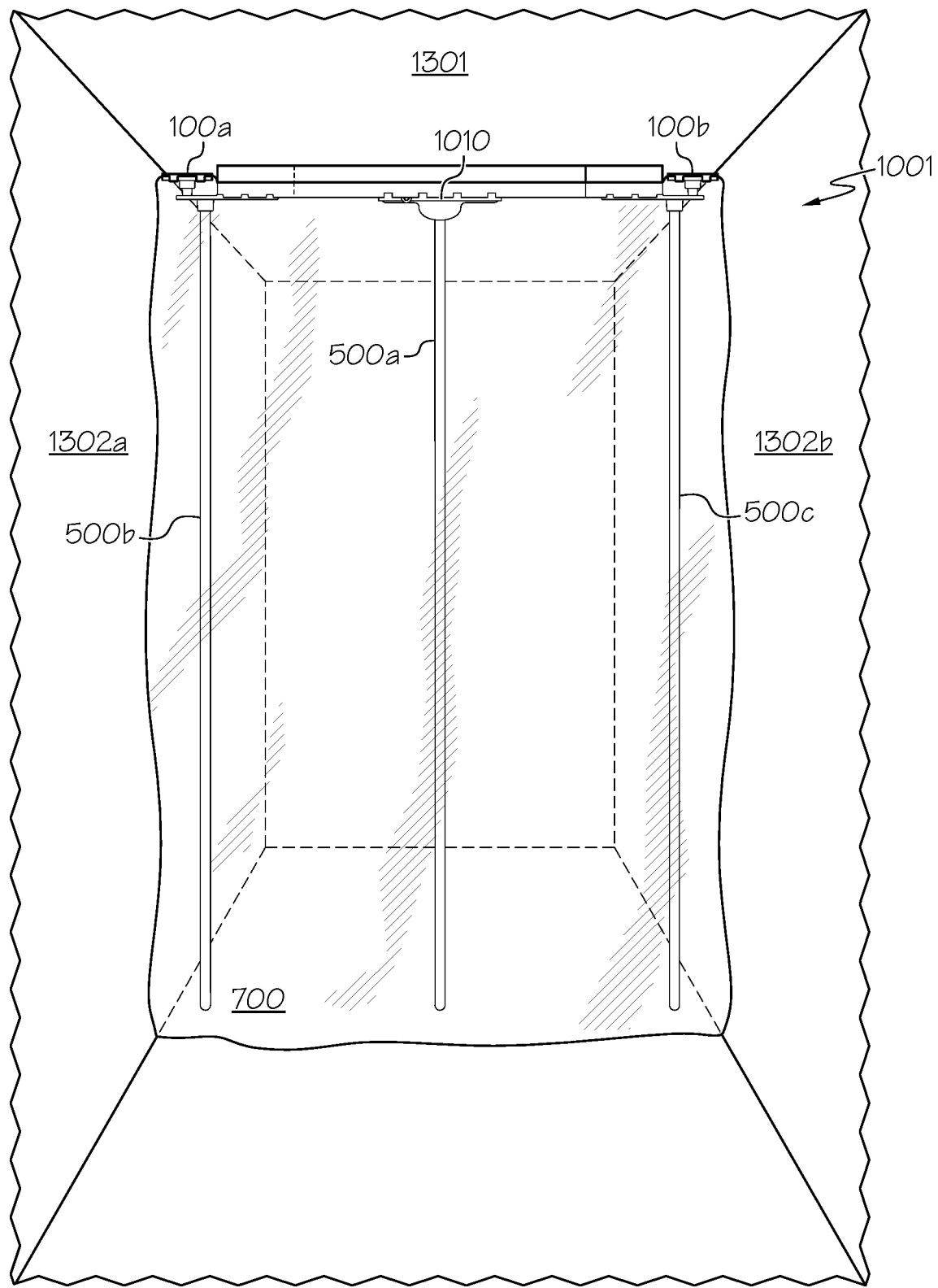

Referring to FIG. 12G, the partition unit 1001 and curtain 700 are now installed across the hallway between the first and second opposed walls 1301, 1302, and supported against the ceiling 1301 by the first, second and third poles 500*a*, 500*b*, 500*c*.

Figure 12H:
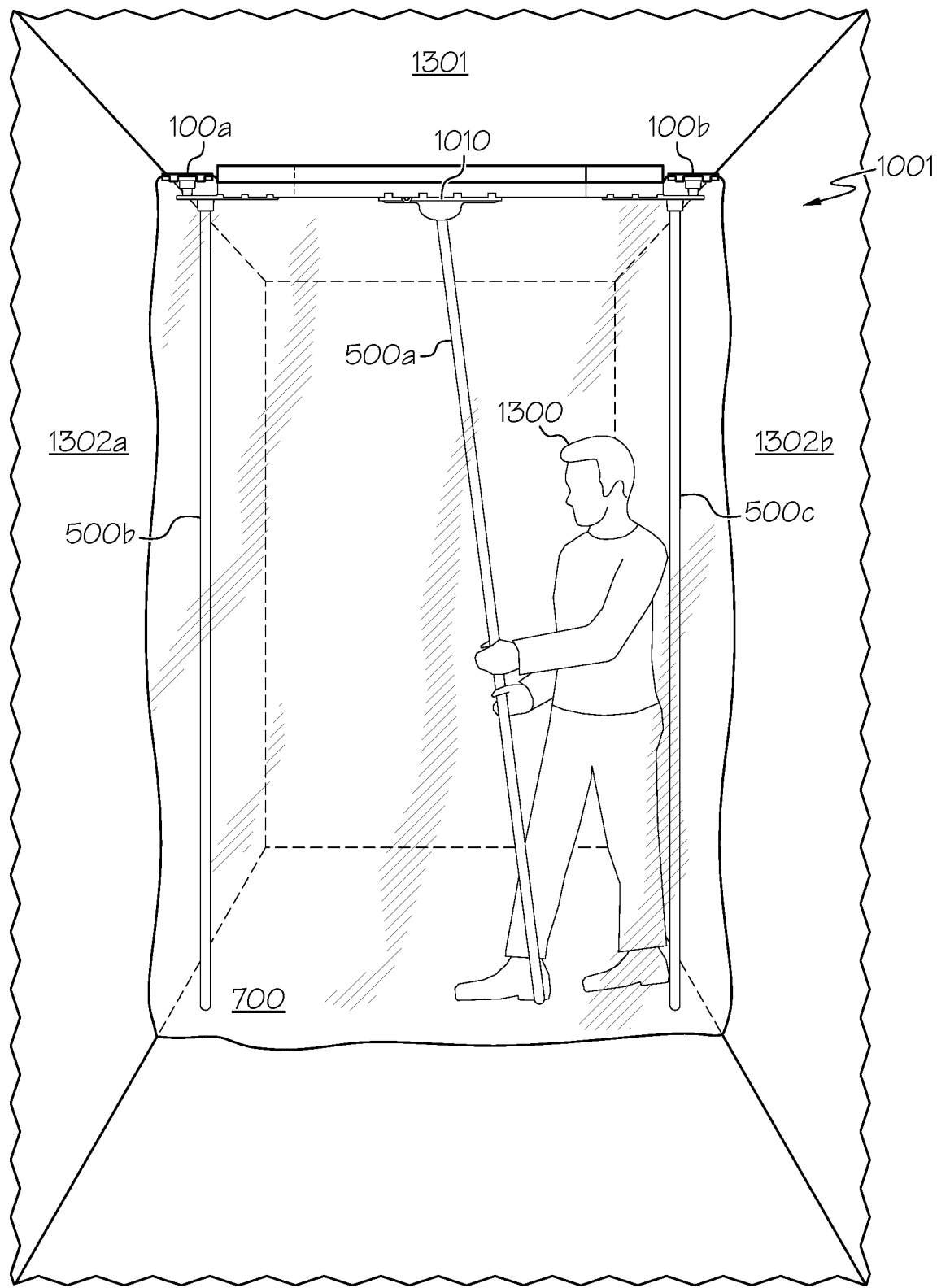

Referring to FIG. 12H, the installer removes the first pole 500*a* formerly positioned under coupler 1010. The feature of removal of the first pole 500*a* is particularly advantageous to the installation, since the first pole 500*a* was formerly positioned in a center region of the hallway, otherwise interrupting human passage through the hallway. In removing the first pole 500*a*, the installer 1300 may need to induce sufficient downward force on the first pole 500*a* relative to the coupler 1010 to decouple the ball 501 of the first pole 500*a* from the socket 1022 of the coupler 1010. This downward force applied by the installer 1300 is offset by the upward force applied to the partition unit 1001 by the second and third poles 500*b*, 500*c*. As a result, the partition unit 1001 remains in position when the first pole 500*a* is removed.

Figure 12I:
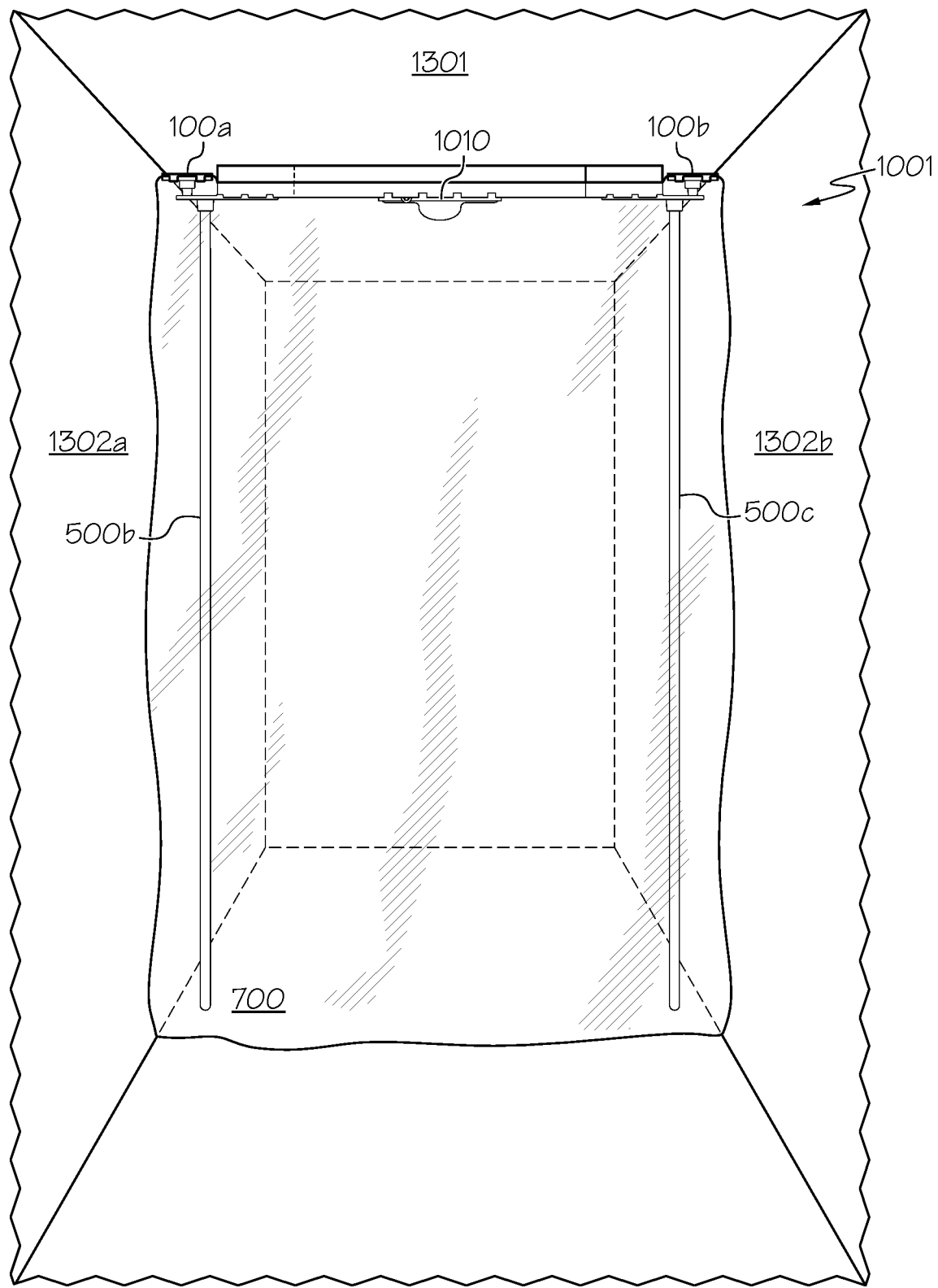

Referring to FIG. 12I, as a result of the removal of the first pole, the partition unit 1001 and curtain 700 are fully supported in position by the second and third poles 500*b*, 500*c*. The curtain 700 is positioned across the hallway.

Figure 12J:
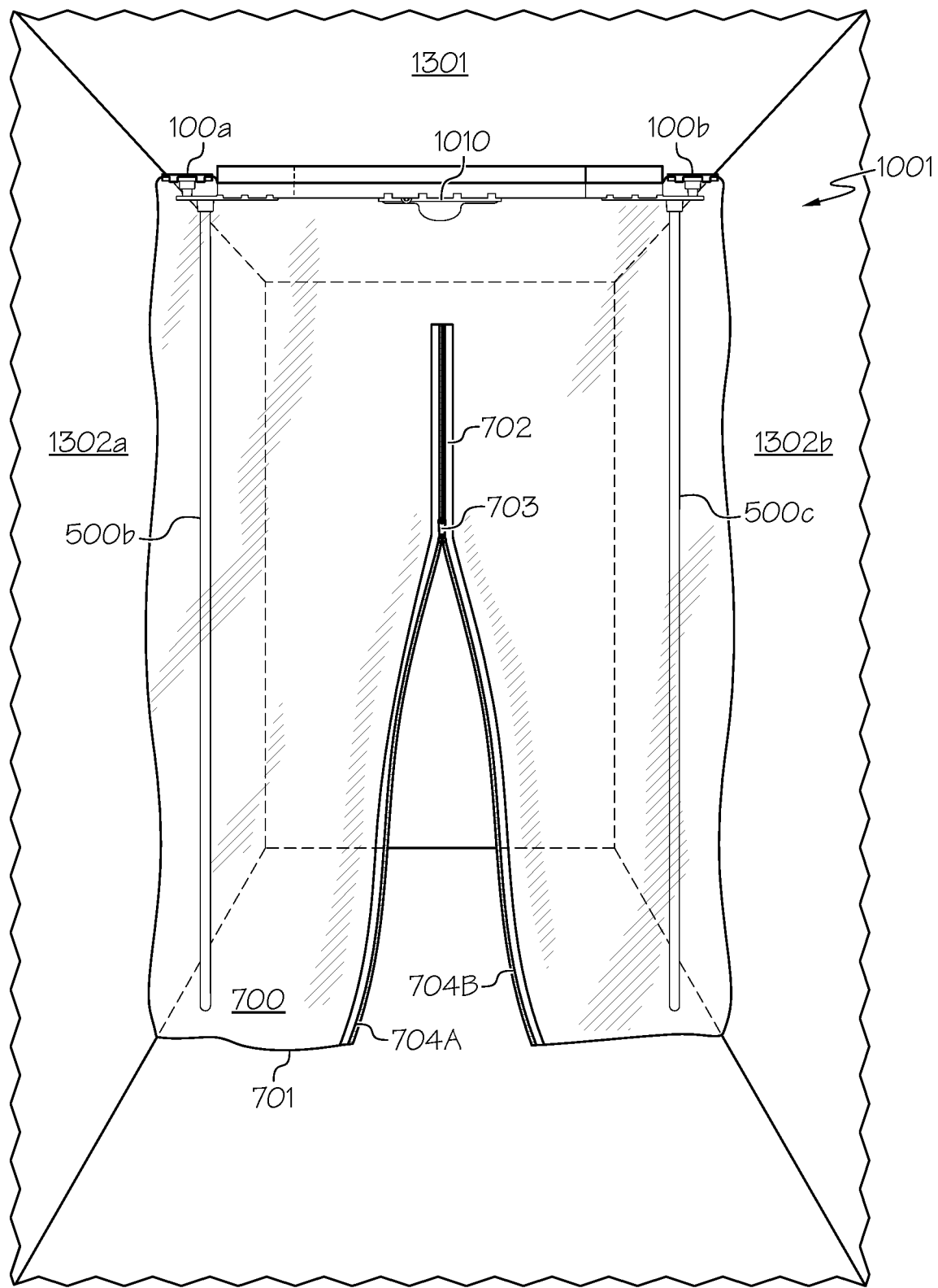

Referring to FIG. 12J, ingress and egress through the curtain 700 can be provided by including an access unit 702 at an inner region of the curtain. In some examples, the access unit 702 comprises a zippered opening that extends from an upper region of the curtain 700 to a lower edge 701 of the curtain 700. The resulting opening can be closed and re-opened, as desired, by a user, for example, by applying force to the zipper pull 703 of the zipper 704A, 704B. In some embodiments, the zipper 704A, 704B can be pre-attached to the curtain 700 so that the zipper is in place upon installation of the curtain 700. Illustrative embodiments of this type of zipper are provided in U.S. Pat. No. 9,115,539, incorporated herein by reference. In other embodiments, the zipper 704A, 704B can be applied by adhering the zipper to the surface of the curtain 700 following installation of the curtain 700. Illustrative embodiments of this type of zipper are provided in U.S. Pat. No. 7,742,512, incorporated herein by reference.

Figure 12K:
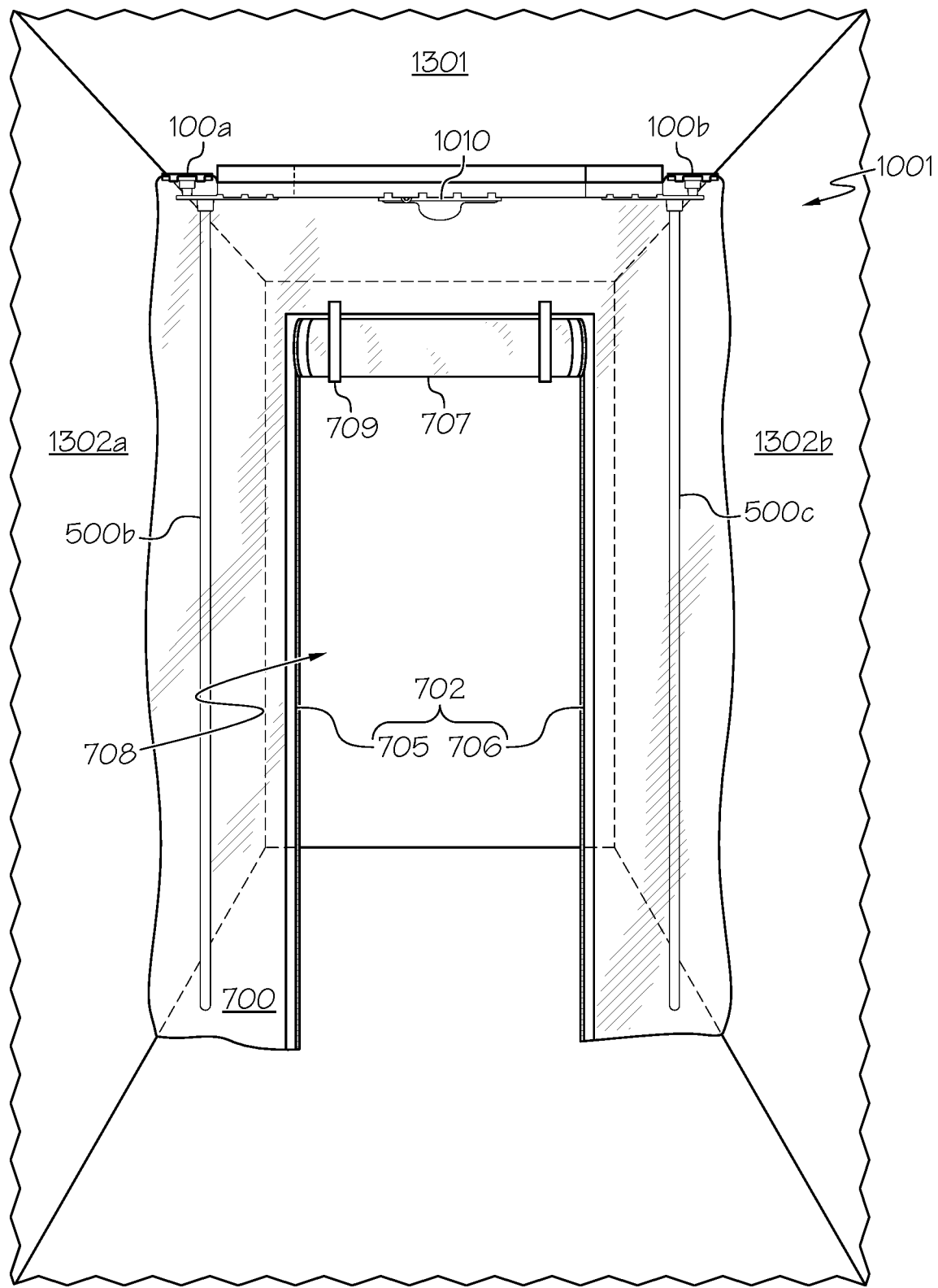

Referring to FIG. 12K, in some embodiments, the access unit 702 comprises first and second zippers 705, 706 positioned on the curtain 700 in a vertical orientation, parallel to each other, and spaced apart from each other as illustrated. The region of the curtain 700 between the two vertically oriented zippers can be collected in roll 707 to provide an access entryway 708 through the curtain 700. Hooks 709 can be positioned on the curtain to support the roll 707, as described in United States Publication Number 2012-0234705, published Sep. 20, 2012, incorporated herein by reference. In various embodiments, the first and second zippers 705, 706 can be mounted to the curtain 700 following installation of the curtain; alternatively, the first and second zippers 705, 706 can be pre-attached, according to the various embodiments described herein.

In other examples, the access unit 702 comprises a magnetic opening that operates to separate when sufficient opening force is applied and that operates to register itself to close the opening, when the opening force is removed. Illustrative embodiments of this type of magnetic opening are provided in PCT Publication No. WO 2017/117042, published Jul. 6, 2017, incorporated herein by reference.

FIGS. 13A-13D illustrate a method for installing a curtain in accordance with alternative embodiments of the present inventive concepts.

Figure 13A:
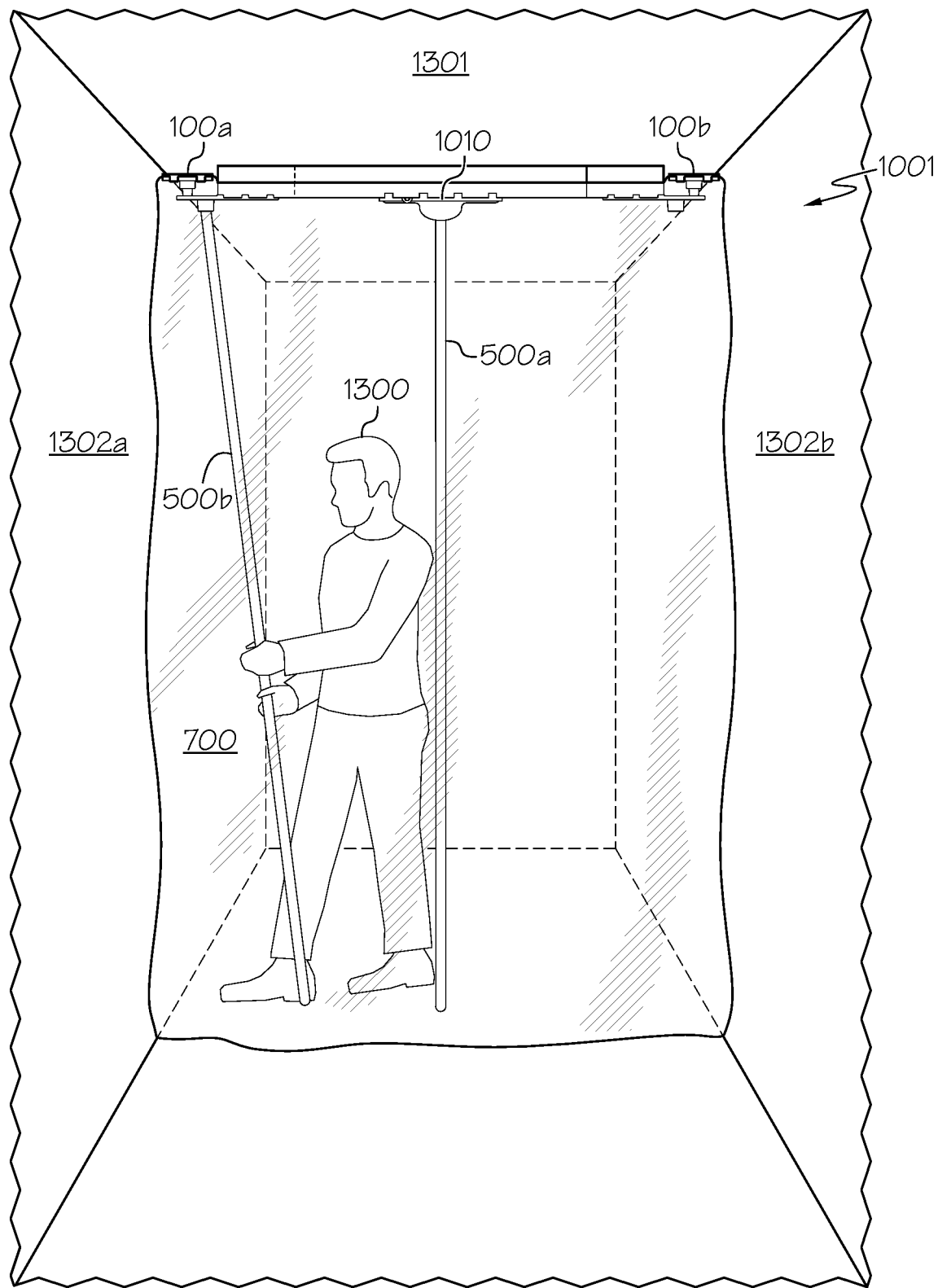
FIGS. 13A-13D illustrate a method for installing a curtain in accordance with alternative embodiments of the present inventive concepts.

Referring to FIG. 13A it can be seen that an installer has followed the method of installation described above in connection with FIGS. 12A-12E.

Figure 13B:
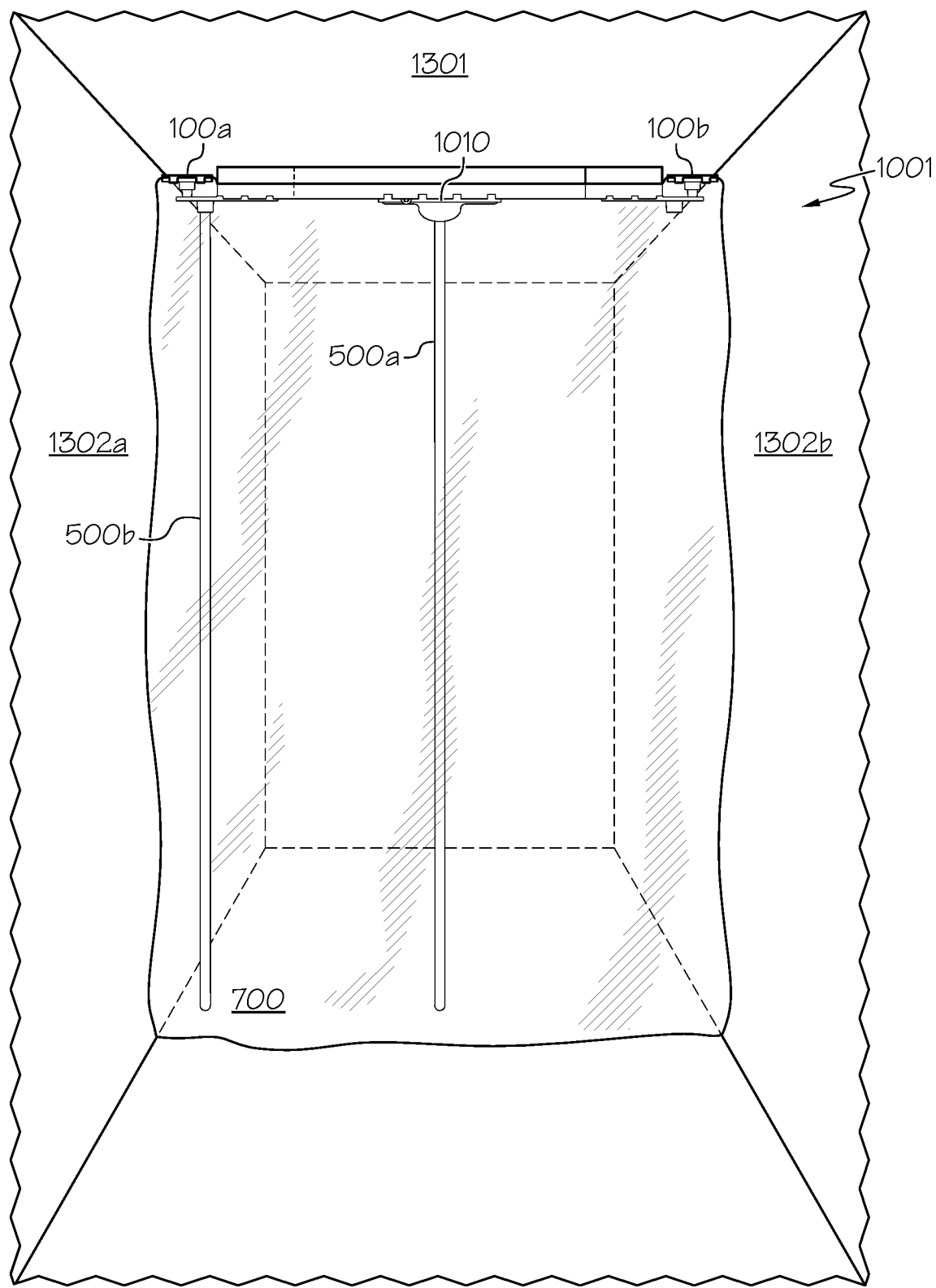

Referring to FIG. 13B, it can be seen in the present embodiment that the first pole 500*a* and second pole 500*b* are installed; however, the third pole 500*c* is not installed.

Figure 13C:
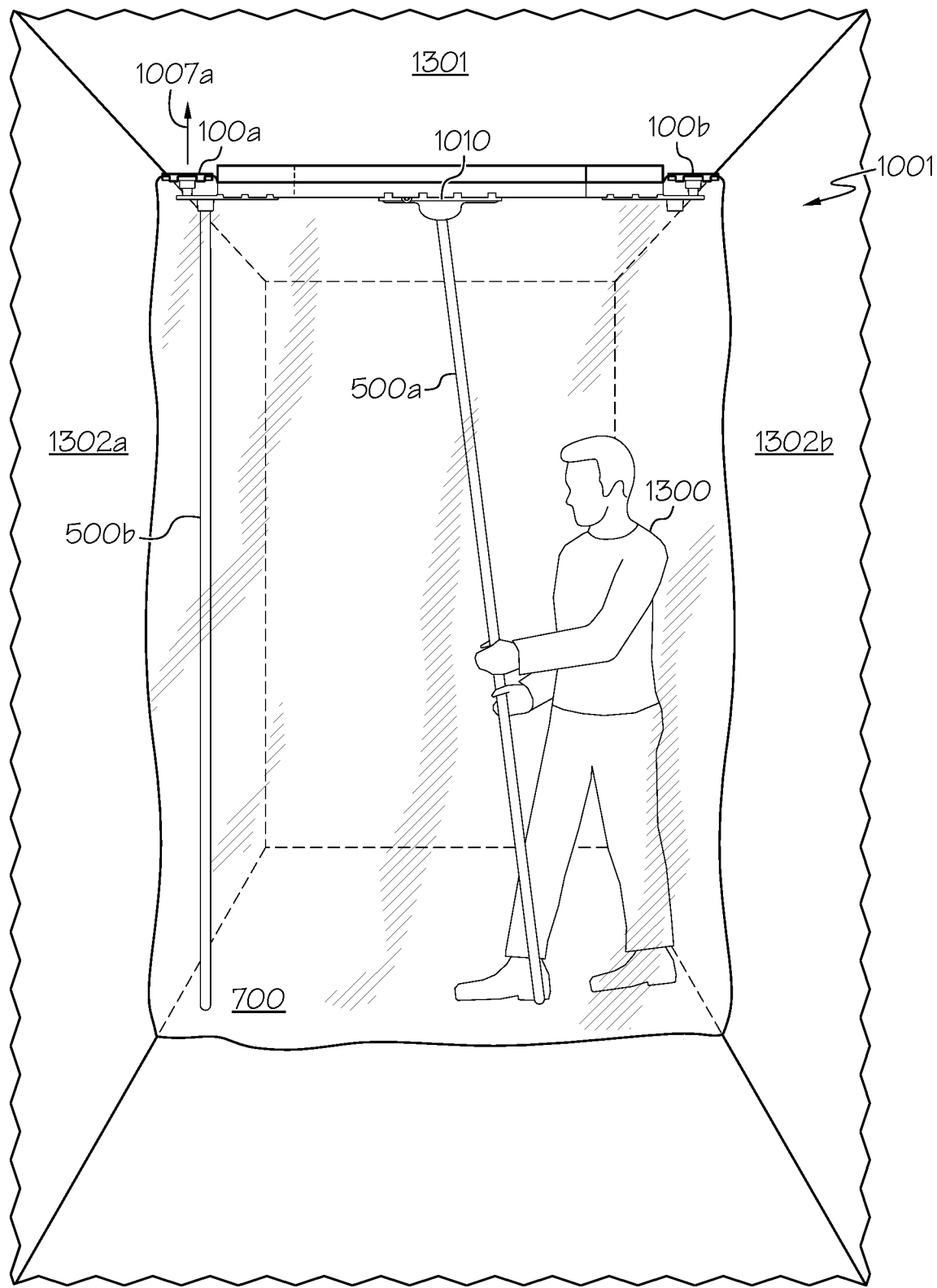

Referring to FIG. 13C, it can be seen in the present embodiment that, upon removal of the first pole 500*a*, the second pole 500*b* is the only vertical pole that remains. In the embodiment depicted, the upward bias of the second pole 500*b* operating on the first end mount 100*a* as shown by vertical arrow 1007*a* is sufficient for supporting the weight of the partition unit 1001 and the curtain 700.

Figure 13D:
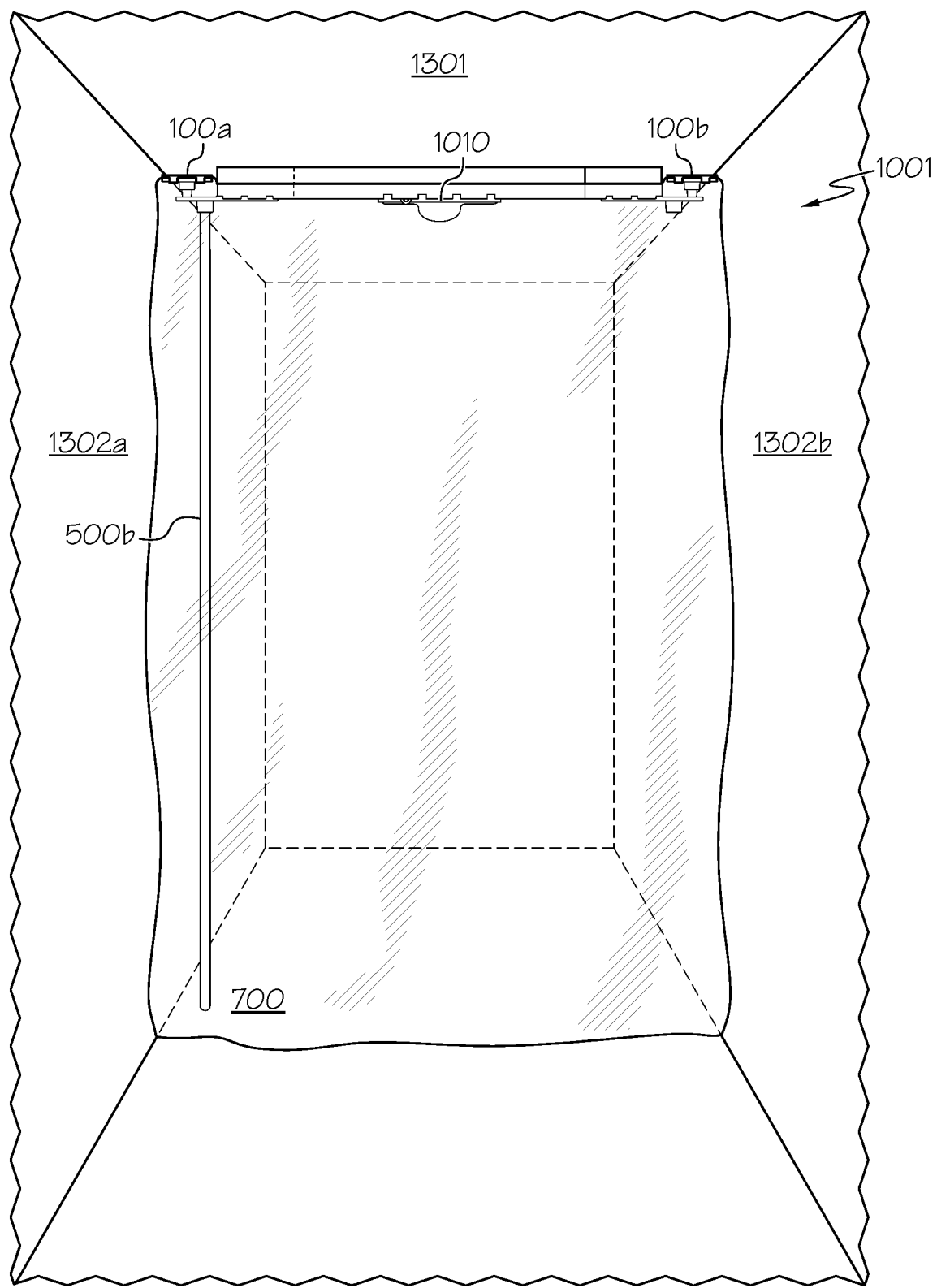

Referring to FIG. 13D, it can be seen that the installation includes the second pole 500b, but does not include the third pole 500c.

Figure 14:
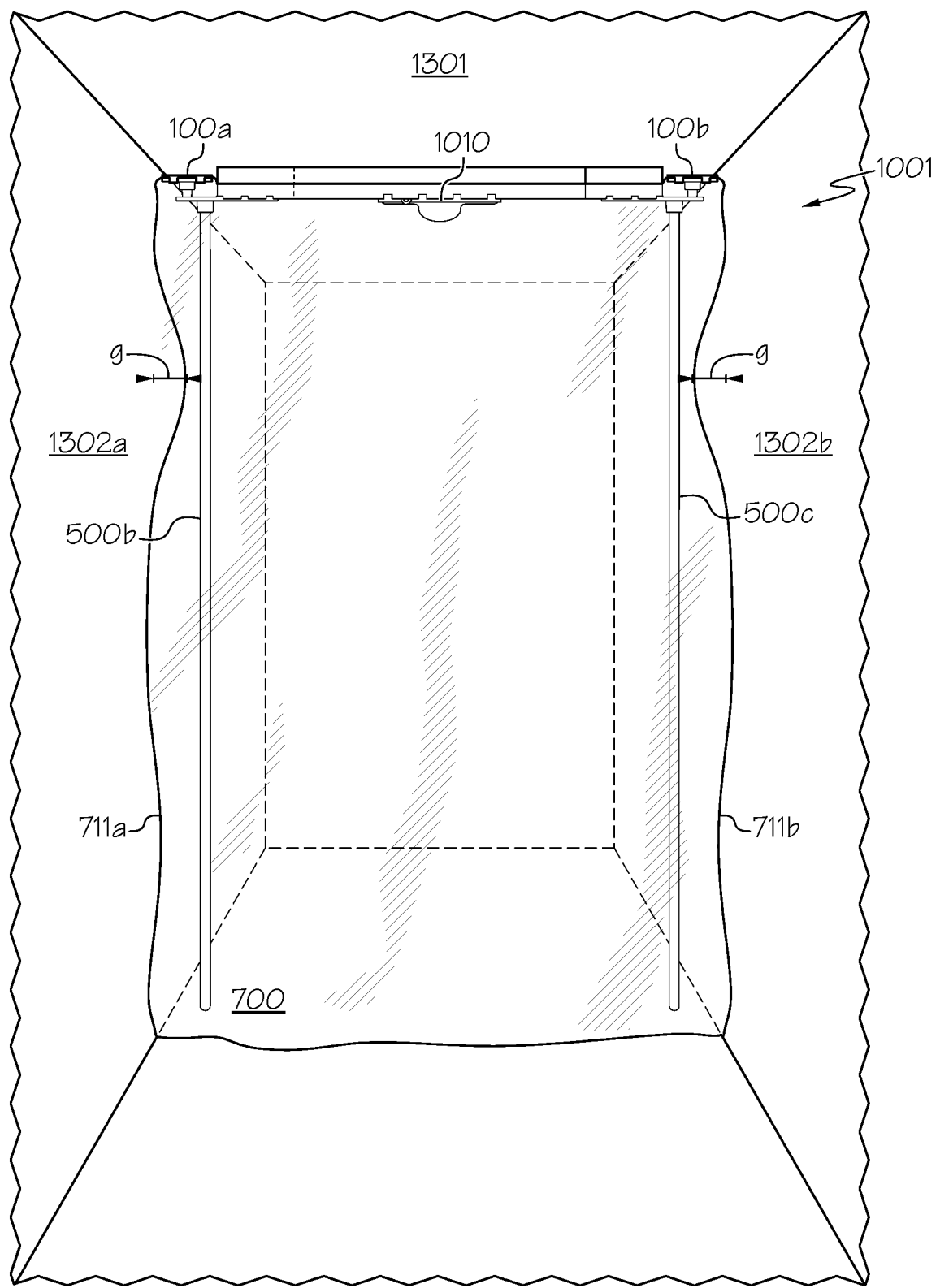
FIG. 14 is a close-up view of an installation of a curtain in accordance with the present inventive concepts.

FIG. 14 is a close-up view of an installation of a curtain 700, similar to the illustration of FIG. 12I, in accordance with the present inventive concepts. It can be seen in this illustration that a gap g may exist between the left and right side portions 711a, 711b of the curtain 700 and the left and right sidewalls 1302a, 1302b, respectively. This gap g, may be undesirable in some configurations, since it may permit abundant airflow at sides of the curtain, thereby permitting excessive migration of dust, contaminants, fumes, and the like through the installation. In some circumstances, it may be desirable for the installer to further urge or press the side portions 711a, 711b of the curtain 700 against the side wall 1302a, 1302b. In such instances, a first rail head 1202a may be employed to eliminate the left gap g; in addition a second rail head 1202b may be employed to eliminate the right gap g.

Figure 15:
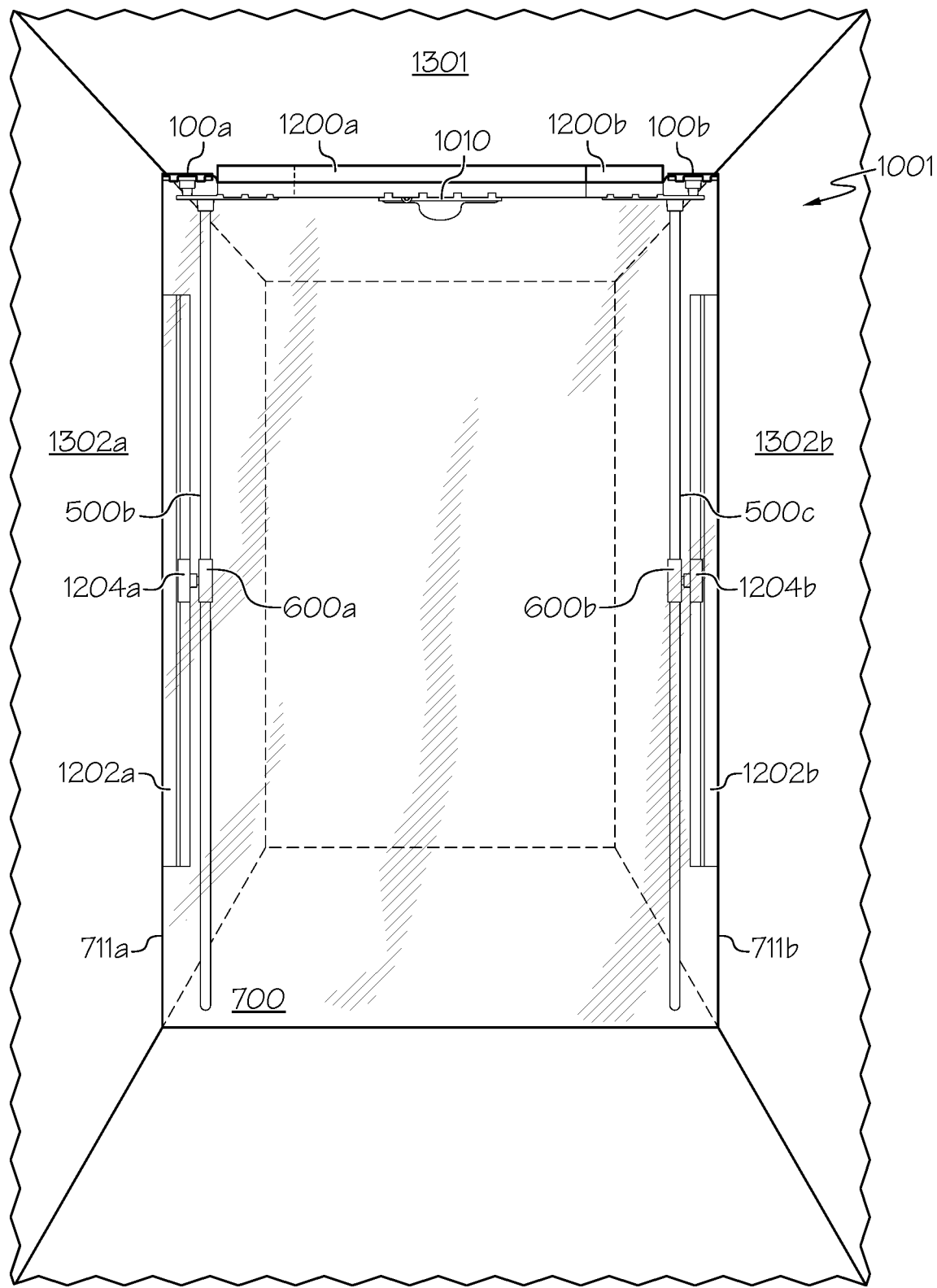
FIG. 15 is a close-up view of an installation of a curtain in which rail heads are employed to close a gap between side portions of the curtain and an abutting surface, in accordance with the present inventive concepts.

FIG. 15 is a close-up view of an installation of a curtain in which rail heads are employed to close a gap between side portions of the curtain and an abutting surface, in accordance with the present inventive concepts. In particular, a first rail head 1202a may be secured to a side portion of the first pole 500b, positioned between the first pole 500b and the left side portion 711a of the curtain 700 at the first side wall 1302a. A first bridge 600a is wedged between the first rail head 1202a and the second pole 500b, leveraged by horizontal bias that exists due to play in the vertically mounted pole 500b. In some embodiments, a proximal end of the first bridge 600a includes a friction pad that interfaces with the pole in a manner to resist slipping. A distal end of the first bridge 600a includes a ball that mates with a socket of a mount clip 1204a of the rail head 1202a. In an embodiment, the mount clip 1204a and rail head 1202a comprise a configuration of the type disclosed in U.S. Pat. No. 7,533,712, incorporated herein by reference. In another embodiment, the mount clip and rail head comprise coupler 1010 and first and second heads 1200b, 1200b as disclosed herein. Other configurations of the rail head and coupler are equally applicable to the present inventive concepts.

In the embodiment depicted in FIG. 15 it can be seen that the first rail head 1202a and first bridge 600a engaging the second pole 500b urge the first portion of 711a of the curtain against the left wall 1302a, and the second rail head 1202b and second bridge 600b engaging the third pole 500c urge the second portion of 711b of the curtain against the right wall 1302b.

Figure 16A:
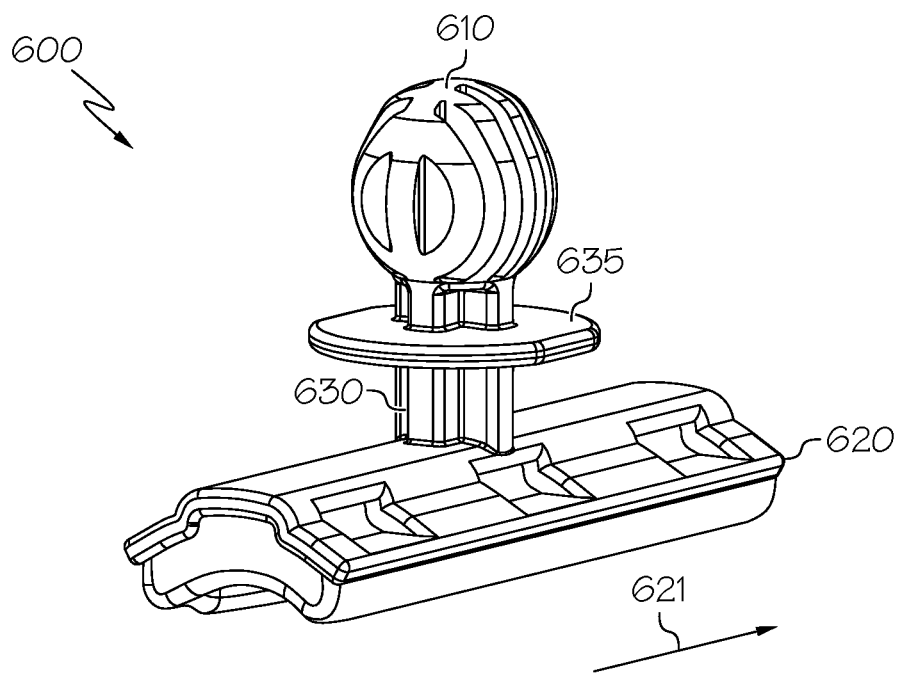
FIGS. 16A and 16B are top and bottom perspective views, respectively, of an embodiment of a bridge in accordance with the present inventive concepts.
Figure 16B:
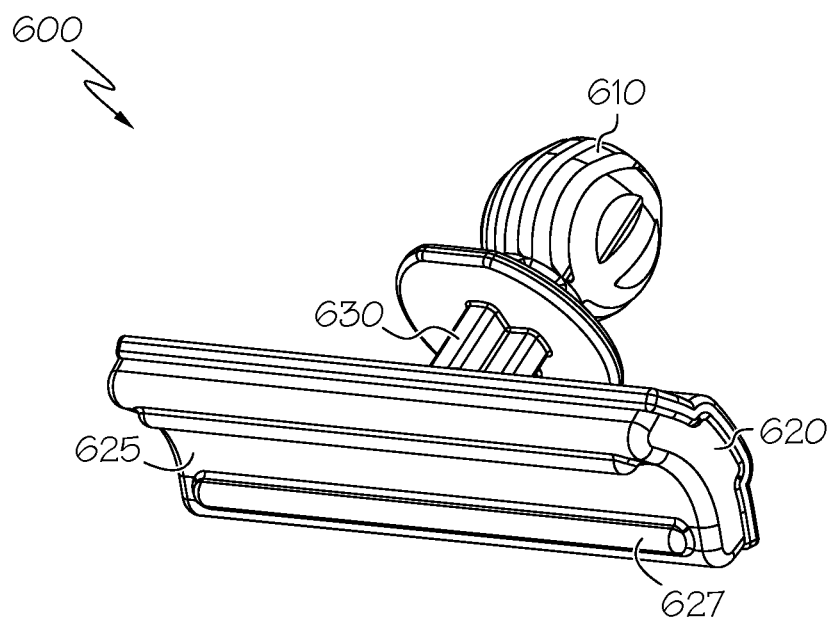

FIGS. 16A and 16B are top and bottom perspective views, respectively, of an embodiment of a bridge 600 in accordance with the present inventive concepts. In some embodiments, the bridge 600 is constructed and arranged to couple with a socket at a ball 610 at its distal end and with a sidewall of a pole 500 at a base 620 its proximal end. In the present embodiment, the bridge 600 comprises a connector 610 that is constructed and arranged to couple with the socket 1022 of the rail coupler 1010, or a similar socket. In some embodiments, the connector 610 may be a universal joint ball as described in United States Publication No. 2017/0020322, published Jan. 26, 2017, the contents of which are incorporated by reference.

In some embodiments, the bridge 600 may further comprise a base 620. In some embodiments, the base 620 extends along a third horizontal direction 621 and is constructed and arranged to support the pole 500. In some embodiments, the base 620 may have a curved cross-section at a section taken transverse the third horizontal direction.

The base 620 may comprise a bridge friction pad 625 that is constructed and arranged to create friction, and prevent slippage, with the pole 500.

In some embodiments, the bridge friction pad 625 may comprise at least one groove 627 that can be indented or raised relative to the primary surface of the pad 625. In some embodiments, the at least one groove 627 may be aligned along the third horizontal direction. In some embodiments the at least one groove 627 may be transverse to the third horizontal direction. In some embodiments, the connector may comprise at least two grooves and at least one groove may be aligned along the third horizontal direction and at least one additional groove may be transverse the third horizontal direction.

In some embodiments, the connector 610 and the base 620 are connected by a neck 630. The neck 630 may comprise a neck retainer 635 that is constructed and arranged to restrict the motion of the bridge 600. For example, in some embodiments, the bridge connector 610 is a universal joint ball that is capable of rotating in any direction. The neck retainer 635 may restrict that motion to a single plane, for example along the third horizontal direction. In some embodiments, the length of the neck 630 may be adjustable.

Figure 17C:
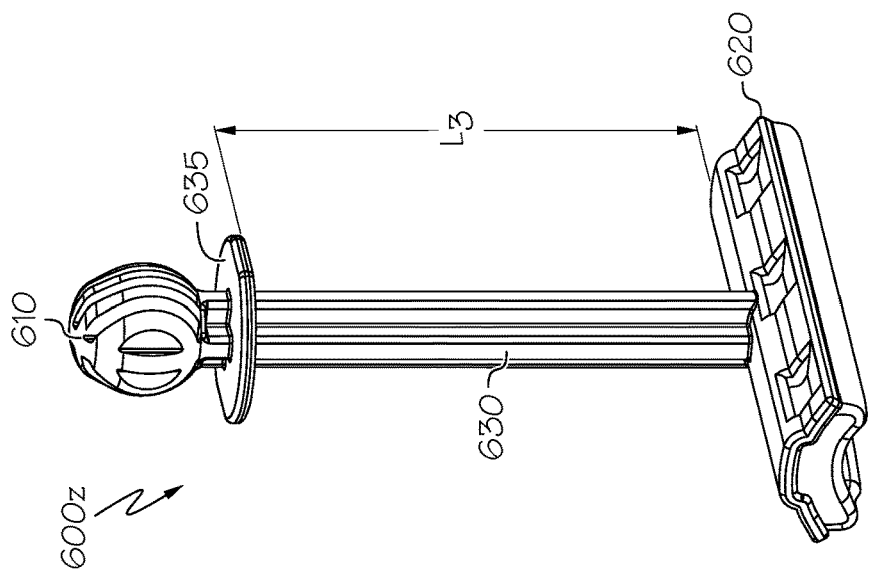
FIGS. 17A, 17B and 17C are top perspective views of embodiments of bridges having different neck lengths in accordance with the present inventive concepts.
Figure 17B:
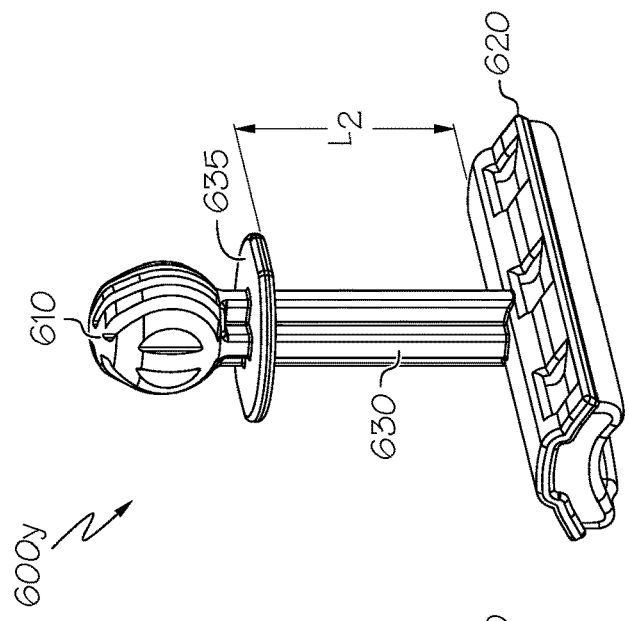
Figure 17A:
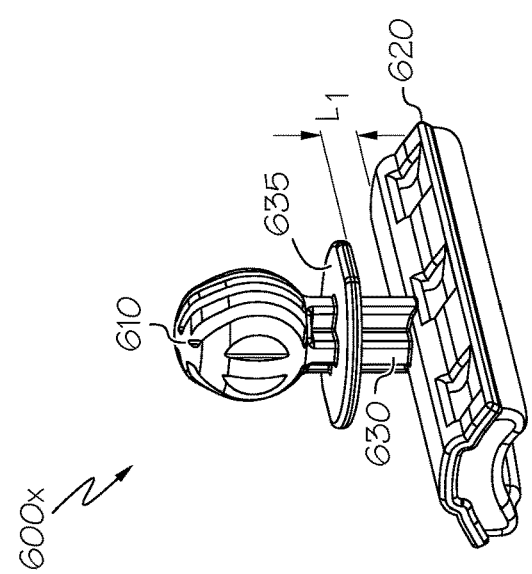

FIGS. 17A, 17B and 17C are top perspective views of embodiments of bridges having different neck lengths in accordance with the present inventive concepts. In particular, the bridges 600x, 600y, 600z depicted have different neck lengths L1, L2, L3. An assortment of the various bridges 600x, 600y, 600z can be provided in a kit so that an installer can select a bridge of suitable length, depending on the size of the gap g to be closed.

Figure 17D:
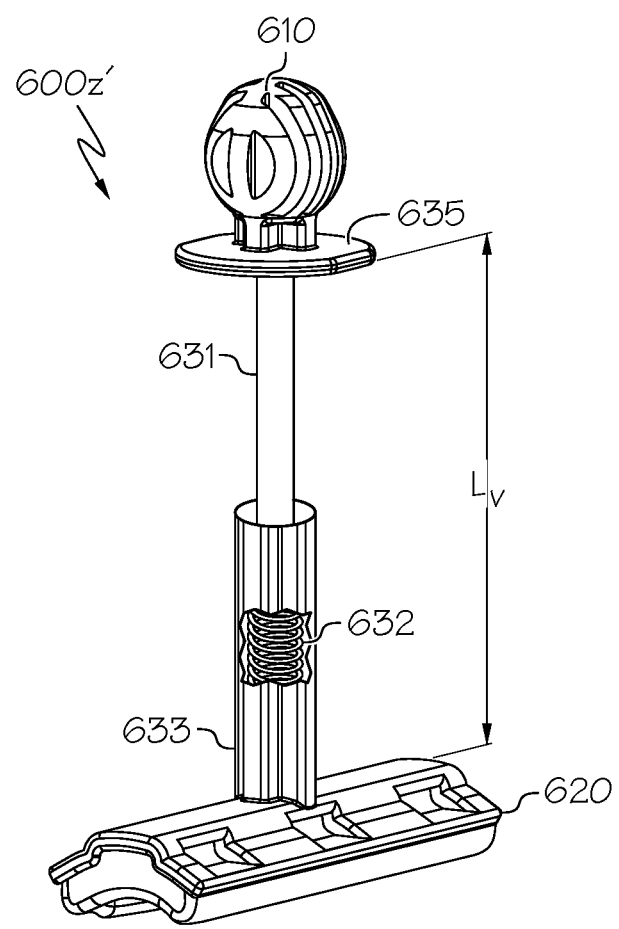
FIG. 17D is a top perspective view of an embodiment of a bridge having a variable neck length in accordance with the present inventive concepts.

FIG. 17D is a top perspective view of an embodiment of a bridge having a variable neck length in accordance with the present inventive concepts. In this embodiment of the bridge 600z', the neck includes a neck base 633 and a neck extension 631. The neck extension 631 couples to the neck base 633 at a neck length variation mechanism 632. In some embodiments, the neck length variation mechanism 632 comprises a spring that permits travel of the neck extension 631 relative to the neck base 633, while maintaining an outward bias between the neck extension 631 and the neck base 633. In some embodiments, the neck length variation mechanism 632 comprises a threaded interface that permits travel of the neck extension 631 relative to the base 633 by allowing travel through the threaded interface. In this matter, a bridge 630' with a variable neck length Lv can be provided, so as to accommodate a range of desired bridge lengths for a range of gap sizes g.

Figure 18:
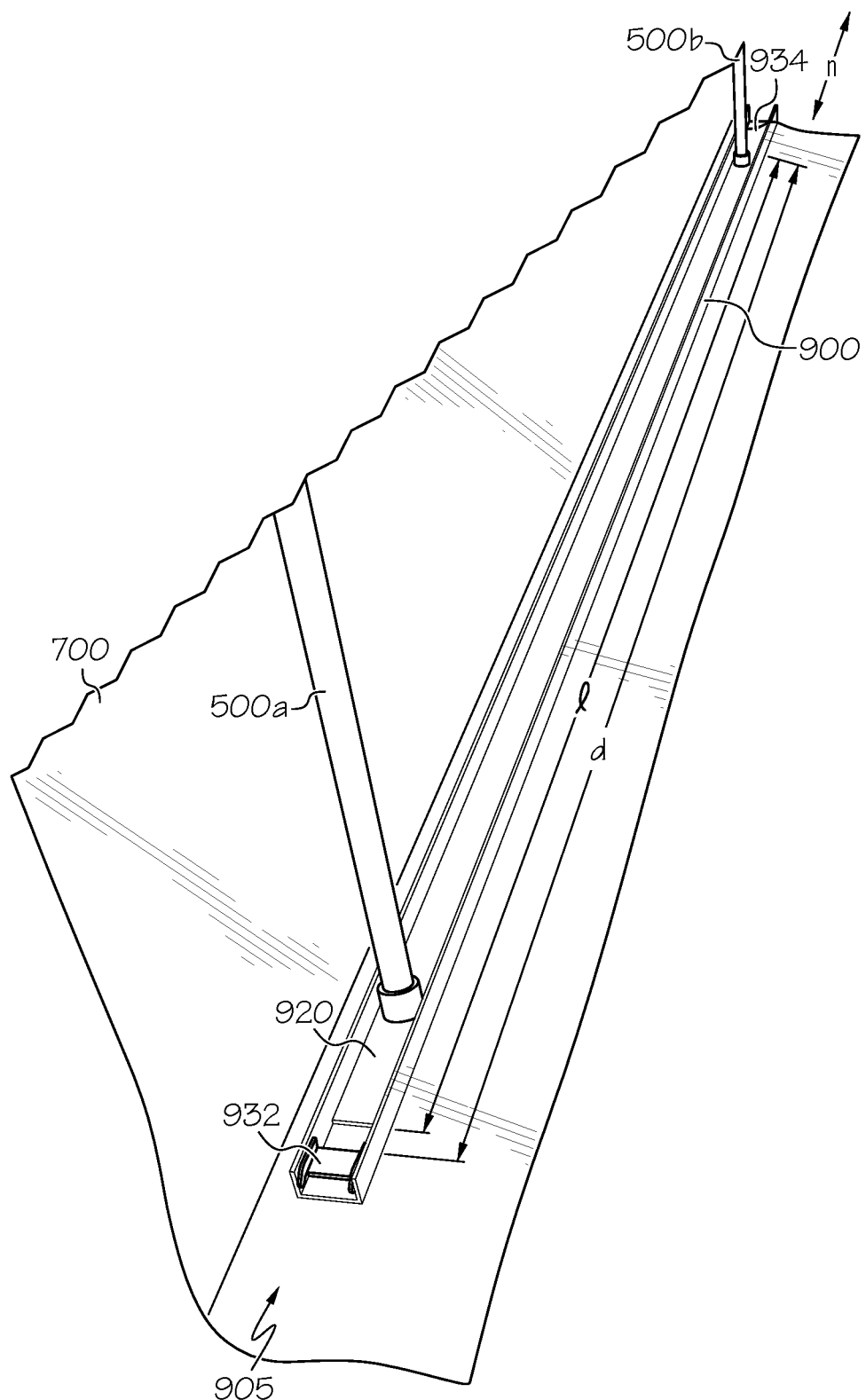
FIG. 18 is a perspective view of an embodiment of a system for securing a portion of a curtain in a partition mount system, in accordance with aspects of the present inventive concepts.

FIG. 18 is a perspective view of an embodiment of a system for securing a portion of a curtain 700 in a partition mount system, in accordance with aspects of the present inventive concepts. In the embodiment shown, the system comprises a floor rail 900, pole platform 920, at least one pole 500, and a curtain 700. In some embodiments, the floor rail 900 is elongated in a first direction along a first axis in a linear direction n and comprises a first connector portion 932 at a first end and a second connector portion 934 at a second end. In some embodiments, a first connector portion 932a of a first floor rail 900a couples to a second connector portion 934b of a second floor rail 900b. Additional details of an example embodiment of a first connector portion 932a and second connector portion 932b are described herein in connection with FIGS. 20A and 20B. In some embodiments, the system described herein is useful for securing a loose portion of curtain to an abutting surface, such as a floor or wall of a room and thereby preventing undesired gaps in the partition system.

In the embodiment shown, the floor rail 900 comprises a channel 905 that extends along its length. In this embodiment, a lower portion of the curtain 700 is positioned in the channel 905 and the pole platform 920 is positioned in the channel 905 and above the curtain 700. At least one pole 500 is positioned above the pole platform 920. In some embodiments, the direction of extension of the at least one pole 500 is transverse the length of extension of linear direction n of the floor rail 900. The lower end of the pole 500 engages the pole platform 920, which in turn engages the lower portion of the curtain 700 to secure the curtain 700 in place at the floor rail 900. It can be seen that multiple poles 500a, 500b can be positioned at different locations on the floor rail 900 to further enhance the interaction of the pole platform 920 and lower portion of the curtain 700.

FIG. 19A1 is a perspective view of an embodiment of a floor rail 900 for a partition system, in accordance with aspects of the present inventive concepts. The floor rail 900 comprises a base 902 comprising opposed upper 904 and lower surfaces 906. In some embodiments, the base 902 extends in a linear direction n of extension. In other embodiments, the base 902 extends in a non-linear direction, for example, extends in a curved direction. In other embodiments, the base 902 extends in non-linear direction of extension such as an angled or zig-zagged direction of extension.

In some embodiments, the floor rail 900 comprises at least one side wall 908. In some embodiments, the at least one side wall comprises first and second side walls 908a, 908b along opposite edges of the base 902, as shown in FIG. 19. In some embodiments, the upper surface 904 of base 902 of the floor rail 900 and the first and second walls 908 define a channel 905 that extends along the length of the base 902.

In an installed configuration, a lower portion of a curtain 700 can be positioned at the channel 905 at the floor rail 900. In some embodiments, a pole platform 920 is positioned above the curtain 700 and urged into the channel 905 against the base 902 of the floor rail by a bottom portion of a pole positioned therein, as shown in FIG. 18. In some embodiments, the length of the pole platform 920 has a length that is dimensioned to fit in the channel 905 between the first connector portion 932 and the second connector portion 934 of a floor rail 900. In such an embodiment, the length Z of the pole platform 920 is less than a distance d between the first and second connector portions 932, 934, as shown in FIG. 18. In some embodiments, the pole platform 920 is constructed and arranged to correspond to or match the shape of the base 902 of the floor rail 900.

Figure 11C:
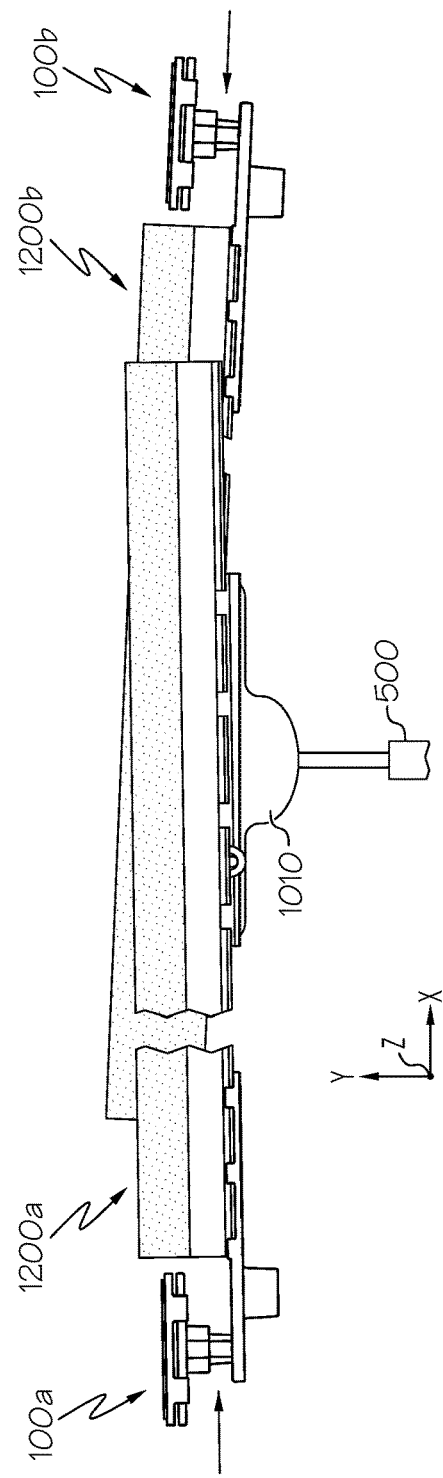

FIG. 19A2 is a perspective view of an embodiment of a floor rail 900 and two rail heads 200, in accordance with aspects of the present inventive concepts. In some embodiments, the width w of the floor rail 900 are equal to or greater than the width of at least two rail heads 200a, b, as shown in FIG. 19A2. In this embodiment a bottom end of a pole 500 is coupled to a coupler 1010, for example in a manner similar to the configuration of FIGS. 11A-11C herein. In this embodiment, two rail heads 200a, b are positioned at the coupler 1010. The pole exerts downward pressure on the coupler 1010, the rail heads 200a, b, and the curtain 700.

Figure 19B:
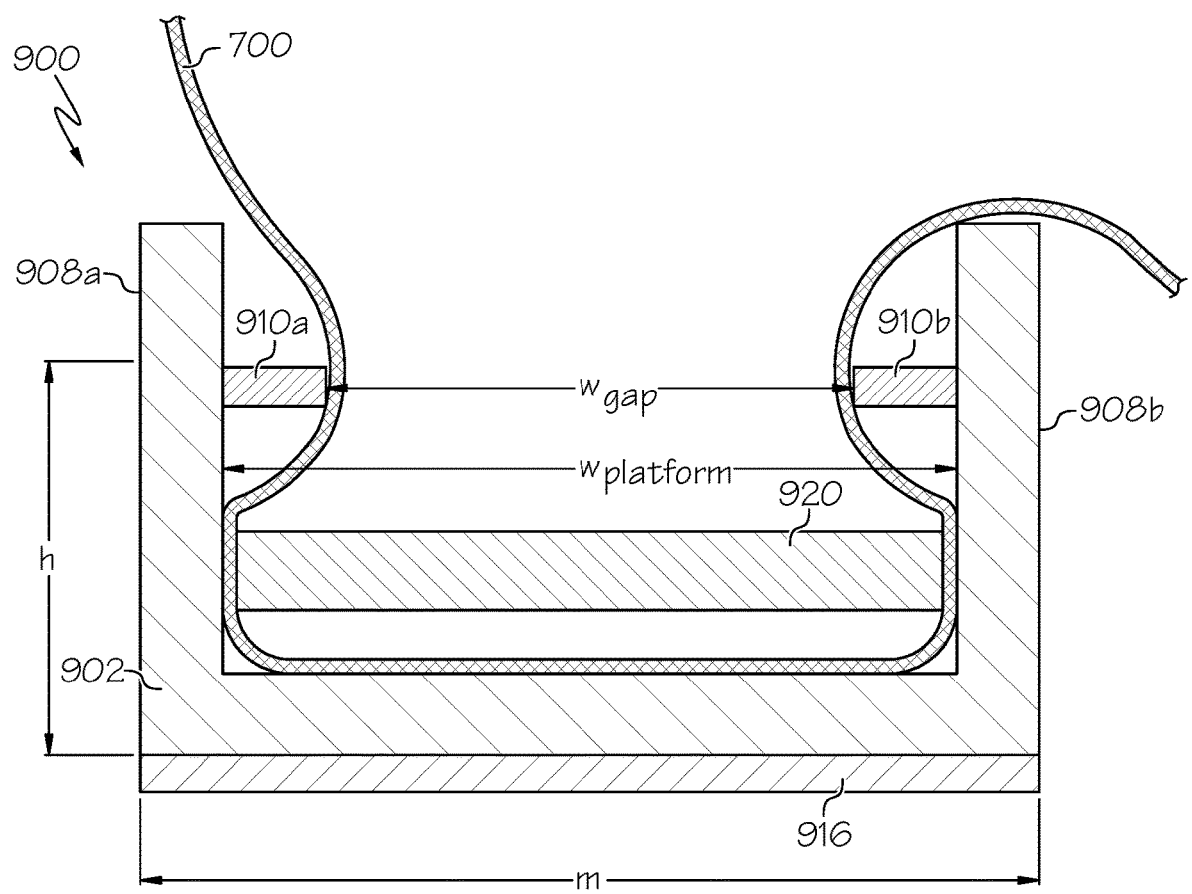
FIG. 19B is a side view of an embodiment of a floor rail and a pole platform, in accordance with aspects of the present inventive concepts.

FIG. 19B is a cutaway side view of an embodiment of a floor rail 900 and a pole platform 920, in accordance with aspects of the present inventive concepts. In the embodiment shown in FIG. 19B, the floor rail 900 comprises two opposed side walls 908a 908b—one at each side of the base 902. In the present embodiment, each side wall 908a, 908b comprises a lip 910a, 910b. In some embodiments, a direction of extension of the lip 910 is transverse to a direction of extension of the side wall 908. In the embodiment shown, the distance between opposing lips 910 $w_{gap}$ is less than the width of the pole platform $w_{platform}$, along the transverse direction m. In the embodiment shown, the lower portion of the curtain 700 is positioned to fit between the lip 910 and the pole platform 920 on each side. The height of the lip 910 h relative to the base 902 is determined such that the curtain 700 can readily fit between each lip 910 and the pole platform 920 at each side of the pole platform.

In the embodiment shown in FIG. 19B, the floor rail 900 comprises two lips 910a, 910b, each positioned at a respective one of the opposed side walls 908a, 908b. In alternative embodiments, the floor rail 900 comprises a single lip 910, for example positioned at one of the opposed side walls 908a or 908b. In alternative embodiments, the floor rail 900 comprises more than two lips 910. In alternative embodiments, the floor rail 900 does not comprise a lip 910.

In the embodiment shown in FIG. 19B, each lip 910a, 910b extends along a substantial portion of the length of the floor rail 900. In alternative embodiments, at least one of the lips extends along less than a substantial portion of the full length of the floor rail 900.

In some embodiments, at least one lip further secures the lateral position of at least one pole 500. In alternative embodiments, the floor rail 900 comprises pole seats 912 constructed and arranged to secure the lateral position of at least one pole 500.

In the embodiment shown in FIG. 19B, the floor rail 900 comprises a friction material 916 at the lower surface 906 of the base 902. In some embodiments, the pole platform 920 comprises a friction material 916 at a lower surface. In alternative embodiments, the floor rail 900 comprises a friction material 916 on the upper surface 904 of the base 902. In alternative embodiments, at least one of the lips 910 comprises a friction material 916. In some embodiments, the friction material 916 comprises a pad of non-skid material applied to a lower surface of the rail 900. In some embodiments, the body of the floor rail 900 can be formed of a non-skid material.

Referring to the view of FIG. 19B, in some embodiments, the pole platform 920 is dimensioned relative to the distance between the first and second side walls 908a, 908b so that positioning of the pole platform 920 below the lips 910a, 910b requires the pole platform 920 to be tipped at an angle relative to the base 902 of the floor rail 900 for insertion below the lips 910a, 910b. In addition, in some embodiments, the pole platform 920 is dimensioned relative to the height of the lips 910a, 910b above the base 902 so that positioning of the pole platform 920 below the lips 910a, 910b requires the pole platform 920 to be tipped at an angle relative to the base 902 of the floor rail 900 for insertion below the lips 910a, 910b. In addition, in some embodiments, the pole platform 920 is dimensioned relative to the length of the lips 910a, 910b so that positioning of the pole platform 920 below the lips 910a, 910b requires the pole platform 920 to be tipped at an angle relative to the base 902 of the floor rail 900 for insertion below the lips 910a, 910b.

Figure 20A:
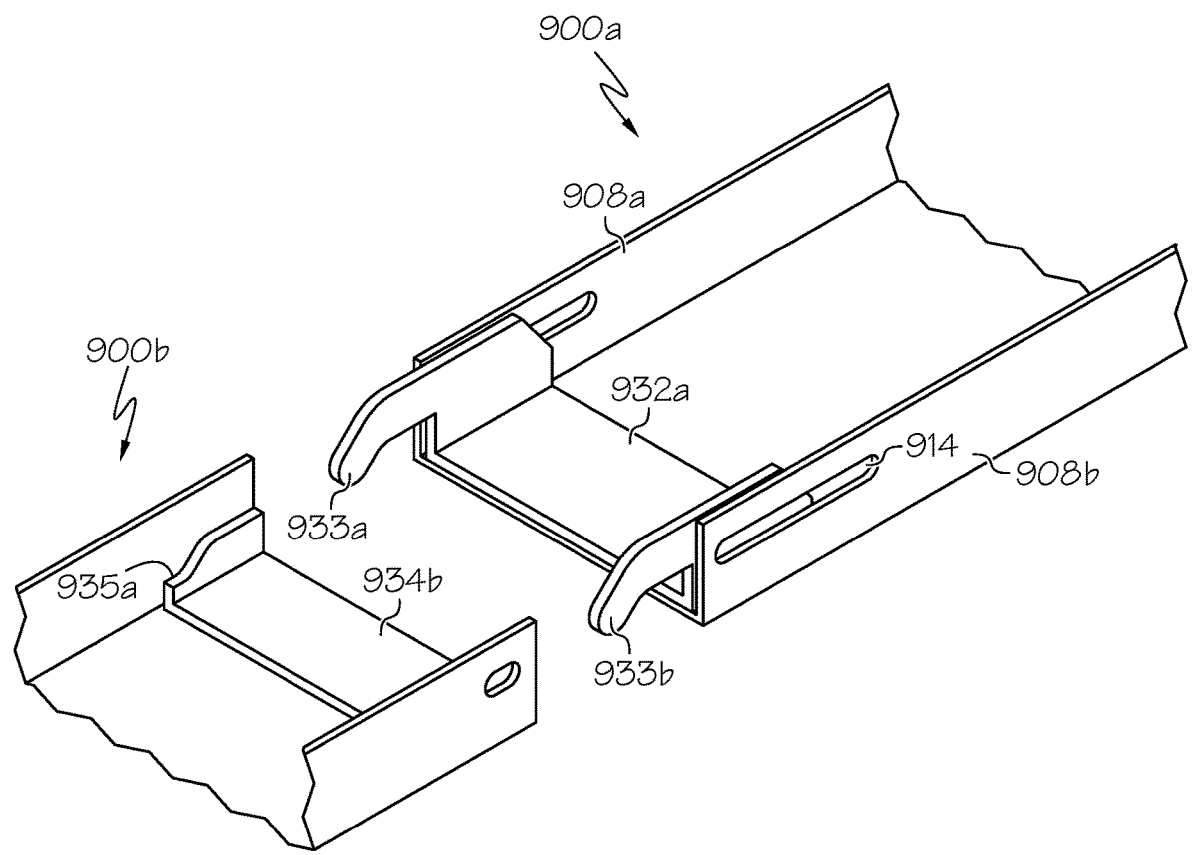
FIG. 20A is a perspective view of an embodiment of a first connector portion and a second connector portion, in accordance with aspects of the present inventive concepts.

FIG. 20A is a perspective view of an embodiment of a first connector portion 932a and a second connector portion 934b, in accordance with aspects of the present inventive concepts. In some embodiments, a first connector portion 932a positioned at a first end of a first floor rail 900a couples to a second connector portion 934b positioned at a second end of a second floor rail 900b. In some embodiments, the first connector portion 932a comprises one or more claws 933. In the embodiment shown in FIG. 20A, the first connector portion 932a comprises two claws 933a, b, one on each side of the first connector portion 932a. In alternative embodiments, the first connector portion 932a comprises a different number of claws.

In some embodiments, the second connector portion 934b comprises one or more seats 935. In the embodiment shown in FIG. 20A, the second connector portion 934b of the second floor rail 900b comprises two seats 935a, b (not shown), one on each side of the second connector portion 934b. In alternative embodiments, the second connector portion 934b comprises a different number of seats.

In some embodiments, the first connector portion 932a of the first floor rail 900a couples to the second connector portion 934b of the second floor rail 900b. In some embodiments, when the first and second connector portions 932a, 934b are coupled each of the one or more claws 933 of the first connector portion 932a are mated with a corresponding one of the one or more seats 935 of the second connector portion 934b.

Figure 20B:
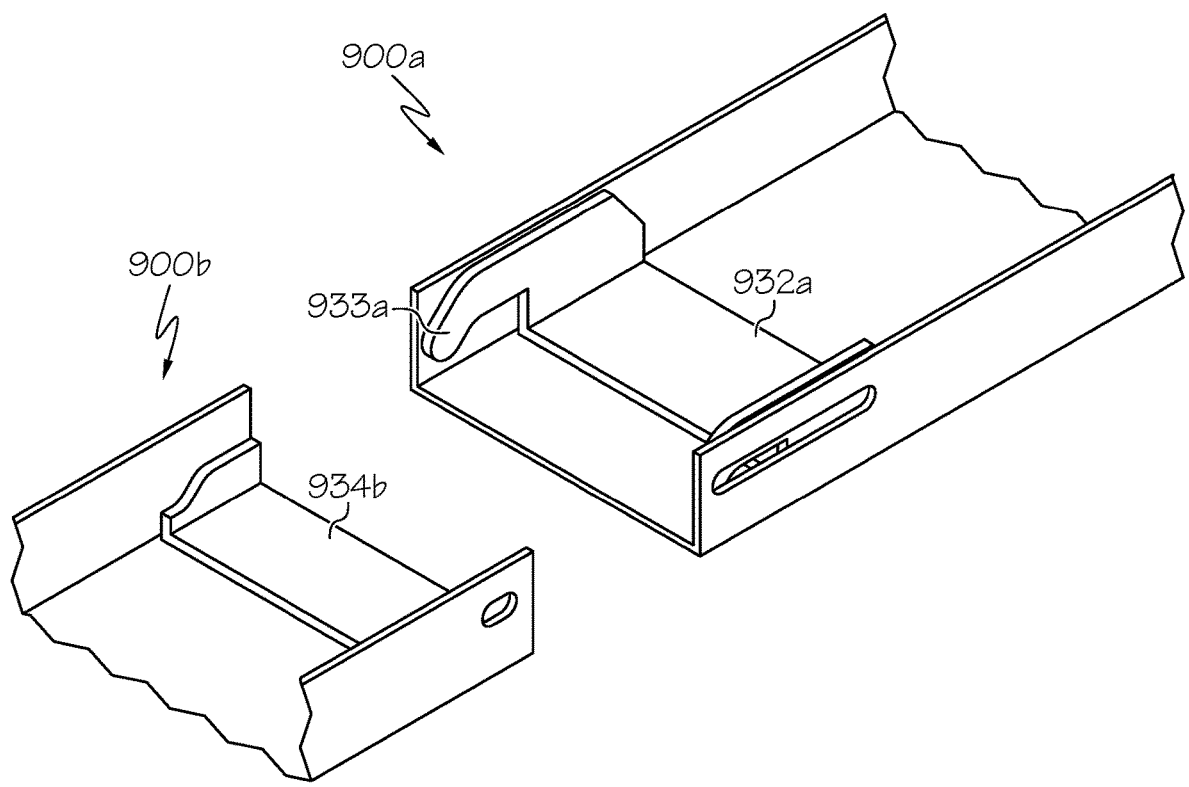
FIG. 20B is a perspective view of an embodiment of a first connector portion and a second connector portion, in accordance with aspects of the present inventive concepts.

In some embodiments, at least one first connector portion 932 is moveable relative to its corresponding rail 900a. In some embodiments, the first connector portion 932 is moveable relative to the body of the rail 900 and can be retracted so that a distal end is flush with the edge of the floor rail 900, as shown in FIG. 20B. In some embodiments, at least one second connector portion 934 is moveable relative to the body of the rail 900. In some embodiments, at least one first connector portion 932 and at least one second connector portion 934 are moveable relative to the body of the rail 900. In some embodiments, at least one first connector portion 932 and at least one second connector portion 934 are fixed relative to the body of the rail 900.

In the embodiment shown in FIG. 20A, the first connector portion 932a is constructed and arranged to slide along the length of the floor rail 900a. In the embodiment shown, floor rail 900a comprises two slots 914—one on each side wall 908a, 908b. In this embodiment, a portion of the first connector portion 932a is positioned in each slot 914, allowing the first connector portion 932a to slide along the length of the floor rail 900. In some embodiments, the floor rail 900 comprises at least one slot 914 near the second connector portion 934. In some embodiments, a portion of the second connector portion 934 is positioned in the slot, which allows the second connector portion 934 to slide along the length of the floor rail 900.

FIG. 20B is a perspective view of an embodiment of a first connector portion 932a and a second connector portion 934b, in accordance with aspects of the present inventive concepts. In the embodiment shown, the first connector portion 932a is retracted so that its distal end does not extend beyond a distal end of the floor rail 900.

Figure 20C:
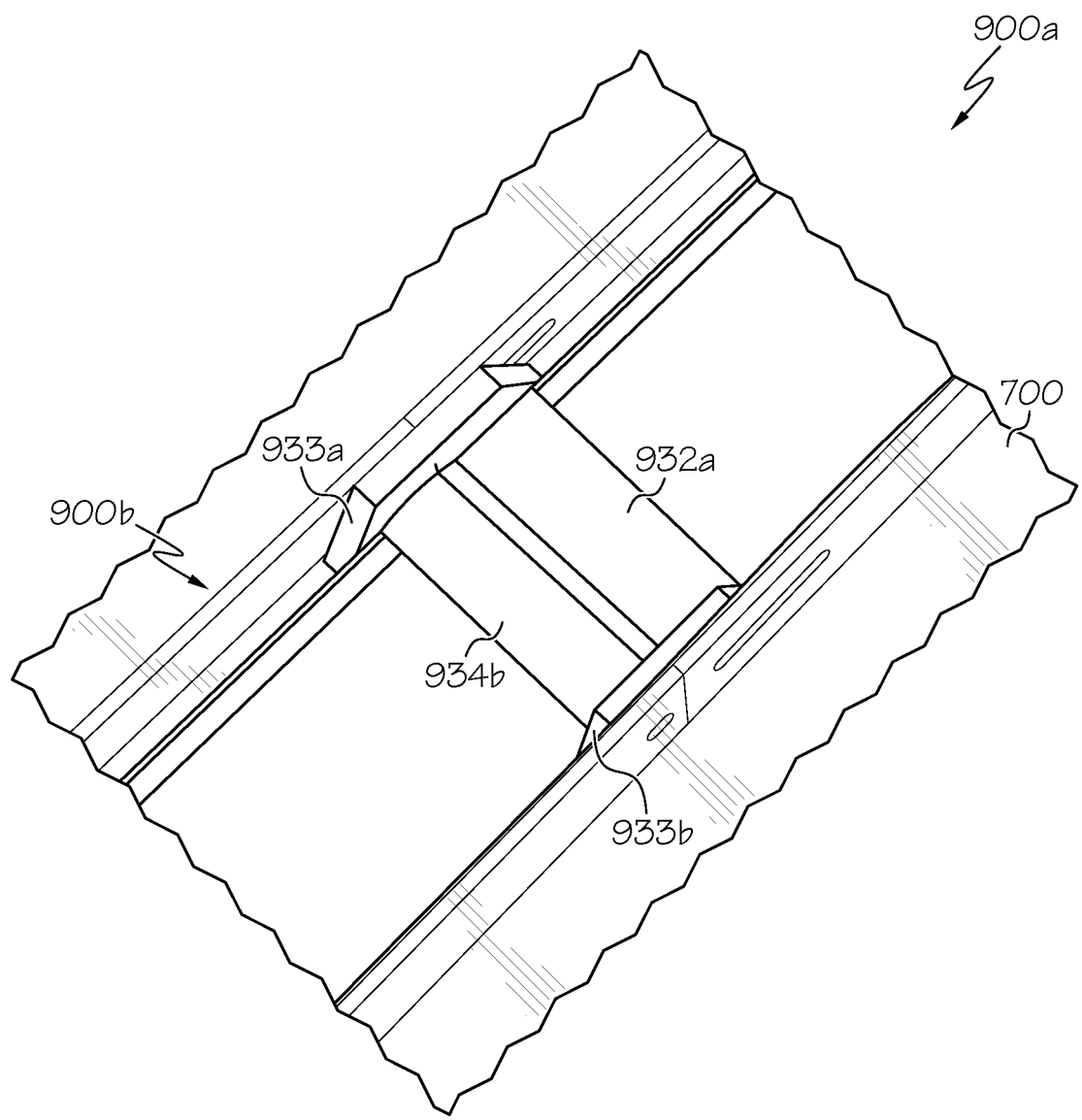
FIG. 20C is a perspective view of an embodiment of a first connector portion coupled to a second connector portion, in accordance with aspects of the present inventive concepts.

FIG. 20C is a perspective view of an embodiment of a first connector portion 932a coupled to a second connector portion 934b, in accordance with aspects of the present inventive concepts. In this embodiment, the first connector portion 932a fits above the second connector portion 934b. The curtain 700 is positioned in the channel 905. The pole platform 920 is positioned above the curtain 700. The pole platform is held in place in the channel by the lower ends of poles 500 placed thereon.

Figure 20D:
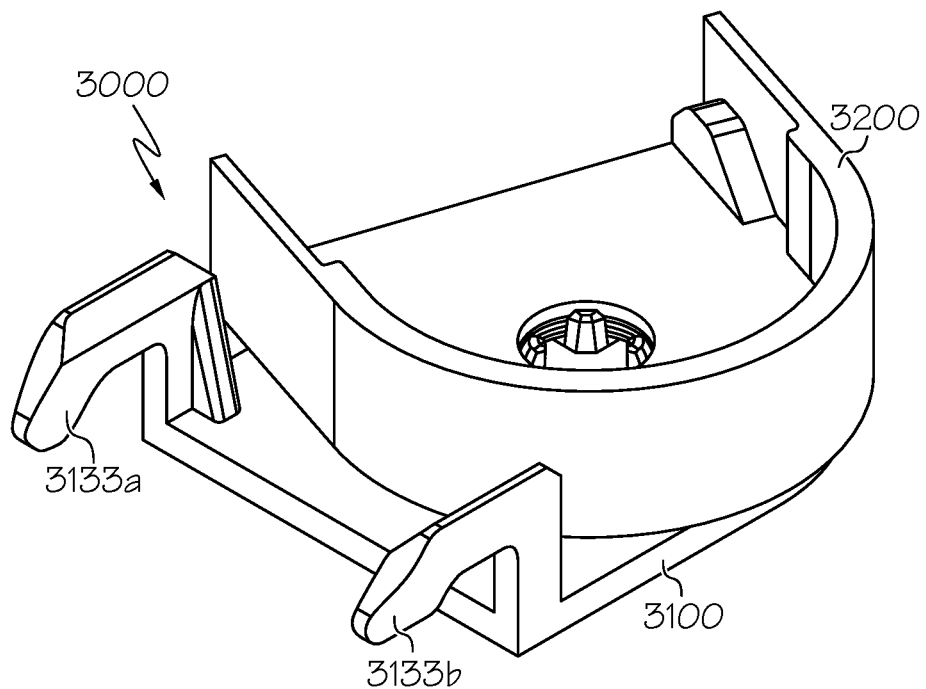
FIGS. 20D-20G are perspective views of a floor rail coupler in accordance with aspects of the present inventive concepts.

FIG. 20D is a perspective view of an embodiment of a floor rail coupler 3000, in accordance with aspects of the present inventive concepts. In some embodiments, such as the one shown in FIG. 20D, the floor rail coupler 3000 comprises a first portion 3100 and a second portion 3200. In some embodiments, the floor rail coupler 3000 is constructed and arranged to allow two floor rails 900 to be coupled at a selectable angle relative to each other. In some embodiments, the floor rail coupler 3000 is constructed and arranged to allow two floor rails 900 to be coupled such that the channel of the first floor rail extends in a first direction and the channel of the second floor rail extends in a second direction, the second direction being transverse relative to the first direction.

Figure 20E:
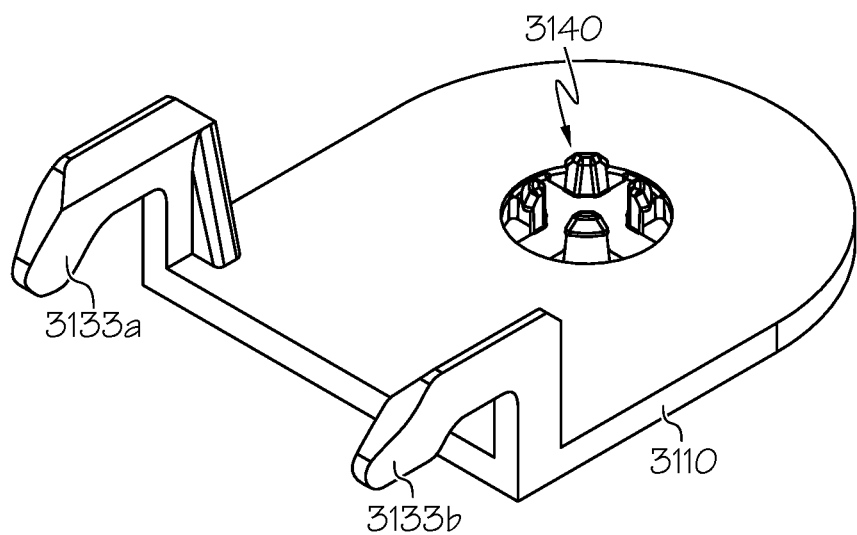

FIG. 20E is a perspective view of an embodiment of a first portion 3100 of a floor rail coupler 3000, in accordance with aspects of the present inventive concepts. In some embodiments, such as the one shown in FIG. 20E, the first portion 3100 comprises a first connector portion 3132 coupled to a base 3110. In some embodiments, the first portion 3100 comprises a first coupler region 3140 constructed and arranged for coupling the first portion 3100 with the second portion 3200. In some embodiments, the first coupler region 3140 is coupled to the base 3110.

In the embodiment shown in FIG. 20E, a lower surface of the base 3110 is planar. In alternative embodiments, a lower surface of the base 3110 is non-planar. In the embodiment shown in FIG. 20E, the base 3110 comprises a straight edge and a rounded edge. In alternative embodiments, the base 3110 takes on different polygon shapes and configurations, including, but now limited to, a circle, square, rectangle, triangle, etc.

In some embodiments, the first connector portion 3132 comprises one or more claws 3133. In the embodiment shown in FIG. 20, the first connector portion 3132 comprises two claws 3133a, b, one on each side of the first connector portion 3132. In alternative embodiments, the first connector portion 3132 comprises a different number of claws 3133. In alternative embodiments, the first portion 3100 of the floor rail coupler 3000 comprises a second connector portion.

Figure 20F:
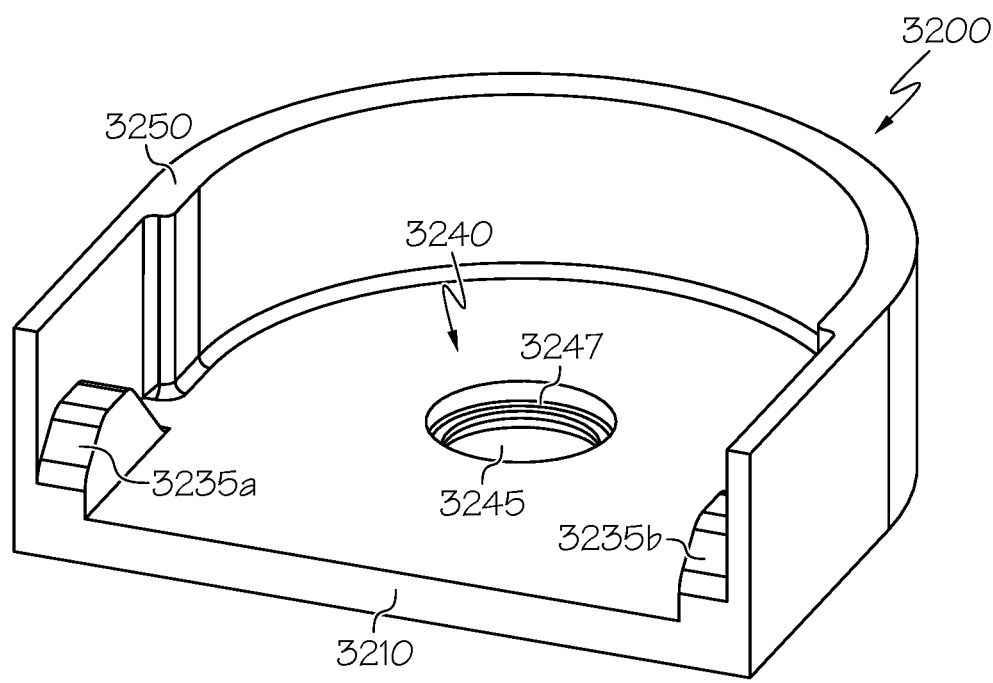

FIG. 20F is a rotated perspective view of an embodiment of a second portion 3200 of a floor rail coupler 3000, in accordance with aspects of the present inventive concepts. In some embodiments, such as the one in FIG. 20F, the second portion 3200 comprises a second connector portion 3234 coupled to a base 3210. In some embodiments, the second portion 3200 comprises a second coupler region 3240 constructed and arranged for coupling the second portion 3200 with the first portion 3100. In some embodiments, the second coupler region 3240 is coupled to the base 3210. In some embodiments, the second portion 3200 comprises at least one side wall 3250, the at least one side wall being coupled to the base 3210.

In the embodiment shown in FIG. 20F, a lower surface of the base 3210 is planar. In alternative embodiments, a lower surface of the base 3210 is non-planar. In the embodiment shown in FIG. 20F, the base 3210 comprises a straight edge and a rounded edge. In alternative embodiments, the base 3210 takes on different polygon shapes and configurations, including, but now limited to, a circle, square, rectangle, triangle, etc.

In the embodiment shown in FIG. 20F, the side wall 3250 extends in a direction transverse to the surface of the base. In the embodiment shown in FIG. 20F, the side wall 3250 is at the edge of a curved portion of the base 3210. In alternative embodiments, the side wall 3250 is offset from the edge of the base 3210. In alternative embodiments, the second portion 3200 does not comprises a side wall. In embodiments of the second portion that include a side wall, the wall 3250 operates as a seat for locating a lower end of a pole operative to press the floor rail coupler against a floor.

In some embodiments, the second connector portion 3234 comprises one or more seats 3235. In the embodiment shown in FIG. 20F, the second connector portion 3234 comprises two seats 3235a, b, one on each side of the second connector portion 3234. In alternative embodiments, the second connector portion 3234 comprises a different number of seats. In alternative embodiments, the second portion 3200 of the floor rail coupler 3000 comprises a first connector portion.

In the embodiment shown in FIG. 20F the second coupler region 3240 of the second portion 3200 comprises at least one opening 3245. In the embodiment shown in FIG. 20F, the at least one opening 3245 has a first diameter at an upper surface of the base 3210 and a second diameter at a lower surface of the base 3210. In some embodiments, such as the one shown in FIG. 20F, the second coupler region 3240 comprises a seat 3247 constructed and arranged for mating with the first portion 3100.

In some embodiments, the position of the first portion 3100 of the floor rail coupler 3000 is fixed relative to the position of the second portion 3200 of the floor rail coupler 3000. In some embodiments, the first portion 3100 of the floor rail coupler 3000 is rotatably coupled to second portion 3200 of the floor rail coupler 3000. In the embodiment shown in FIG. 20D the first portion 3100 is rotatably coupled to the second portion 3200.

Figure 20G:
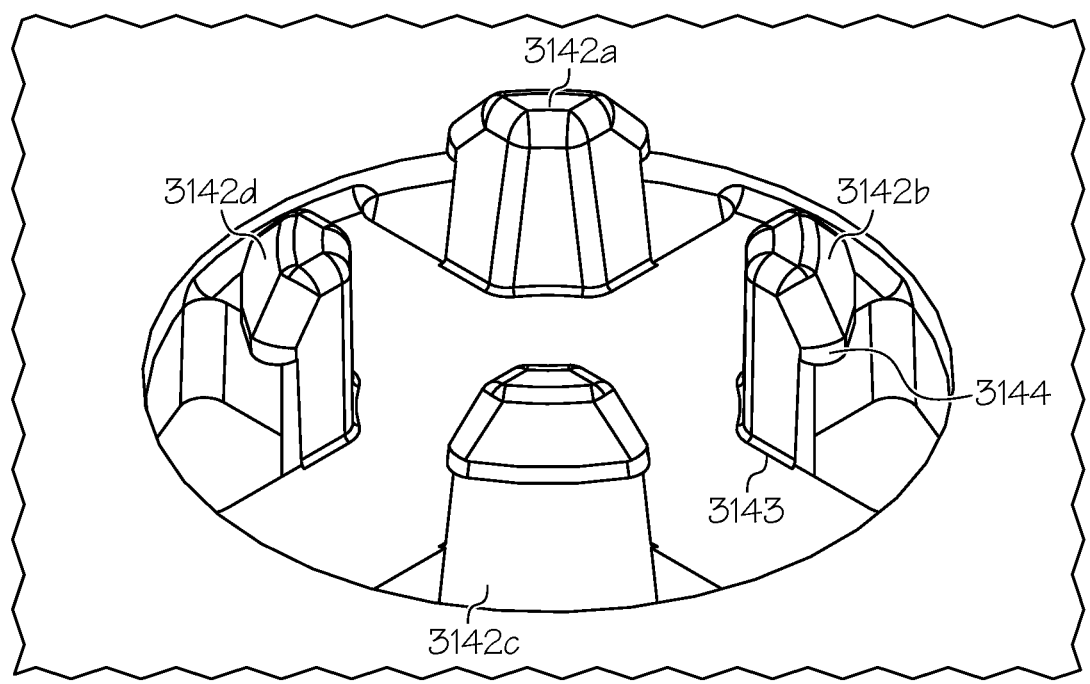

FIG. 20G is a close-up perspective view of the embodiment of a first portion 3100 shown in FIG. 20E, in accordance with aspects of the present inventive concepts. In some embodiments, the first portion 3100 comprises at least one connector 3142. In the embodiment shown in FIG. 20G, the coupler region 3140 comprises four connectors 3142*a-d*. In alternative embodiments, the first portion 3100 comprises a different number of connectors 3142. In some embodiments, at least one of the connectors is constructed and arranged to mate with the second portion 3200.

In some embodiments, such as the one shown in FIG. 20G, at least one of the connectors comprises a lower portion 3143 and an upper portion 3144. In some embodiments, such as the one in FIG. 20G, the upper portion has greater dimensions along the radial direction. In some embodiments, such as the one shown in FIG. 20G the lower 3143 and upper 3144 portions are constructed and arranged such that they mate with the seat 3247 of the second portion 3200, for example, in a snap-fit relationship. In some embodiments, when the first portion 3100 and the second portion 3200 are coupled, the upper portion 3147 of at least one connector 3142 is positioned above the seat 3247 of the second portion 3200.

FIGS. 20H and 20I are perspective views of installations of a dust partition system employing floor rail embodiments, in accordance with the present inventive concepts. In this configuration, it can be seen that a system of floor rails 900*a*, 900*b*, 900*c* operate in conjunction with the downward force applied by the poles 500 to urge the lower portion of the curtain 700 against the floor. In the configuration depicted in FIG. 20H, the connector portions 932*a*, 934*a* are of the type illustrated and described in connection with FIGS. 20A-20C and, therefore, the rails 900*a*, 900*b*, 900*c* are positioned in alignment with each other. The configuration depicted in FIG. 20I employs floor rail coupler 3000 of the rotatable type illustrated and described in connection with FIGS. 20D-20G and, therefore, the rails 900*b*, 900*c* can be positioned at an angle with respect to each other so that they are not in direct alignment.

Figure 21:
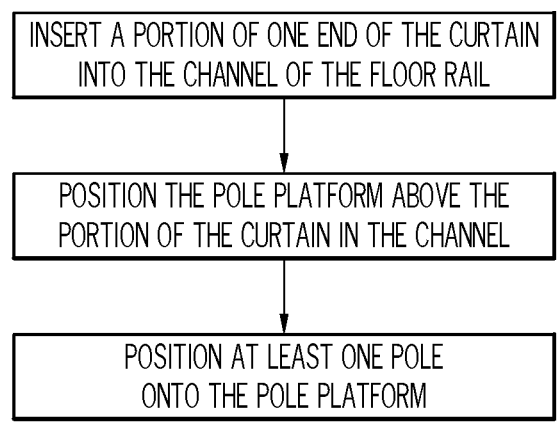
FIG. 21 illustrates a method for installing a curtain in a floor rail, in accordance with aspects of the present inventive concepts.

FIG. 21 illustrates a method for installing a curtain in a floor rail, in accordance with aspects of the present inventive concepts. Referring to FIG. 21, the installer inserts a portion of one end of the curtain into the channel of the floor rail. The installer positions the pole platform above the portion of the curtain in the channel. The installer positions at least one pole onto the pole platform.

Figure 22:
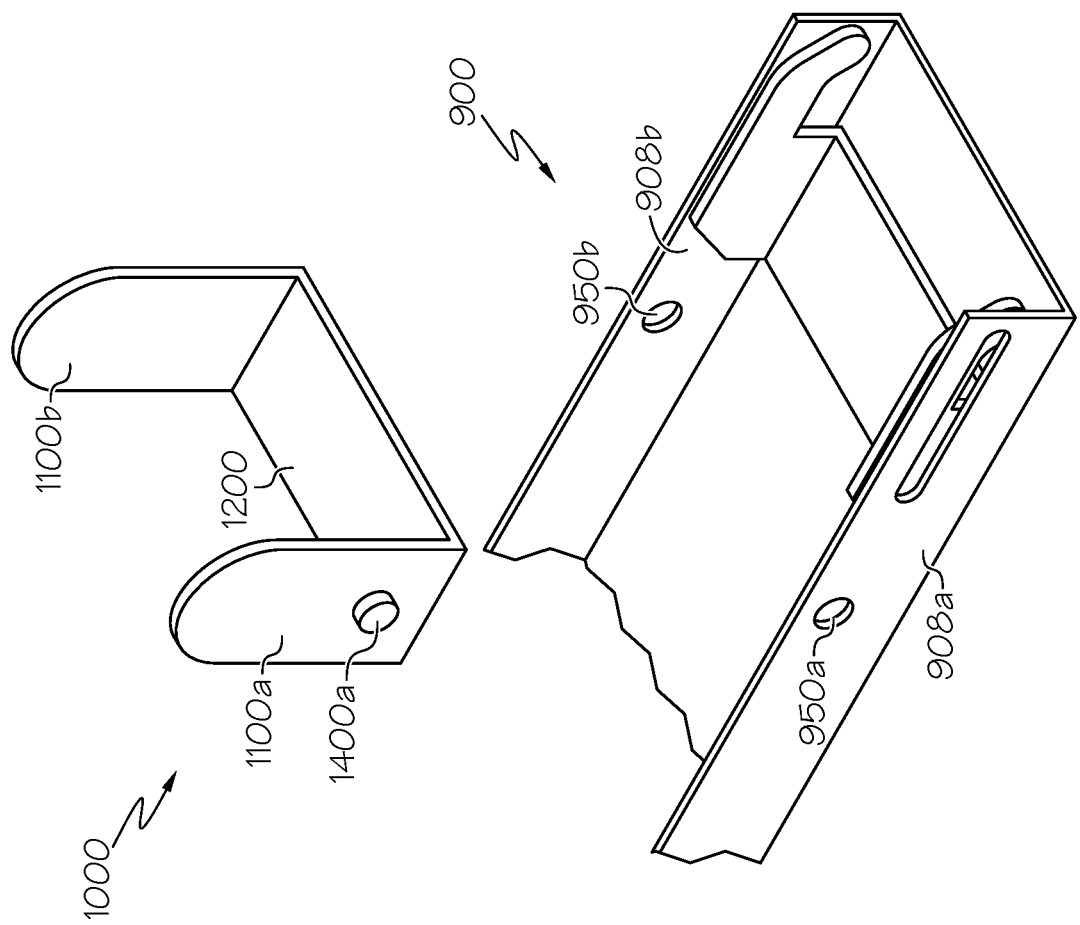
FIG. 22 is a perspective view of an embodiment of a rail clip, in accordance with aspects of the present inventive concepts.

FIG. 22 is a perspective view of an embodiment of a rail clip 1000, in accordance with aspects of the present inventive concepts. In some embodiments, the rail clip 1000 comprises at least one side panels 1100 coupled to a base 1200. The embodiment shown in FIG. 22 comprises two side panels 1100*a, b*, however alternative embodiments comprise a different number of side panels 1100. In the embodiment shown in FIG. 22, the two side panels 1100*a,b* extend in a direction transverse to a direction of extension of the base 1200.

In some embodiments, the rail clip 1000 is coupled to the floor rail 900 using an attachment mechanism. In some embodiments, such as the one shown in FIG. 22, the attachment mechanism comprises one or more protrusions 1400 and one or more holes 950, with each hole 950 corresponding to each one of the one or more protrusions 1400.

In some embodiments, the rail clip 1000 comprises the one or more protrusion 1400. In the embodiment shown in FIG. 22, the rail clip 1000 comprises a first protrusion 1400*a* at an outer face of the first side panel 1100*a* and a second protrusion (not shown) at an outer face of the second side panel 1100*b*. In alternative embodiments, the rail clip 1000 comprises a different number of protrusions 1400. In the embodiment shown in FIG. 22, the first protrusion 1400*a* is coupled to the first side panel 1100*a* of the rail clip 1000. In the embodiment shown in FIG. 22, the second protrusion 1400*b* is coupled to the second side panel 1100*b* of the rail clip 1000. In alternative embodiments, one or more protrusions 1400 are coupled to the base of the rail clip 1000.

In some embodiments, the floor rail 900 comprises the one or more holes 950. In some embodiments, each protrusion 1400 on the rail clip 1000 is constructed and arranged to couple to a corresponding hole 950 of the floor rail 900. In embodiment shown in FIG. 22, the floor rail 900 comprises a first hole 950*a* on a first side rail 908*a* corresponding to the first protrusion 1400*a* and a second hole 950*b* on a second side rail 908*b* corresponding to the second protrusion 1400*b*. In alternative embodiments, the floor rail 900 comprises one or more holes 950 at the base 902 that are constructed and arranged to couple with a protrusion 1400 at the base 1200 of the rail clip 1000.

In alternative embodiments, mating arrangement between the rail clip 1000 and the floor rail 900 is reversed. In such embodiments, the floor rail 900 comprises the one or more protrusions, with each protrusion coupled to a corresponding hole of the rail clip 1000.

Figure 23:
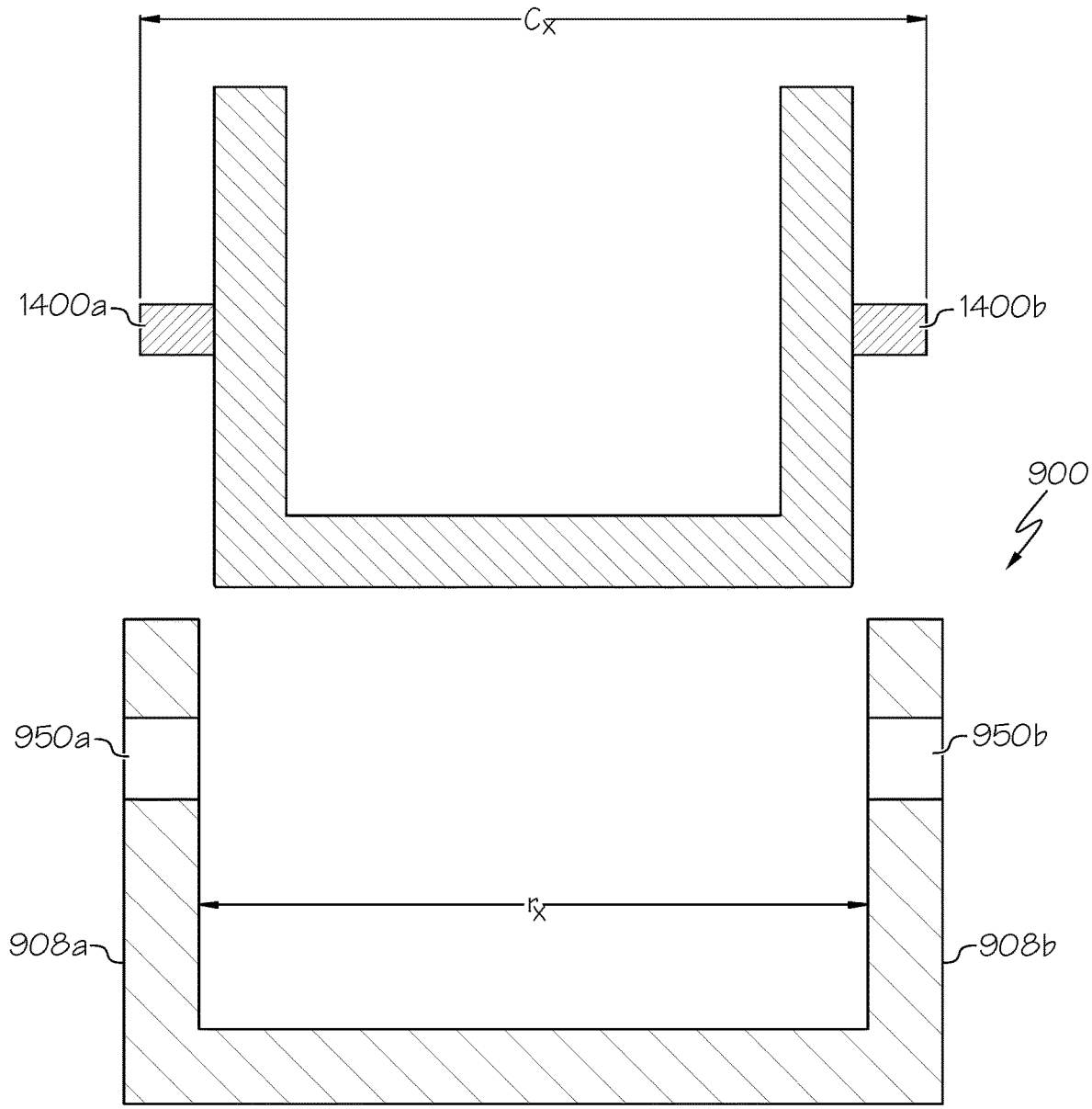
FIG. 23 is front view of an embodiment of a floor rail and a rail clip, in accordance with aspects of the present inventive concepts.

FIG. 23 is front view of an embodiment of a floor rail 950 and a rail clip 1000, in accordance with aspects of the present inventive concepts. In FIG. 23, the rail clip 1000 is positioned above the floor rail 900. The distance cx between the outer edge of the first protrusion 1400*a* and the opposing outer edge of the second protrusion 1400*b* is greater than the opening of the channel r x at the floor rail 900. In such embodiments, the rail clip 1000 is constructed and arranged to be bendable, or elastically deformable, such that the rail clip 1000 fits, or snaps into place, in the channel 905 of the floor rail 900, the first protrusion 1400*a* fits in the first hole 950*a*, and the second protrusion 1400*b* fits in the second hole 950*b*. In particular, the rail clip 1000 dimensioned to snap into place in the channel 905 with a curtain 700 present, so that the rail clip is operative to secure the thus-positioned curtain in place in the channel 905.

Figure 24:
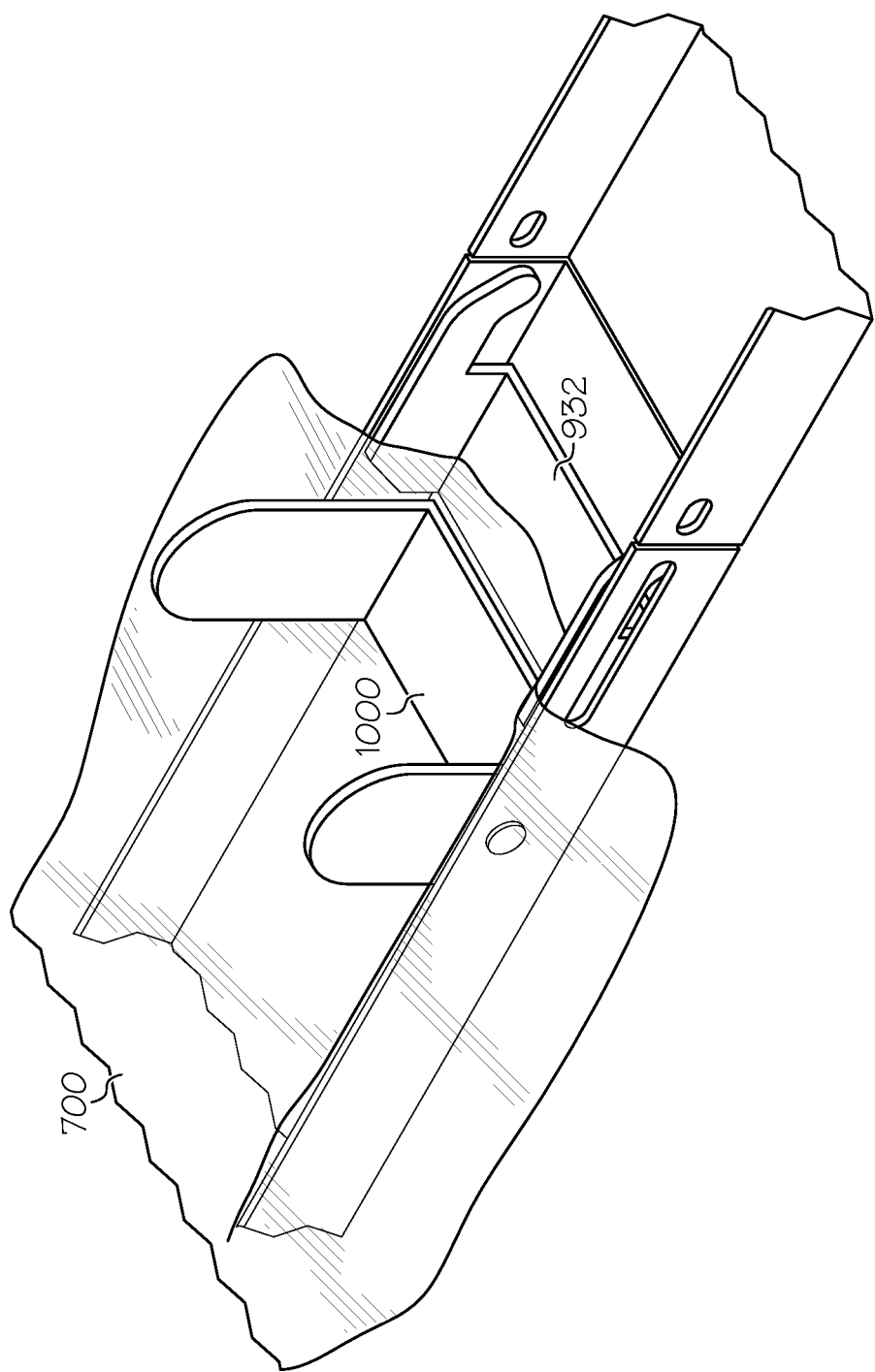
FIG. 24 is a perspective view of an embodiment of a rail clip coupled to a floor rail and a curtain is positioned above the rail clip, in accordance with aspects of the present inventive concepts.

FIG. 24 is a perspective view of an embodiment of a rail clip 1000 coupled to a floor rail 900 and a curtain 700 is positioned between the rail clip 1000 and the floor rail 900, in accordance with aspects of the present inventive concepts. In the embodiment shown in FIG. 24, the rail clip 1000 is positioned near the first connector portion 932. In alternative embodiments, the rail clip 1000 is positioned at a location away from the first connector portion 932.

Figure 25:
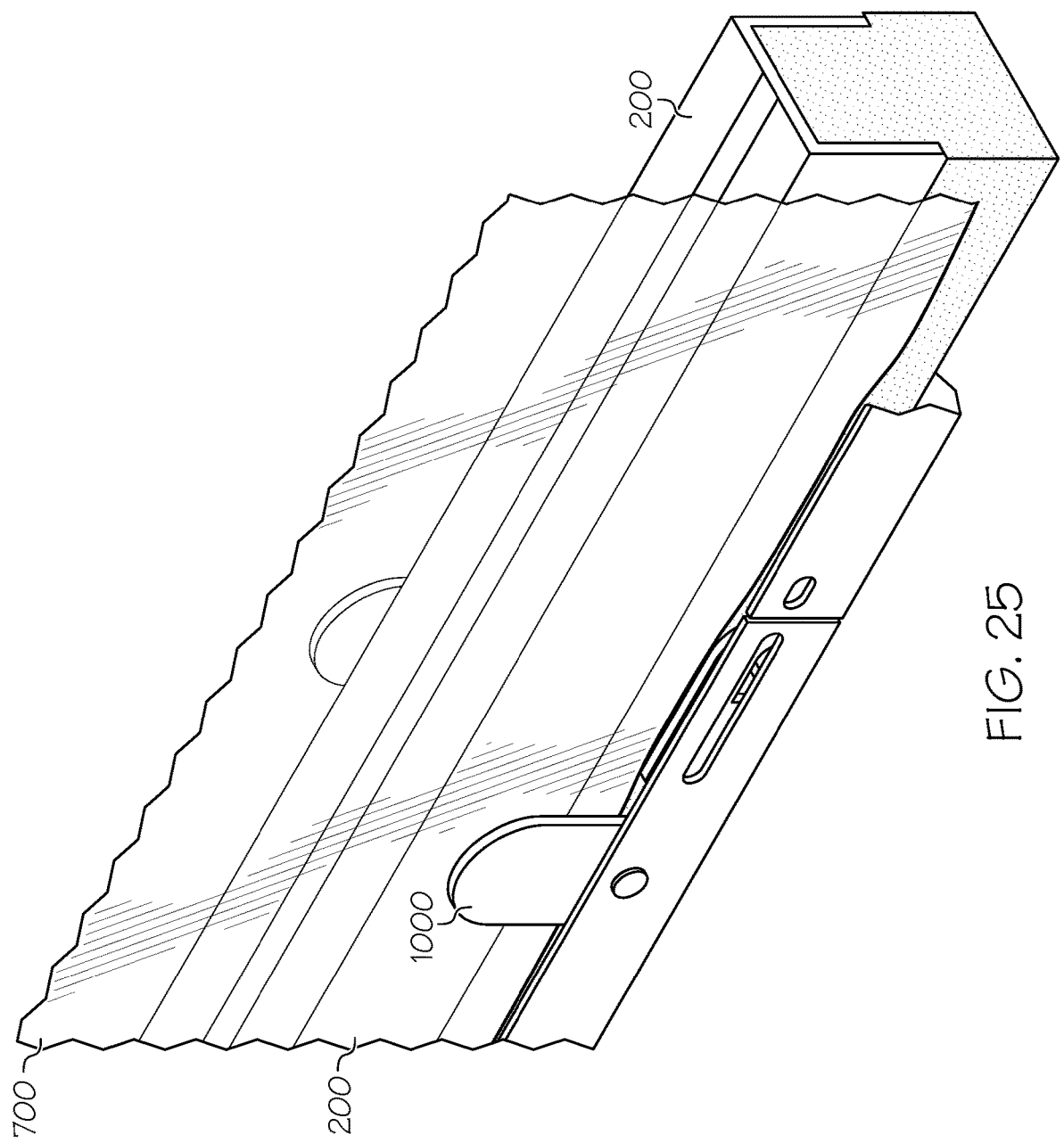
FIG. 25 is a perspective view of an embodiment of a rail clip, a floor rail, a curtain, and a rail head, in accordance with aspects of the present inventive concepts.

FIG. 25 is a perspective view of an embodiment of a rail clip 1000, a floor rail 900, a curtain 700, and a rail head 200, for example of the configuration described herein in connection with FIG. 19A2, in accordance with aspects of the present inventive concepts. In this embodiment, the rail head 200 fits between the two side panels 1100 of the rail clip 1000. In this embodiment, the rail head 200 is attached to a mounting pole and applies downward pressure on the curtain 700.

Figure 26:
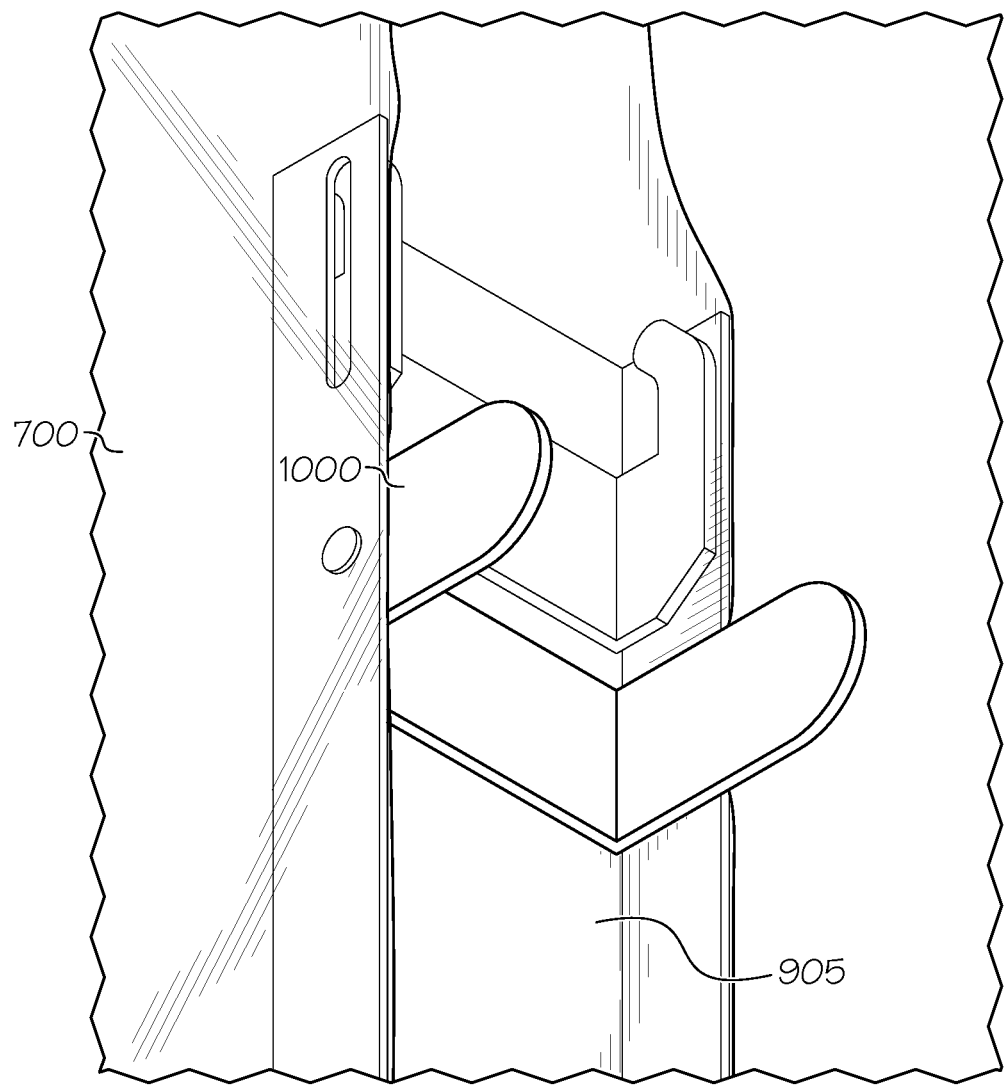
FIG. 26 is a perspective view of an embodiment of a rail clip coupled to a floor rail with a portion of a curtain positioned between them, in accordance with aspects of the present inventive concepts.

FIG. 26 is a perspective view of an embodiment of a rail clip 1000 coupled to a floor rail 900 with a portion of a curtain 700 positioned between them, in accordance with aspects of the present inventive concepts. In this embodiment a portion of the curtain 700 is positioned in the channel 905 of the floor rail 900. Once a portion of the curtain 700 is positioned in the floor rail 900, the rail clip 1000 is positioned above the portion of the curtain 700 and coupled to the floor rail 900.

Figure 27:
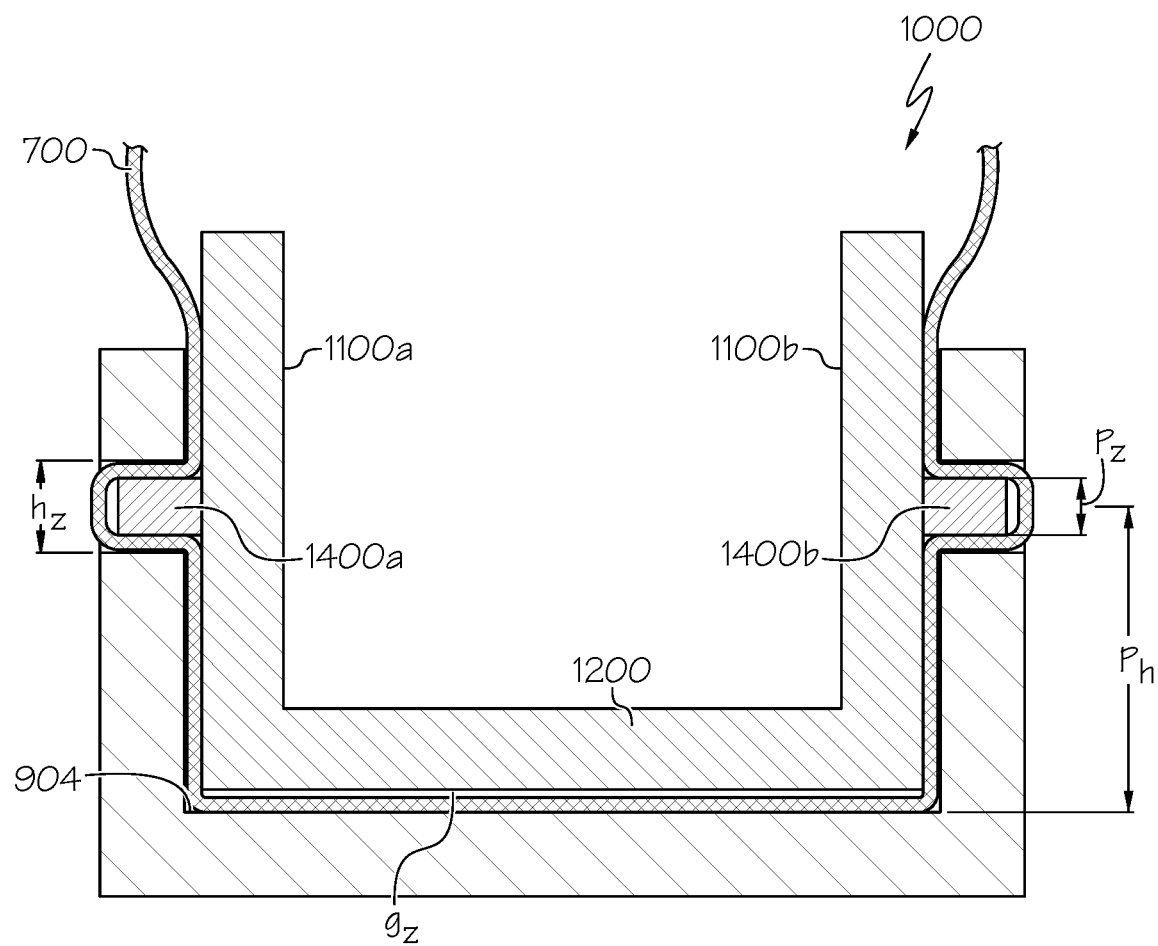
FIG. 27 is a front sectional view of an embodiment of a rail clip, a floor rail, and a curtain, in accordance with aspects of the present inventive concepts.

FIG. 27 is a front sectional view of an embodiment of a rail clip 1000, a floor rail 900, and a curtain 700, in accordance with aspects of the present inventive concepts. In embodiments in which the side panels 1100 of the rail clip 1000 comprise one or more protrusions 1400, the height of the protrusion $p_h$ relative to the base 1200 of the floor rail 1000 is constructed and arranged such that the each protrusion 1400 can fit in the corresponding hole 950 of the floor rail 950 and the curtain 700 fits between the rail clip 1000 and the floor rail 900, at gap $g_z$.

In some embodiments, the size of the opening $h_z$ for each hole 950 is greater than the size $p_z$ of the protrusion 1400 such that there is enough room for the curtain 700 to fit through the hole, around the protrusion 1400.

Figure 28:
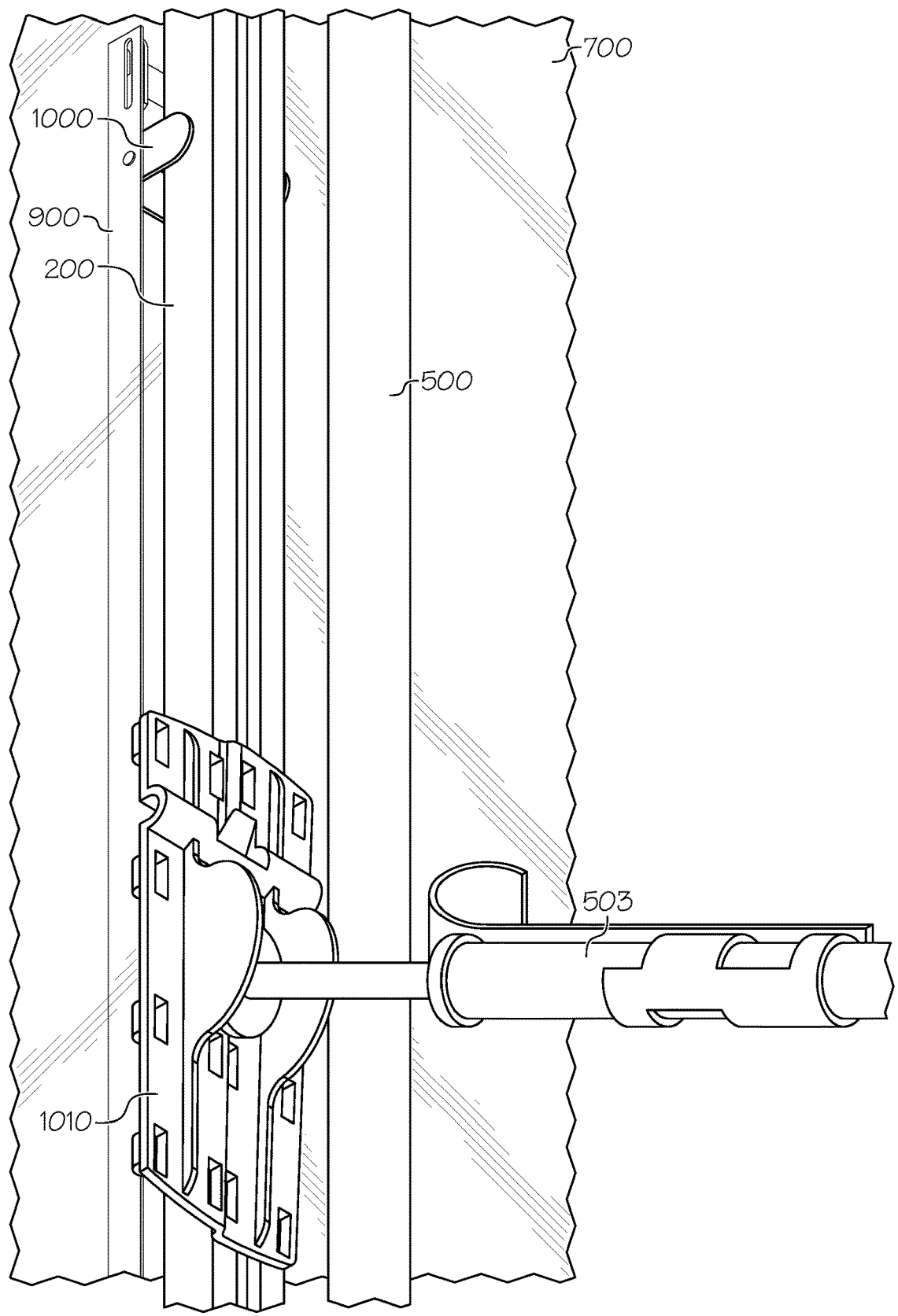
FIG. 28 is a perspective view of an embodiment of a floor rail, rail clip, and rail head, in accordance with aspects of the present inventive concepts.

FIG. 28 is a perspective view of an embodiment of a floor rail 900, rail clip 1000, and rail head 200, in accordance with aspects of the present inventive concepts. In FIG. 28, the curtain 700 is secured between the rail clip 1000 and the floor rail 900. The floor rail 900 is positioned in a vertical orientation against a side wall and a rail head 200 is positioned in the channel 905 of the floor rail 900. In this embodiment, the rail head 200 is securely positioned between the side rails 908 and is more likely to maintain its position against the wall. In this embodiment the lower surface of the base 902 of the floor rail 900 is aligned with the surface of the wall, which helps secure the rail head 200 in place. In the embodiment shown in FIG. 28, the rail clip 1000 is wider than the width of one rail head 200. In alternative embodiments, the rail clip 1000 is wider than the combined width of two rail heads 200. In the configuration illustrated at FIGS. 28 and 29, an objective is to install a rail head 200 and floor rail 900 in a vertical position along a vertical wall parallel to vertically oriented pole 700 in order to close a gap that would otherwise be present between an edge of the curtain 700 and the vertical wall, for example in a manner similar to the embodiment of FIG. 15 described herein. In this configuration, the rail clip 1000 temporarily secures the floor rail 700 to the curtain 700 so that an installer has a free hand to place the rail head 200 and side press 503 in position against a side portion of the pole 500. In some embodiments, the side press 503 can comprise a side press system of the type disclosed in U.S. Pat. Nos. 7,073,758 and 10,174,514, the content of each of which is incorporated herein by reference in its entirety.

Figure 29:
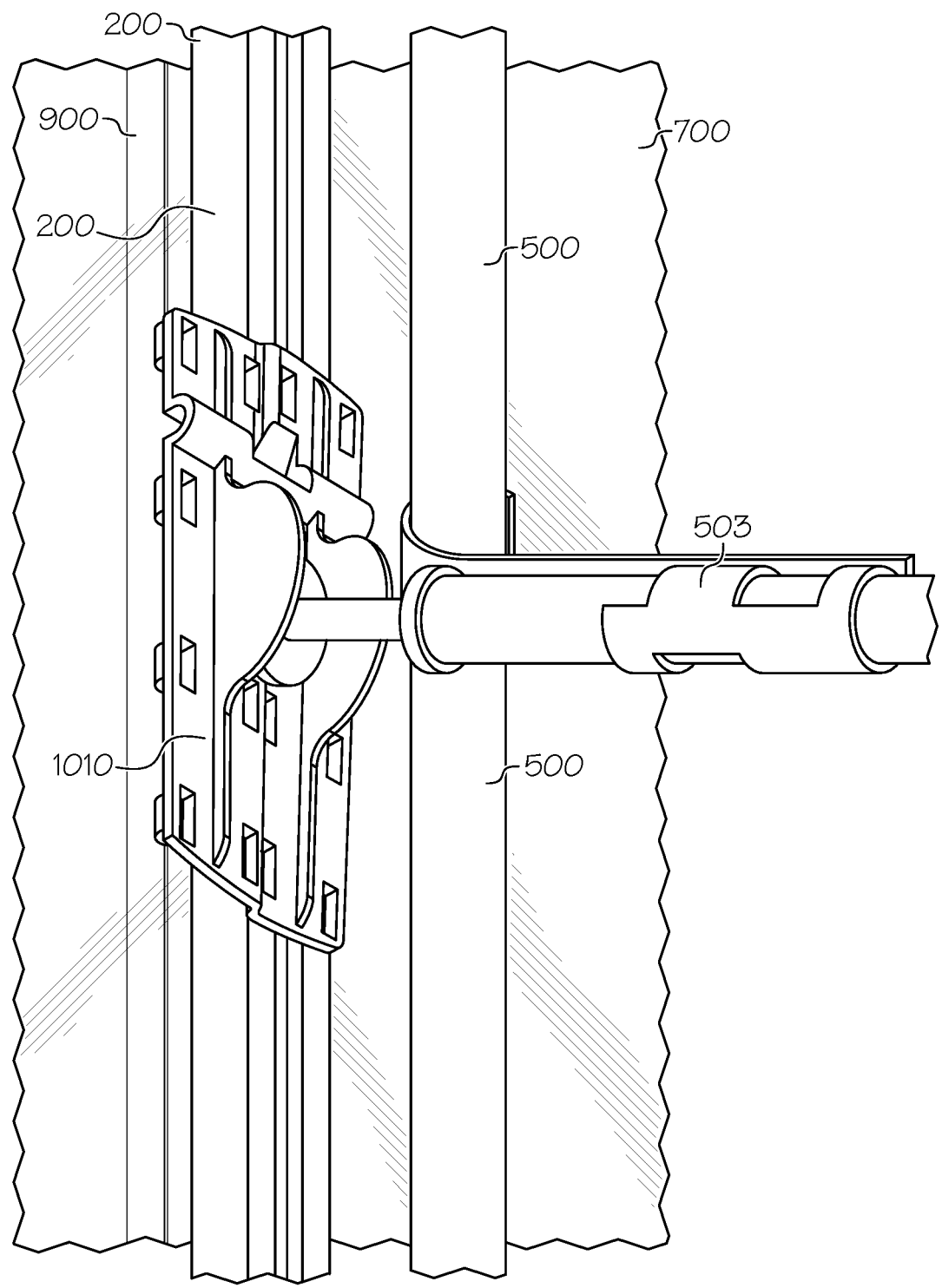
FIG. 29 is a perspective view of an embodiment of rail head coupled to a support pole, in accordance with aspects of the present inventive concepts.

FIG. 29 is a perspective view of an embodiment of rail head 200 coupled to a support pole 500, in accordance with aspects of the present inventive concepts. In this installation, the floor rail 900 mounted in a vertically oriented configuration is operative with the side press 503 to result in a installation of heightened stability.

Figure 30:
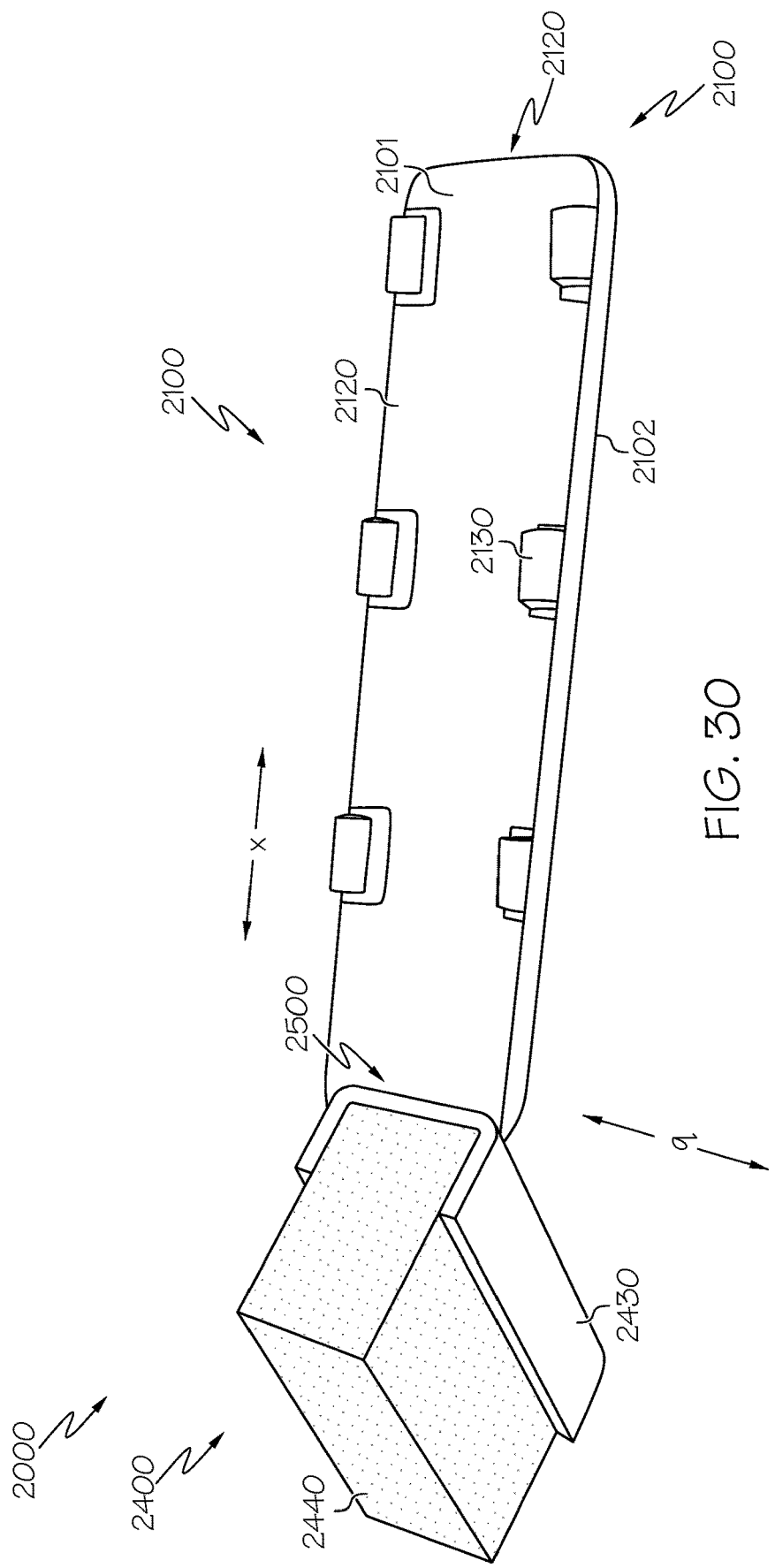
FIG. 30 is a perspective view of an embodiment of a corner mount, in accordance with aspects of the present inventive concepts.

FIG. 30 is a perspective view of an embodiment of a corner mount 2000, in accordance with aspects of the present inventive concepts. In some embodiments, the corner mount 2000 comprises at least two portions. In the embodiment shown in FIG. 30, the corner mount 2000 comprises a first portion 2100 and a second portion 2400. In the embodiment shown in FIG. 30, the first portion 2100 and the second portion 2400 are coupled via a connection region 2500. In alternative embodiments, the corner mount 2000 comprises more than two portions.

In some embodiments, the first portion 2100 of the corner mount 2000 comprises some, or many, of the features described herein in connection with the rail end mount 100. In the embodiment shown in FIG. 30, the first portion 2100 of the corner mount 2000 includes a base 2110 comprising opposed upper 2101 and lower surfaces 2102. In some embodiments, the base 2110 may be substantially planar and in other embodiments the base may be non-planar. At least one channel 2120 on the upper surface 2101 of the base 2110 extends in the first horizontal direction x. The at least one channel 2120 is elongated in the first horizontal direction x and comprises at least one head-mounting feature 2130 that is constructed and arranged to removably retain a rail head 200. In some embodiments, the rail head 200 can take the form of a rail head as described in connection with U.S. Pat. No. 7,533,712, the content of which is incorporated herein by reference. In some embodiments, a lower end portion of the rail head 200 may slide through the at least one channel 2120 of the corner mount 2000 to couple the rail head 200 to the corner mount 2000. In some embodiments, the first portion 2100 of the corner mount 2000 comprises at least one socket constructed and arranged to couple with a pole.

In the embodiment shown in FIG. 30, the second portion 2400 of the corner mount 2000 includes a base 2410 comprising opposed upper 2401 and lower surfaces 2402. In some embodiments, the base 2410 may be substantially flat and in other embodiments the base may be curved. At least one channel 2420 on the upper surface of the base 2410 extends in a second horizontal direction q. The at least one channel 2420 is elongated in the second horizontal direction q.

In some embodiments, the at least one channel 2420 comprises at least one mounting feature 2430 that is constructed and arranged to removably retain a pad 2440. In the embodiment shown in FIG. 30, the second portion 2400 of the corner mount 2000 comprises a first mounting feature 2430a and a second mounting feature 2430b (not shown). In some embodiments, (such as the one in FIG. 30) the second portion 2400 of the corner mount 2000 comprises a generally U-shaped cross-sectional profile including a cavity 2412 serving as a base or seat for the pad 2440.

The pad 2440 can be mounted in the cavity 2412 of the second portion 2400, and may be press-fit, bonded, or otherwise secured, into place. In some embodiments, the pad 2440 extends from an upper surface of the second portion 2400. The pad 2440 may be, for example, rectangular or cylindrical in shape and having a certain degree of compressibility so as to conform to an abutting surface, while still exhibiting resiliency and shape memory.

In some embodiments, the pad 2440 comprises a compressible foam block. In other embodiments, the pad 2440 may comprise a resilient or pliable material that is compressible, for example, a rubber, foam, or plastic member, an air-filled bag, a brush, or the like. In some example embodiments, the pad 2440 may comprise low-density foam or low-density rubber. Other resilient or pliable materials may be equally applicable to the principles of the present inventive concepts.

In some embodiments, the first portion 2100 of the corner mount 2000 is coupled to the second portion 2400 of the corner mount 2000 at a connection region 2500. In some embodiments, the connection region 2500 positions the first portion 2100 at a fixed angle with respect to the second portion 2400. In some embodiments, the connection region 2500 comprises one or more joints that allow the first portion 2100 and second portion 2400 to pivot relative to one another. In some embodiments, the connection region 2500 comprises one or more joints that allow the first portion 2100 and second portion 2400 to pivot relative to one another through a fixed range of angles.

In some embodiments, the corner mount 2000 comprises three or more portions. In some embodiments, with three or more portions, a connection region 2500 is positioned between some of the neighboring portions. In such embodiments, the connection region 2500 can have the characteristics described previously. In some embodiments, with three or more portions, a connection region 2500 is positioned between all of the neighboring portions. In such embodiments, the connection region 2500 can have the characteristics described previously.

In some embodiments, length of the channel 2120 of the first portion 2100 of the corner mount 2000 is substantially the same as the length of the channel 2420 of the second portion 2400 of the corner mount 2000. In some embodiments, length of the channel 2120 of the first portion 2100 of the corner mount 2000 is substantially different than the length of the channel 2420 of the second portion 2400 of the corner mount 2000.

Figure 31:
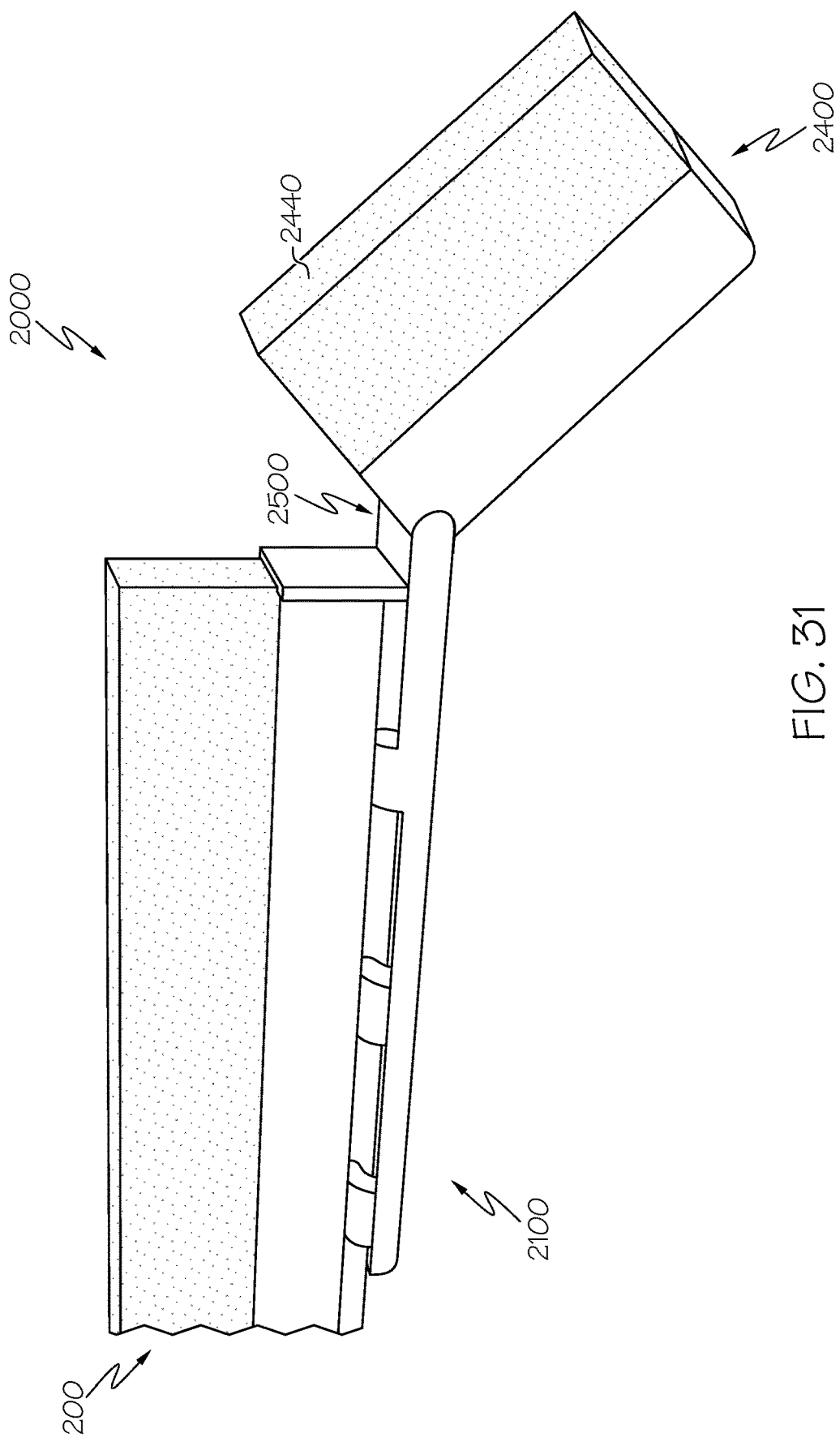
FIG. 31 is a side view of an embodiment of a corner mount, in accordance with aspects of the present inventive concepts.

FIG. 31 is a side view of an embodiment of a corner mount 2000, in accordance with aspects of the present inventive concepts. In the embodiment shown in FIG. 31, a rail head 200 is coupled to the first portion 2100 of the corner mount 2000. In the embodiment shown in FIG. 31, a pad 2440 is coupled to the second portion 2400 of the corner mount 2000. In some embodiments, the height of the pad 2440 of the corner mount 2000 is the same as the height of the pad 220 of the rail head 200. In some embodiments, the height of the pad 2440 of the corner mount 2000 is different than the height of the pad 220 of the rail head 200.

In some embodiments, the corner mount 2000 presses the curtain against features that are transverse with respect to the ceiling or the side walls. For example, in some embodiments, the corner mount 2000 presses the curtain against a crown molding or similar such feature, in order to reduce any gaps or sags in the curtain.

While inventive concepts have been particularly shown and described with references to embodiments thereof, it will be understood by those skilled in the art that various changes in form and detail may be made herein without departing from the spirit and scope of the inventive concepts as defined by the appended claims.

I claim:
1. A system, comprising:
a curtain rail extending in a first horizontal direction of extension, the curtain rail comprising a channel extending along the length of the curtain rail in the first horizonal direction of extension, the channel comprising:
a base comprising opposed upper and lower surfaces; and
first and second side walls along opposite edges of the base, the first and second side walls parallel to the first horizontal direction of extension, the upper surface of the base and the first and second walls defining the channel that extends along the length of the base;
a first connector portion positioned at a first end of the channel of the curtain rail, and
a second connector portion at a second end of the channel of the curtain rail opposite the first end,
wherein the first connector portion is moveable relative to the curtain rail in the first horizontal direction of extension, and
wherein the first connector portion is movable on an upper surface of the base of the channel.

2. The system of claim 1, further comprising a curtain positioned at the upper surface of the base.

3. The system of claim 2, further comprising a pole platform positioned in the channel, wherein a curtain is positioned between the upper surface of the base and a lower surface of the pole platform.

4. The system of claim 3, wherein a width of the pole platform in a second horizontal direction perpendicular to the first horizontal direction is greater than one half a width of the channel in the second horizontal direction.

5. The system of claim 3, further comprising a pole positioned on the pole platform, the pole extending in a third direction of extension transverse to the first and second horizontal directions of extension.

6. The system of claim 1, wherein the second connector portion is moveable relative to the curtain rail.

7. The system of claim 1, wherein the second connector portion is fixed relative to the curtain rail.

8. The system of claim 1, wherein the second connector portion is constructed and arranged to mate with the first connector portion of a neighboring rail to thereby secure positions of the neighboring rails.

9. The system of claim 1, further comprising at least one rail head.

10. The system of claim 9, wherein a width of the channel in a second horizontal direction perpendicular to the first horizontal direction is at least as wide as a width of the at least one rail head.

11. The system of claim 9, wherein a width of the channel in a second horizontal direction perpendicular to the first horizontal direction is at least as wide as a combined width of two rail heads.

12. The system of claim 1, wherein the first and second side walls comprise at least one lip.

13. The system of claim 1, wherein the curtain rail comprises a friction material at a lower surface.

14. The system of claim 1, further comprising a rail clip positioned at the channel of the curtain rail, the rail clip comprising:
at least one side panel; and
a base coupled to the at least one side panel.

15. The system of claim 14, wherein the at least one side panel extends in a direction transverse to the first horizontal direction of extension of the base.

16. The system of claim 14, wherein the rail clip is coupled to the curtain rail via an attachment mechanism.

17. The system of claim 16, further comprising a curtain positioned between the rail clip and the curtain rail.

18. The system of claim 16, wherein rail clip comprises at least one protrusion.

19. The system of claim 18, wherein the curtain rail comprises at least one hole constructed and arranged to couple with the at least one protrusion.

20. The system of claim 19, wherein the at least one hole is at the at least one of the first and second sidewalls.

21. The system of claim 19, wherein the at least one protrusion is at the at least one side panel of the rail clip.

22. The system of claim 18, wherein at least one of the at least one side panel is bendable.

23. The system of claim 1, wherein the first connector portion comprises at least one claw and the second connector portion comprises at least one seat constructed and arranged to mate with a claw of a neighboring rail.

24. The system of claim 23 wherein the second connector portion is fixed in position relative to the curtain rail and the first connector portion is moveable in the first horizontal direction of extension.

25. The system of claim 23 wherein the second connector portion is fixed in position relative to the curtain rail.

26. The system of claim 23 wherein the first connector portion and second connector portion are moveable in the first horizontal direction of extension.

27. The system of claim 1, wherein the curtain rail comprises a first curtain rail and further comprising:
a second curtain rail extending in a first horizontal direction of extension of the second curtain rail, the second curtain rail comprising a channel extending along the length of the second curtain rail in the first horizontal direction of extension of the second curtain rail, the channel comprising:
  a base comprising opposed upper and lower surfaces; and
  first and second side walls along opposite edges of the base, the first and second side walls parallel to the first horizontal direction of extension of the second curtain rail, the upper surface of the base and the first and second walls defining the channel that extends along the length of the base;
a first connector portion positioned at a first end of the channel of the second curtain rail, and
a second connector portion at a second end of the channel of the second curtain rail opposite the first end,
wherein the first connector portion of the first curtain rail and the second connector portion of the second curtain rail are constructed and arranged to mate.

28. The system of claim 1, further comprising first and second rail heads are positioned in the channel of the first curtain rail.

29. A system, comprising:
a curtain rail extending in a first horizontal direction of extension, the curtain rail comprising a channel extending along the length of the curtain rail in the first horizonal direction of extension, the channel comprising:
  a base comprising opposed upper and lower surfaces; and
  first and second side walls along opposite edges of the base, the first and second side walls parallel to the first horizontal direction of extension, the upper surface of the base and the first and second walls defining the channel that extends along the length of the base;
a first connector portion positioned at a first end of the channel of the curtain rail,
a second connector portion at a second end of the channel of the curtain rail opposite the first end, and
a pole platform positioned in the channel, wherein a curtain is positioned between the upper surface of the base and a lower surface of the pole platform.

30. A system, comprising:
a curtain rail extending in a first horizontal direction of extension, the curtain rail comprising a channel extending along the length of the curtain rail in the first horizontal direction of extension, the channel comprising:
  a base comprising opposed upper and lower surfaces; and
  first and second side walls along opposite edges of the base, the first and second side walls parallel to the first horizontal direction of extension, the upper surface of the base and the first and second walls defining the channel that extends along the length of the base;
a first connector portion positioned at a first end of the channel of the curtain rail,
a second connector portion at a second end of the channel of the curtain rail opposite the first end;
a rail clip positioned at the channel of the curtain rail, the rail clip comprising:
  at least one side panel; and
  a base coupled to the at least one side panel; and
a curtain positioned between the rail clip and the curtain rail,
wherein the rail clip is coupled to the curtain rail via an attachment mechanism.

31. A system, comprising:
a curtain rail extending in a first horizontal direction of extension, the curtain rail comprising a channel extending along the length of the curtain rail in the first horizonal direction of extension, the channel comprising:
  a base comprising opposed upper and lower surfaces; and
  first and second side walls along opposite edges of the base, the first and second side walls parallel to the first horizontal direction of extension, the upper surface of the base and the first and second walls defining the channel that extends along the length of the base;
a first connector portion positioned at a first end of the channel of the curtain rail,
a second connector portion at a second end of the channel of the curtain rail opposite the first end, and
a rail clip positioned at the channel of the curtain rail, the rail clip comprising:
  at least one side panel; and
  a base coupled to the at least one side panel,
wherein the rail clip is coupled to the curtain rail via an attachment mechanism,
wherein rail clip comprises at least one protrusion,
wherein the curtain rail comprises at least one hole constructed and arranged to couple with the at least one protrusion, and
wherein the at least one hole is at the at least one of the first and second sidewalls.

32. A system, comprising:
a curtain rail extending in a first horizontal direction of extension, the curtain rail comprising a channel extending along the length of the curtain rail in the first horizonal direction of extension, the channel comprising:
　a base comprising opposed upper and lower surfaces; and
　first and second side walls along opposite edges of the base, the first and second side walls parallel to the first horizontal direction of extension, the upper surface of the base and the first and second walls defining the channel that extends along the length of the base;
a first connector portion positioned at a first end of the channel of the curtain rail,
a second connector portion at a second end of the channel of the curtain rail opposite the first end, and
a rail clip positioned at the channel of the curtain rail, the rail clip comprising:
　at least one side panel; and
　a base coupled to the at least one side panel,
wherein the rail clip is coupled to the curtain rail via an attachment mechanism,
wherein rail clip comprises at least one protrusion,
wherein the curtain rail comprises at least one hole constructed and arranged to couple with the at least one protrusion, and
wherein the at least one protrusion is at the at least one side panel of the rail clip.

33. A system, comprising:
a curtain rail extending in a first horizontal direction of extension, the curtain rail comprising a channel extending along the length of the curtain rail in the first horizonal direction of extension, the channel comprising:
　a base comprising opposed upper and lower surfaces; and
　first and second side walls along opposite edges of the base, the first and second side walls parallel to the first horizontal direction of extension, the upper surface of the base and the first and second walls defining the channel that extends along the length of the base;
a first connector portion positioned at a first end of the channel of the curtain rail,
a second connector portion at a second end of the channel of the curtain rail opposite the first end, and
a rail clip positioned at the channel of the curtain rail, the rail clip comprising:
　at least one side panel; and
　a base coupled to the at least one side panel,
wherein the rail clip is coupled to the curtain rail via an attachment mechanism,
wherein rail clip comprises at least one protrusion, and
wherein at least one of the at least one side panel is bendable.

34. A system, comprising:
a curtain rail extending in a first horizontal direction of extension, the curtain rail comprising a channel extending along the length of the curtain rail in the first horizonal direction of extension, the channel comprising:
　a base comprising opposed upper and lower surfaces; and
　first and second side walls along opposite edges of the base, the first and second side walls parallel to the first horizontal direction of extension, the upper surface of the base and the first and second walls defining the channel that extends along the length of the base;
a first connector portion positioned at a first end of the channel of the curtain rail,
a second connector portion at a second end of the channel of the curtain rail opposite the first end,
wherein the first connector portion is moveable relative to the curtain rail in the first horizontal direction of extension, and
wherein the second connector portion is constructed and arranged to mate with the first connector portion of a neighboring rail to thereby secure positions of the neighboring rails.

35. A system, comprising:
a curtain rail extending in a first horizontal direction of extension, the curtain rail comprising a channel extending along the length of the curtain rail in the first horizonal direction of extension, the channel comprising:
　a base comprising opposed upper and lower surfaces; and
　first and second side walls along opposite edges of the base, the first and second side walls parallel to the first horizontal direction of extension, the upper surface of the base and the first and second walls defining the channel that extends along the length of the base;
a curtain positioned at the upper surface of the base;
a first connector portion positioned at a first end of the channel of the curtain rail, and
a second connector portion at a second end of the channel of the curtain rail opposite the first end,
wherein the first connector portion is moveable relative to the curtain rail in the first horizontal direction of extension.

36. A system, comprising:
a curtain rail extending in a first horizontal direction of extension, the curtain rail comprising a channel extending along the length of the curtain rail in the first horizonal direction of extension, the channel comprising:
　a base comprising opposed upper and lower surfaces; and
　first and second side walls along opposite edges of the base, the first and second side walls parallel to the first horizontal direction of extension, the upper surface of the base and the first and second walls defining the channel that extends along the length of the base;
a first connector portion positioned at a first end of the channel of the curtain rail, and
a second connector portion at a second end of the channel of the curtain rail opposite the first end,
wherein the first connector portion is moveable relative to the curtain rail in the first horizontal direction of extension, and
wherein the curtain rail comprises a first curtain rail and further comprising:
　a second curtain rail extending in a first horizontal direction of extension of the second curtain rail, the second curtain rail comprising a channel extending along the length of the second curtain rail in the first horizonal direction of extension of the second curtain rail, the channel comprising:

a base comprising opposed upper and lower surfaces; and first and second side walls along opposite edges of the base, the first and second side walls parallel to the first horizontal direction of extension of the second curtain rail, the upper surface of the base and the first and second walls defining the channel that extends along the length of the base;

a first connector portion positioned at a first end of the channel of the second curtain rail, and a second connector portion at a second end of the channel of the second curtain rail opposite the first end, wherein the first connector portion of the first curtain rail and the second connector portion of the second curtain rail are constructed and arranged to mate.

* * * * *